(12) United States Patent
Keith, Jr.

(10) Patent No.: US 12,153,678 B2
(45) Date of Patent: Nov. 26, 2024

(54) ANALYTICS WITH SHARED TRAITS

(71) Applicant: WINKK, INC, Menlo Park, CA (US)

(72) Inventor: Robert O. Keith, Jr., San Jose, CA (US)

(73) Assignee: Winkk, Inc., Atherton, CA (US)

( * ) Notice: Subject to any disclaimer, the term of this patent is extended or adjusted under 35 U.S.C. 154(b) by 549 days.

(21) Appl. No.: 17/497,115

(22) Filed: Oct. 8, 2021

(65) Prior Publication Data

US 2022/0043913 A1 Feb. 10, 2022

Related U.S. Application Data

(63) Continuation-in-part of application No. 16/868,080, filed on May 6, 2020, now Pat. No. 11,936,787,
(Continued)

(51) Int. Cl.
*G06F 21/56* (2013.01)
*G06F 16/28* (2019.01)

(52) U.S. Cl.
CPC .......... *G06F 21/566* (2013.01); *G06F 16/285* (2019.01); *G06F 2221/034* (2013.01)

(58) Field of Classification Search
CPC .............. G06F 21/566; G06F 16/285; G06F 2221/034; G06F 21/32; G06F 21/35; G06F 21/43; G06F 21/606; G06F 21/316; G06V 40/70; H04L 9/0866; H04L 9/3231; H04L 9/3271; H04L 63/0861; H04L 63/1425
See application file for complete search history.

(56) References Cited

U.S. PATENT DOCUMENTS 5,850,444 A 12/1998 Rune
5,987,130 A 11/1999 Chang
(Continued)

FOREIGN PATENT DOCUMENTS

CN 107918790 A 4/2018
CN 107924475 A 4/2018
(Continued)

OTHER PUBLICATIONS

Erdem Alkim et al., "Post-Quantum key exchange—a new hope", International Association for Cryptologic Research, vol. 20161116:063839, Nov. 16, 2016, pp. 1-22.
(Continued)

*Primary Examiner* — Baotran N To
(74) *Attorney, Agent, or Firm* — Haverstock & Owens, A Law Corporation

(57) ABSTRACT

A security platform architecture is described herein. A user identity platform architecture which uses a multitude of biometric analytics to create an identity token unique to an individual human. This token is derived on biometric factors like human behaviors, motion analytics, human physical characteristics like facial patterns, voice recognition prints, usage of device patterns, user location actions and other human behaviors which can derive a token or be used as a dynamic password identifying the unique individual with high calculated confidence. Because of the dynamic nature and the many different factors, this method is extremely difficult to spoof or hack by malicious actors or malware software.

21 Claims, 20 Drawing Sheets

Related U.S. Application Data which is a continuation-in-part of application No. 16/709,683, filed on Dec. 10, 2019, now Pat. No. 11,652,815.

(56) References Cited

U.S. PATENT DOCUMENTS

| | | |
|---|---|---|
| 6,947,943 B2 | 9/2005 | DeAnna |
| 7,468,927 B1 | 12/2008 | Battista |
| 7,571,320 B2 | 8/2009 | Davis |
| D607,009 S | 12/2009 | McEnaney |
| 7,683,773 B1 | 3/2010 | Goodall |
| D614,192 S | 4/2010 | Takano |
| 7,885,635 B2 | 2/2011 | Laursen |
| 7,925,013 B1 | 4/2011 | Washington |
| 7,992,102 B1 | 8/2011 | De Angelo |
| 7,992,190 B2 | 8/2011 | Mevissen |
| 8,139,581 B1 | 3/2012 | Mraz |
| 8,218,762 B2 | 7/2012 | Itoh |
| 8,363,259 B2 | 1/2013 | Gilboa |
| 8,417,642 B2 | 4/2013 | Oren |
| 8,417,643 B2 | 4/2013 | Mardikar |
| 8,543,834 B1 | 9/2013 | Barra |
| 8,543,884 B2 | 9/2013 | Mansour |
| 8,621,209 B1 | 12/2013 | Johansson |
| 8,639,785 B2 | 1/2014 | Kiley |
| 8,892,871 B2 | 11/2014 | Cho |
| D719,176 S | 12/2014 | Cohen |
| D719,177 S | 12/2014 | Cohen |
| D723,050 S | 2/2015 | Minsung et al. |
| 8,959,579 B2 | 2/2015 | Barton |
| 9,112,835 B2 | 8/2015 | Isozaki |
| 9,210,156 B1 | 12/2015 | Little |
| 9,219,732 B2 | 12/2015 | Baghdasaryan |
| 9,225,695 B1 | 12/2015 | Riera |
| 9,350,539 B2 | 5/2016 | Veugen |
| 9,392,460 B1 | 7/2016 | Blake |
| 9,419,951 B1 | 8/2016 | Felsher et al. |
| D765,669 S | 9/2016 | Shaw |
| 9,485,237 B1 | 11/2016 | Johansson |
| 9,615,066 B1 | 4/2017 | Tran |
| 9,665,169 B1 | 5/2017 | Dai |
| 9,706,406 B1 | 7/2017 | Adams |
| D800,764 S | 10/2017 | Thoreson |
| 9,852,418 B2 | 12/2017 | Mardikar |
| D813,884 S | 3/2018 | Penker |
| 9,959,694 B2 | 5/2018 | LIndsay |
| 9,961,547 B1 | 5/2018 | Molina-Markham |
| 10,019,561 B1 | 7/2018 | Shelton |
| 10,200,364 B1 | 2/2019 | Ketharaju et al. |
| D847,857 S | 5/2019 | Elatta |
| 10,374,800 B1 | 8/2019 | Sharfi |
| 10,402,800 B2 | 9/2019 | Lucas |
| 10,404,458 B1 | 9/2019 | Yamada |
| 10,430,789 B1 | 10/2019 | Herald, Jr. |
| 10,432,605 B1 | 10/2019 | Lester |
| 10,437,975 B1 | 10/2019 | Shelton |
| 10,521,223 B1 | 12/2019 | Bogushefsky, III |
| 10,559,307 B1 | 2/2020 | Khalegi |
| 10,630,467 B1 | 4/2020 | Gilbert |
| 10,674,446 B1 | 6/2020 | Trent |
| 10,769,633 B2 | 9/2020 | Dua |
| 10,810,290 B2 | 10/2020 | Minter et al. |
| 10,867,021 B1 | 12/2020 | Shelton |
| 10,887,307 B1 | 1/2021 | Newstadt |
| 10,911,425 B1 | 2/2021 | Hitchcock |
| 10,958,424 B1 | 3/2021 | Chhabra |
| D916,890 S | 4/2021 | Nagpal |
| 10,970,607 B2 | 4/2021 | Xue |
| 11,005,839 B1 | 5/2021 | Shahidzadeh |
| 11,030,618 B1 | 6/2021 | Budko |
| 11,038,694 B1 | 6/2021 | Kleinman |
| D925,602 S | 7/2021 | Xu |
| D928,803 S | 8/2021 | Faller |
| D928,820 S | 8/2021 | Bodduluri |
| 11,121,878 B2 | 9/2021 | McCarty |
| D942,469 S | 2/2022 | Abdullah et al. |
| 11,283,835 B1 | 3/2022 | Gordon |
| 11,328,042 B2 | 5/2022 | Keith, Jr. |
| 11,510,172 B1 | 11/2022 | Feng |
| 11,553,337 B2 | 1/2023 | Keith, Jr |
| 11,563,582 B2 | 1/2023 | Keith, Jr |
| 11,574,045 B2 | 2/2023 | Keith, Jr. |
| 11,588,794 B2 | 2/2023 | Keith, Jr |
| 11,637,694 B2 | 4/2023 | Islamov |
| 11,640,602 B2 | 5/2023 | Rudko |
| 11,652,815 B2 | 5/2023 | Keith, Jr. |
| 11,657,140 B2 | 5/2023 | Keith, Jr. |
| 2002/0099955 A1 | 7/2002 | Peled |
| 2002/0114454 A1 | 8/2002 | Hamilton |
| 2002/0131592 A1 | 9/2002 | Hinnant |
| 2002/0169871 A1 | 11/2002 | Cravo de Almeida |
| 2003/0014750 A1 | 1/2003 | Kamen |
| 2003/0016844 A1 | 1/2003 | Numaoka |
| 2003/0021416 A1 | 1/2003 | Brown |
| 2003/0147267 A1 | 8/2003 | Huttunen |
| 2003/0174067 A1 | 9/2003 | Soliman |
| 2003/0221030 A1 | 11/2003 | Pontius |
| 2004/0198392 A1 | 10/2004 | Harvey |
| 2004/0223616 A1 | 11/2004 | Kocarev |
| 2005/0135609 A1 | 6/2005 | Lee |
| 2005/0147240 A1 | 7/2005 | Agrawal |
| 2006/0075060 A1 | 4/2006 | Clark |
| 2006/0031301 A1 | 9/2006 | Herz et al. |
| 2006/0196950 A1 | 9/2006 | Kiliccote |
| 2006/0236408 A1 | 10/2006 | Yan |
| 2006/0285544 A1 | 12/2006 | Taylor |
| 2008/0022141 A1 | 1/2008 | Hammarlund |
| 2008/0031460 A1 | 2/2008 | Brookner |
| 2008/0045218 A1 | 2/2008 | Okochi |
| 2008/0165937 A1 | 7/2008 | Moore |
| 2008/0301057 A1 | 12/2008 | Oren |
| 2009/0006796 A1 | 1/2009 | Chang |
| 2009/0090577 A1 | 4/2009 | Takahashi |
| 2009/0161873 A1 | 6/2009 | Simard |
| 2009/0194592 A1 | 8/2009 | Ming et al. |
| 2009/0279693 A1 | 11/2009 | Billet |
| 2009/0315671 A1 | 12/2009 | Gocho |
| 2009/0327746 A1 | 12/2009 | Greco |
| 2010/0079591 A1 | 4/2010 | Lee |
| 2010/0100716 A1 | 5/2010 | Scott |
| 2010/0122274 A1 | 5/2010 | Gillies |
| 2010/0329232 A1 | 12/2010 | Tubb |
| 2011/0072142 A1 | 3/2011 | Herz et al. |
| 2011/0106935 A1 | 5/2011 | Srinivasan |
| 2011/0167255 A1 | 7/2011 | Matzkel |
| 2011/0167273 A1 | 7/2011 | Maas |
| 2011/0187642 A1 | 8/2011 | Faith |
| 2011/0194694 A1 | 8/2011 | Struik |
| 2011/0231673 A1 | 9/2011 | Alekseev |
| 2011/0233284 A1 | 9/2011 | Howard |
| 2011/0302405 A1 | 12/2011 | Marlow |
| 2011/0321052 A1 | 12/2011 | Long |
| 2012/0098750 A1 | 4/2012 | Allen |
| 2012/0185910 A1 | 7/2012 | Miettinen |
| 2012/0214442 A1 | 8/2012 | Crawford |
| 2012/0221859 A1 | 8/2012 | Marien |
| 2012/0272058 A1 | 10/2012 | Wang et al. |
| 2012/0281885 A1 | 11/2012 | Syrdal |
| 2013/0086625 A1 | 4/2013 | Driscoll |
| 2013/0111208 A1 | 5/2013 | Sabin et al. |
| 2013/0170363 A1 | 7/2013 | Millington |
| 2013/0177151 A1 | 7/2013 | Sella |
| 2013/0202104 A1 | 8/2013 | Ghouti |
| 2013/0205410 A1 | 8/2013 | Sambamurthy |
| 2013/0239191 A1 | 9/2013 | Bostick |
| 2013/0243187 A1 | 9/2013 | Hortsmeyer |
| 2014/0002481 A1 | 1/2014 | Broughton |
| 2014/0007048 A1 | 1/2014 | Qureshi |
| 2014/0038583 A1 | 2/2014 | Berg |
| 2014/0039892 A1 | 2/2014 | Mills |
| 2014/0040628 A1 | 2/2014 | Fort et al. |
| 2014/0064166 A1 | 3/2014 | HomChadhuri |
| 2014/0098723 A1 | 4/2014 | Battista |
| 2014/0108803 A1 | 4/2014 | Probert |

(56) References Cited

U.S. PATENT DOCUMENTS

| | | |
|---|---|---|
| 2014/0201531 A1 | 7/2014 | Toy |
| 2014/0244514 A1 | 8/2014 | Rodriquez |
| 2014/0244515 A1 | 8/2014 | Garfinkle |
| 2014/0278077 A1 | 9/2014 | Levin |
| 2014/0304371 A1 | 10/2014 | Mraz |
| 2014/0344455 A1* | 11/2014 | Cheng ................ G06F 16/958 709/224 |
| 2014/0351618 A1 | 11/2014 | Connell |
| 2014/0368601 A1 | 12/2014 | deCharms |
| 2015/0089568 A1 | 3/2015 | Sprague |
| 2015/0095580 A1 | 4/2015 | Liu |
| 2015/0095648 A1 | 4/2015 | Nix |
| 2015/0095986 A1 | 4/2015 | Karpey |
| 2015/0134963 A1 | 5/2015 | Izu |
| 2015/0142666 A1 | 5/2015 | Landrok |
| 2015/0242601 A1 | 8/2015 | Griffiths |
| 2015/0242605 A1 | 8/2015 | Du |
| 2015/0258892 A1 | 9/2015 | Wu |
| 2015/0271679 A1 | 9/2015 | Park |
| 2015/0278805 A1 | 10/2015 | Spencer, III |
| 2015/0280911 A1 | 10/2015 | Andoni |
| 2015/0294092 A1 | 10/2015 | Balasubramanian |
| 2015/0347734 A1 | 12/2015 | Beigi |
| 2015/0350201 A1 | 12/2015 | Cornell |
| 2015/0356289 A1 | 12/2015 | Brown |
| 2015/0365229 A1 | 12/2015 | Patey |
| 2015/0365235 A1 | 12/2015 | Hostyn |
| 2015/0370826 A1 | 12/2015 | Mraz |
| 2015/0373007 A1 | 12/2015 | Sheller |
| 2016/0007288 A1 | 1/2016 | Samardzija |
| 2016/0011224 A1 | 1/2016 | Pollack |
| 2016/0057623 A1 | 2/2016 | Dutt |
| 2016/0065558 A1 | 3/2016 | Suresh |
| 2016/0065570 A1 | 3/2016 | Spencer |
| 2016/0098334 A1 | 4/2016 | Harihharakrishnan |
| 2016/0110528 A1 | 4/2016 | Gupta |
| 2016/0117673 A1 | 4/2016 | Landrock |
| 2016/0135107 A1 | 5/2016 | Hampel |
| 2016/0180078 A1 | 6/2016 | Chhabra |
| 2016/0182503 A1 | 6/2016 | Cheng |
| 2016/0191499 A1 | 6/2016 | Momchillov |
| 2016/0227411 A1 | 8/2016 | Lundblade |
| 2016/0239649 A1 | 8/2016 | Zhao |
| 2016/0239657 A1 | 8/2016 | Loughlin-Mchugh et al. |
| 2016/0283406 A1 | 9/2016 | Linga |
| 2016/0320831 A1 | 11/2016 | McCubbin |
| 2016/0342873 A1 | 11/2016 | Winkk et al. |
| 2016/0352696 A1 | 12/2016 | Essigmann |
| 2017/0005995 A1 | 1/2017 | Yang |
| 2017/0013453 A1 | 1/2017 | Lee |
| 2017/0041309 A1 | 2/2017 | Ekambaram et al. |
| 2017/0048062 A1 | 2/2017 | Polak |
| 2017/0063528 A1 | 3/2017 | Seo |
| 2017/0068994 A1 | 3/2017 | Slomkowski |
| 2017/0070340 A1 | 3/2017 | Hibshoosh |
| 2017/0070890 A1 | 3/2017 | Luff |
| 2017/0085382 A1 | 3/2017 | Kamakari |
| 2017/0124385 A1 | 5/2017 | Ganong |
| 2017/0147345 A1 | 5/2017 | Clevenger |
| 2017/0193211 A1 | 7/2017 | Blake |
| 2017/0220407 A1 | 8/2017 | Estrada |
| 2017/0230172 A1 | 8/2017 | Andersson |
| 2017/0230344 A1 | 8/2017 | Dhar |
| 2017/0264597 A1 | 9/2017 | Pizot |
| 2017/0272419 A1 | 9/2017 | Kumar |
| 2017/0289168 A1 | 10/2017 | Bar |
| 2017/0295010 A1 | 10/2017 | Shibutani |
| 2017/0310479 A1 | 10/2017 | Sato |
| 2017/0311250 A1 | 10/2017 | Rico Alvarino |
| 2017/0317823 A1 | 11/2017 | Gandhi |
| 2017/0339118 A1 | 11/2017 | Hwang |
| 2017/0366514 A1 | 12/2017 | Malka |
| 2018/0005239 A1 | 1/2018 | Schlesinger |
| 2018/0005465 A1 | 1/2018 | Truong |
| 2018/0007530 A1 | 1/2018 | Tanaka |
| 2018/0012003 A1 | 1/2018 | Asulin |
| 2018/0025135 A1 | 1/2018 | Odom |
| 2018/0027411 A1 | 1/2018 | Taneja |
| 2018/0029560 A1 | 2/2018 | Mohaupt |
| 2018/0039990 A1 | 2/2018 | Lindemann |
| 2018/0046803 A1 | 2/2018 | Li |
| 2018/0063784 A1 | 3/2018 | Abraham |
| 2018/0109696 A1 | 4/2018 | Thanigasalam |
| 2018/0114221 A1 | 4/2018 | Karantzis |
| 2018/0135815 A1 | 5/2018 | Rowles |
| 2018/0144615 A1 | 5/2018 | Kinney |
| 2018/0150622 A1 | 5/2018 | Zaitsev |
| 2018/0167816 A1 | 6/2018 | Kusens et al. |
| 2018/0189160 A1 | 7/2018 | Yasin |
| 2018/0189161 A1 | 7/2018 | Yasin |
| 2018/0212770 A1 | 7/2018 | Costa |
| 2018/0248865 A1 | 8/2018 | Johansson |
| 2018/0285879 A1 | 10/2018 | Gadnis |
| 2018/0302416 A1 | 10/2018 | Einberg |
| 2018/0322266 A1 | 11/2018 | Kwok Suzuki |
| 2018/0329857 A1 | 11/2018 | Ko |
| 2018/0375848 A1 | 12/2018 | Tunnell |
| 2019/0103957 A1 | 4/2019 | Isobe |
| 2019/0122024 A1 | 4/2019 | Schwartz |
| 2019/0149333 A1 | 5/2019 | Harnik |
| 2019/0188111 A1 | 6/2019 | Ozog |
| 2019/0289017 A1 | 6/2019 | Agarwal |
| 2019/0207918 A1 | 7/2019 | Kurian |
| 2019/0220583 A1 | 7/2019 | Douglas |
| 2019/0245704 A1 | 8/2019 | Pala |
| 2019/0268774 A1 | 8/2019 | Kusens et al. |
| 2019/0271349 A1 | 9/2019 | Madru |
| 2019/0271578 A1 | 9/2019 | Moeller |
| 2019/0272495 A1 | 9/2019 | Moeller |
| 2019/0279204 A1 | 9/2019 | Norton |
| 2019/0281025 A1 | 9/2019 | Harriman |
| 2019/0281036 A1 | 9/2019 | Eisen |
| 2019/0287427 A1 | 9/2019 | Schepers |
| 2019/0318122 A1 | 10/2019 | Hockey |
| 2019/0334708 A1 | 10/2019 | Carpor |
| 2019/0342092 A1 | 11/2019 | Handschuh |
| 2019/0354660 A1* | 11/2019 | Fong ................ G06V 10/454 |
| 2019/0354787 A1* | 11/2019 | Fong ................ G06V 10/454 |
| 2019/0370445 A1* | 12/2019 | Fong ................ G06N 3/084 |
| 2019/0386814 A1 | 12/2019 | Ahmed |
| 2019/0391895 A1* | 12/2019 | Della Corte ........ G06F 11/3065 |
| 2020/0042723 A1 | 2/2020 | Krishnamoorthy |
| 2020/0050745 A1 | 2/2020 | Kim |
| 2020/0053096 A1 | 2/2020 | Bendersky |
| 2020/0066071 A1 | 2/2020 | Budman |
| 2020/0097643 A1 | 3/2020 | Uzun |
| 2020/0099675 A1 | 3/2020 | Mardiks Rappaport |
| 2020/0100115 A1 | 3/2020 | Skaaksrud |
| 2020/0120071 A1 | 4/2020 | Wimmer |
| 2020/0125704 A1 | 4/2020 | Chavez |
| 2020/0127974 A1 | 4/2020 | Morlando |
| 2020/0134145 A1 | 4/2020 | Bapst |
| 2020/0162435 A1 | 5/2020 | Kubo |
| 2020/0175157 A1 | 6/2020 | Wilding |
| 2020/0193051 A1 | 6/2020 | Van Antwerp |
| 2020/0242417 A1 | 7/2020 | Sagi |
| 2020/0358787 A1 | 11/2020 | Barker |
| 2020/0387696 A1 | 12/2020 | Kushwah |
| 2020/0403787 A1 | 12/2020 | Islam |
| 2020/0403992 A1 | 12/2020 | Huffman |
| 2021/0005224 A1 | 1/2021 | Rothschild |
| 2021/0014314 A1 | 1/2021 | Yamada |
| 2021/0049032 A1 | 2/2021 | White |
| 2021/0051015 A1 | 2/2021 | Widmann |
| 2021/0051177 A1 | 2/2021 | White |
| 2021/0123835 A1 | 4/2021 | Glennon |
| 2021/0152417 A1 | 5/2021 | Baird |
| 2021/0152554 A1 | 5/2021 | Taft |
| 2021/0167946 A1 | 6/2021 | Bitan |
| 2021/0173906 A1 | 6/2021 | Keith, Jr |
| 2021/0173907 A1 | 6/2021 | Keith, Jr. |
| 2021/0173914 A1 | 6/2021 | Keith, Jr. |
| 2021/0173915 A1 | 6/2021 | Keith, Jr. |
| 2021/0173949 A1 | 6/2021 | Keith, Jr |

(56) References Cited

U.S. PATENT DOCUMENTS

| | | |
|---|---|---|
| 2021/0174333 A1 | 6/2021 | Keith, Jr |
| 2021/0176064 A1 | 6/2021 | Keith, Jr |
| 2021/0176066 A1 | 6/2021 | Keith, Jr. |
| 2021/0176218 A1 | 6/2021 | Keith, Jr |
| 2021/0176223 A1 | 6/2021 | Falk |
| 2021/0176235 A1 | 6/2021 | Keith, Jr |
| 2021/0176633 A1 | 6/2021 | Keith, Jr |
| 2021/0194608 A1 | 6/2021 | Yao |
| 2021/0200852 A1 | 7/2021 | Gupta |
| 2021/0250759 A1 | 8/2021 | Ziv |
| 2021/0297258 A1 | 9/2021 | Keith, Jr. |
| 2021/0297448 A1 | 9/2021 | Keith, Jr. |
| 2021/0297455 A1 | 9/2021 | Keith, Jr. |
| 2021/0350918 A1 | 11/2021 | Paul |
| 2021/0362750 A1 | 11/2021 | Yang |
| 2021/0390537 A1 | 12/2021 | Budko et al. |
| 2022/0027447 A1 | 1/2022 | Keith, Jr. |
| 2022/0028200 A1 | 1/2022 | Keith, Jr. |
| 2022/0030022 A1 | 1/2022 | Keith, Jr. |
| 2022/0036905 A1 | 2/2022 | Keith, Jr. |
| 2022/0038895 A1 | 2/2022 | Keith, Jr |
| 2022/0038897 A1 | 2/2022 | Liu |
| 2022/0043913 A1 | 2/2022 | Keith, Jr. |
| 2022/0045841 A1 | 2/2022 | Keith, Jr. |
| 2022/0092161 A1 | 3/2022 | Keith, Jr. |
| 2022/0092162 A1 | 3/2022 | Keith, Jr. |
| 2022/0092163 A1 | 3/2022 | Keith, Jr. |
| 2022/0092164 A1 | 3/2022 | Keith, Jr. |
| 2022/0092165 A1 | 3/2022 | Keith, Jr. |
| 2022/0093256 A1 | 3/2022 | Keith, Jr. et al. |
| 2022/0094545 A1 | 3/2022 | Islamov et al. |
| 2022/0094550 A1 | 3/2022 | Keith, Jr. |
| 2022/0108026 A1 | 4/2022 | Ortiz et al. |
| 2022/0130501 A1 | 4/2022 | Keith, Jr. et al. |
| 2022/0138300 A1 | 5/2022 | Manjunath et al. |
| 2022/0139546 A1 | 5/2022 | Manjunath et al. |
| 2022/0164424 A1 | 5/2022 | Keith, Jr. |
| 2022/0197985 A1 | 6/2022 | Keith, Jr. |
| 2022/0200971 A1 | 6/2022 | Vigneswaran |
| 2022/0229888 A1 | 7/2022 | Keith, Jr. |
| 2022/0286966 A1 | 9/2022 | Zhao |
| 2022/0382844 A1 | 12/2022 | Keith, Jr. |
| 2022/0385458 A1 | 12/2022 | Keith, Jr. |
| 2022/0394023 A1 | 12/2022 | Keith, Jr. |
| 2022/0394464 A1 | 12/2022 | Keith, Jr. |
| 2022/0394465 A1 | 12/2022 | Keith, Jr. |
| 2023/0096233 A1 | 3/2023 | Islamov et al. |
| 2023/0106024 A1 | 4/2023 | Keith, Jr. |
| 2023/0107624 A1 | 4/2023 | Keith, Jr. |
| 2023/0114650 A1 | 4/2023 | Keith, Jr. |
| 2023/0116527 A1 | 4/2023 | Keith, Jr. et al. |
| 2023/0185896 A1 | 6/2023 | Keith, Jr. |
| 2023/0198766 A1 | 6/2023 | Keith, Jr. et al. |
| 2023/0198962 A1 | 6/2023 | Keith, Jr. |
| 2023/0254120 A1 | 8/2023 | Islamov |
| 2023/0254121 A1 | 8/2023 | Islamov |
| 2023/0254122 A1 | 8/2023 | Islamov |
| 2023/0267454 A1 | 8/2023 | Budko |
| 2023/0283602 A1 | 9/2023 | Keith, Jr. et al. |
| 2023/0289431 A1 | 9/2023 | Keith, Jr. |

FOREIGN PATENT DOCUMENTS

| | | |
|---|---|---|
| EP | 3276561 A | 1/2018 |
| EP | 3457344 A1 | 3/2019 |
| IN | 103413128 B | 7/2020 |
| WO | 2016179433 A1 | 11/2016 |
| WO | 2020065132 A1 | 4/2020 |
| WO | 2020092542 A1 | 5/2020 |
| WO | 2021119187 A1 | 7/2021 |

OTHER PUBLICATIONS

Joppe W. Bos et al., "Post-quantum key exchange for the TLS protocol from the ring learning with errors problem", International Association for Cryptologic Research, vol. 20150316:235249, Mar. 17, 2015, pp. 1-28.

International Search Report mailed Aug. 11, 2016, for PCT Application No. PCT/US2016/031055, filed May 5, 2016, five pages.

International Search Report mailed Oct. 9, 2019, for PCT Application No. PCT/US2019/041871, filed Jul. 15, 2019, four pages.

Li et al., "Addressable Metasurfaces for Dynamic Holography and Optical Information Encryption", Jun. 15, 2018, http://advances.sciencemag.org/content/advances/4/6/eaar6768.full.pdf.

The International Search Report and Written Report for the International Application No. PCT/US2020/064099 dated Mar. 16, 2021.

Magoon, Owais, "IOS app." Behance, published Sep. 7, 2015 (Retrieved from the Internet Mar. 22, 2021). Internet URL: <https://www.behance.net/gallery/27383661/iOS-app> (Year: 2015).

Bywater Films, "Winkk: Emotion to Action." Vimeo, published Oct. 7, 2015 (Retrieved from the Internet Mar. 22, 2021). Internet URL: <https://vimeo.com/141695923> (Year: 2015).

Schiff, Eli, "Unofficial Apple Icon Design Awards." Eli Schiff Blog, published Jan. 5, 2016 (Retrieved from the Internet Mar. 22, 2021), Internet URL: <www.elischiff.com/blog/2016/1/5/apple-icon-design-awards> (Year: 2016).

International Report on Patentability from International Application No. PCT/US2020/064099, mailed on Jun. 23, 2022, 7 pages.

Tao et al., "Simple Matrix—A Multivariate Public Key Cryptosystem (MPKC) for Encryption" from Finite Field and Their Applications vol. 35, Sep. 2015, pp. 352-368 (Year 2015).

\* cited by examiner

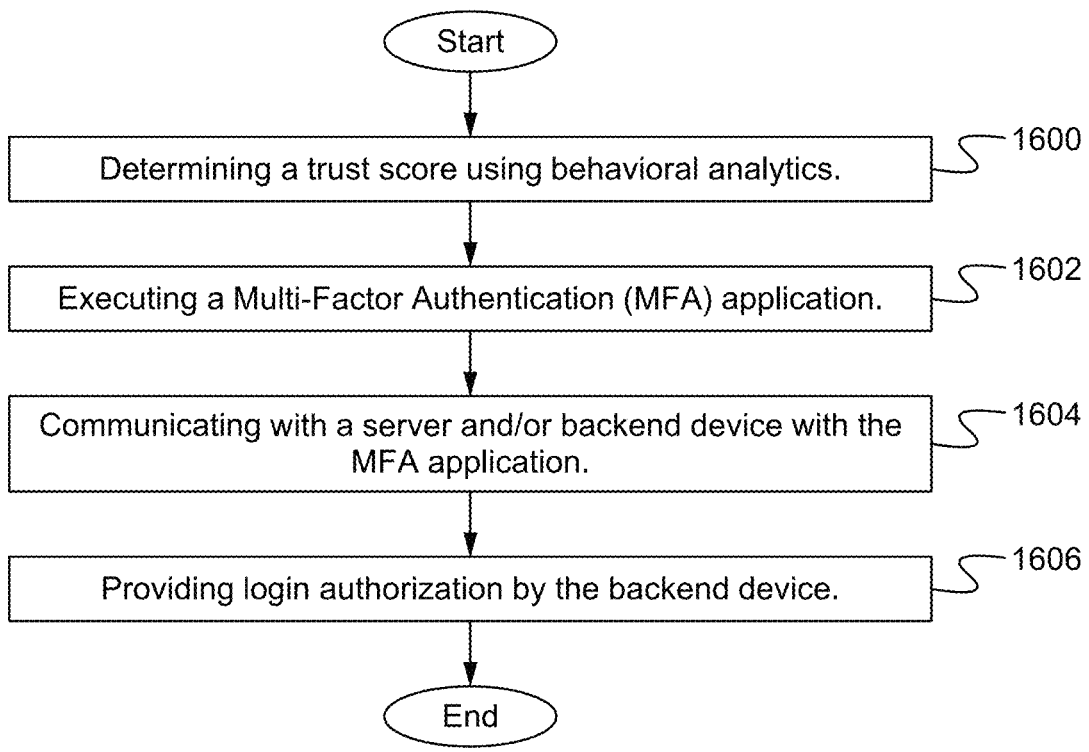
Fig. 16
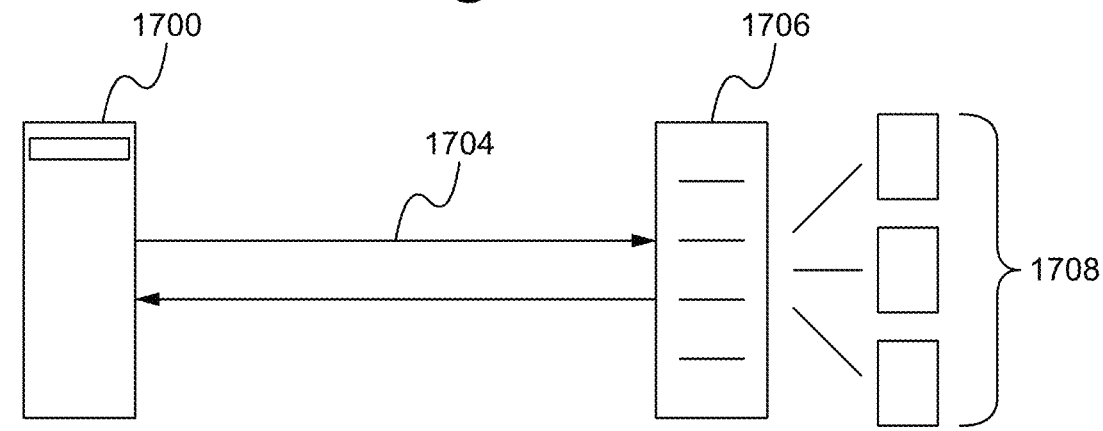
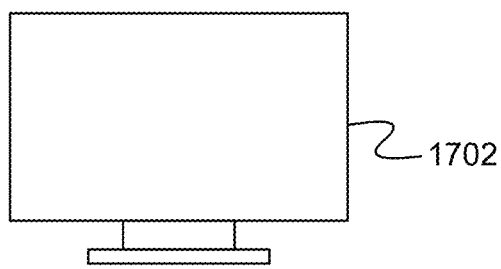
Fig. 17

ANALYTICS WITH SHARED TRAITS

CROSS-REFERENCE TO RELATED APPLICATION(S)

This application is a continuation-in-part application of co-pending U.S. patent application Ser. No. 16/868,080, filed on May 6, 2020, and titled "USER IDENTIFICATION PROOFING USING A COMBINATION OF USER RESPONSES TO SYSTEM TURING TESTS USING BIOMETRIC METHODS," which is a continuation-in-part application of co-pending U.S. patent application Ser. No. 16/709,683, filed on Dec. 10, 2019, and titled "SECURITY PLATFORM ARCHITECTURE," which is hereby incorporated by reference in its entirety for all purposes.

FIELD OF THE INVENTION

The present invention relates to security. More specifically, the present invention relates to a security architecture.

BACKGROUND OF THE INVENTION

Although the Internet provides a massive opportunity for shared knowledge, it also enables those with malicious intentions to attack such as by stealing personal data or causing interference with properly functioning mechanisms. The Internet and other networks will continue to grow both in size and functionality, and with such growth, security will be paramount.

SUMMARY OF THE INVENTION

A security platform architecture is described herein. A user identity platform architecture which uses a multitude of biometric analytics to create an identity token unique to an individual human. This token is derived on biometric factors like human behaviors, motion analytics, human physical characteristics like facial patterns, voice recognition prints, usage of device patterns, user location actions and other human behaviors which can derive a token or be used as a dynamic password identifying the unique individual with high calculated confidence. Because of the dynamic nature and the many different factors, this method is extremely difficult to spoof or hack by malicious actors or malware software.

BRIEF DESCRIPTION OF THE DRAWINGS

FIG. 16 illustrates a flowchart of a method of an automated transparent login without saved credentials or passwords according to some embodiments.

FIG. 17 illustrates a diagram of a system configured for implementing a method of an automated transparent login without saved credentials or passwords according to some embodiments.

DETAILED DESCRIPTION OF THE PREFERRED EMBODIMENT

A security platform architecture is described herein. The security platform architecture includes multiple layers and utilizes a combination of encryption and other security features to generate a secure environment.

Figure 1:
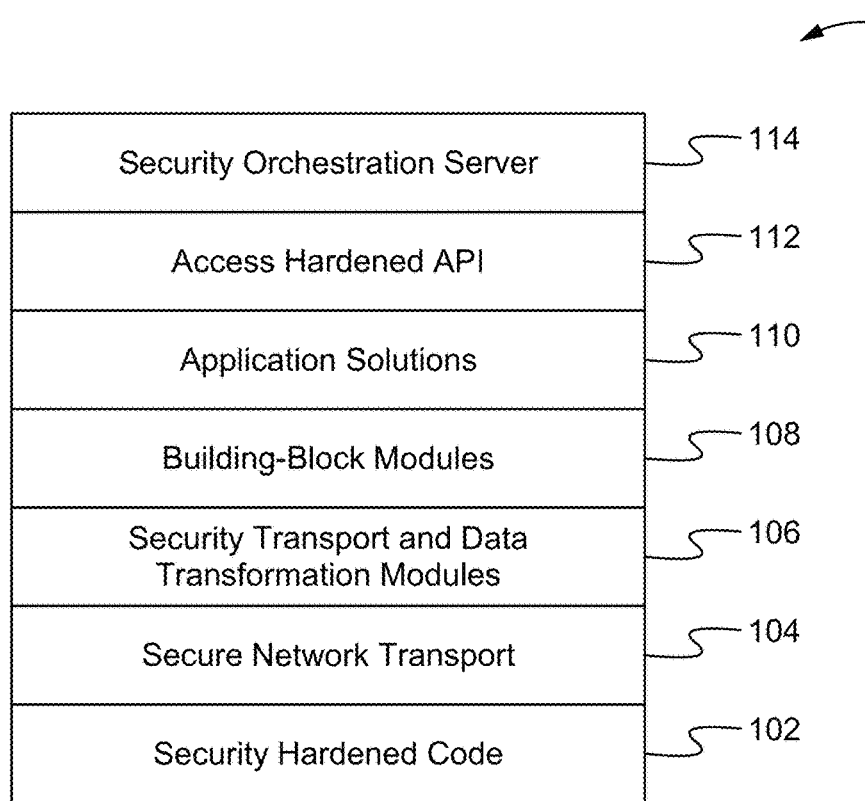
FIG. 1 illustrates a diagram of a security platform architecture according to some embodiments.

FIG. 1 illustrates a diagram of a security platform architecture according to some embodiments. The security platform 100 includes security-hardened code 102, secure network transport 104, security transport and data transformation modules 106, building block modules 108, application solutions/modules 110, access-hardened API/SDK 112, and a security orchestration server 114. In some embodiments, fewer or additional layers are implemented.

The security-hardened code 102 is able to include open or proprietary software security hardening. The security-hardened code 102 includes software libraries, executables, scripts, modules, drivers, and/or any other executable, accessible or callable data.

In some embodiments, the security-hardened code 102 is encrypted. For example, each library, executable and other data is encrypted. Furthering the example, an "encryption at rest" or "data at rest" encryption implementation is utilized. Data at rest encryption means data that is not in transit in a network or data that is not being executed is encrypted. Any data at rest encryption is able to be implemented including quantum encryption.

In some embodiments, the security-hardened code 102 is signed. For example, a digitally signed driver is associated with a digital certificate which enables identification of the publisher/owner of the driver.

In some embodiments, open or proprietary verification is based on encryption/decryption (e.g., the software modules/executables are inside an encrypted container), and is performed at installation and prior to each access. The security-hardened code 102 is fully tamper-proof. To be able to access the security-hardened code 102, a caller (e.g., calling module/procedure) should be part of the security domain.

In some embodiments, runtime verification of each executable, library, driver and/or data is implemented. Runtime verification is able to include any type of analysis of activity such as determining and learning keystrokes per user, or other mannerisms of computer interaction by each user.

In some embodiments, a security callback implementation is utilized. Before data is accessed or executed, the security callback calls to a master/server from the client, and if the hash or other verification implementation on the master/server does not match the hash/verification on the client, then access to the security-hardened code 102 is restricted/denied. For example, if a hash match fails, a software module will not be able to be executed, launched, moved or another action. The hash/verification comparison/analysis occurs before access of the security-hardened code 102. The security callback implementation is able to protect against instances where a virus or other malicious code has infiltrated a client device (e.g., mobile phone, personal computer).

The security-hardened code 102 is able to use any individual security technology or any combination of security technologies.

The security-hardened code 102 is able to be stored in a secure vault. The contents of the vault are encrypted using the data at rest encryption scheme. The contents of the vault are also signed. In some embodiments, white noise encryption is implemented which involves the use of white noise in the encryption. For example, white noise is generated using shift registers and randomizers, and the white noise is incorporated in the encryption such that if someone were to decrypt the content, they would obtain white noise.

The secure network transport 104 is able to be a high-speed, low-overhead, encrypted channel In some embodiments, the secure network transport 104 uses quantum encryption (or post-quantum encryption). Quantum encryption is based on real keys (e.g., real numbers instead of integers) such that the encryption may not be hackable. Quantum encryption such as described in U.S. Provisional Patent Application No. 62/698,644, filed on Jul. 16, 2018, titled: "SECRET MATERIAL EXCHANGE AND AUTHENTICATION CRYPTOGRAPHY OPERATIONS," and PCT Application No. PCT/US2019/041871, filed on Jul. 15, 2019, titled: "SECRET MATERIAL EXCHANGE AND AUTHENTICATION CRYPTOGRAPHY OPERATIONS," which are both incorporated by reference herein in their entireties for all purposes, is able to be utilized herein.

In some embodiments, everything that communicates uses the secure network transport 104. For example, when a software module communicates with another software module, information is sent using the secure network transport 104.

The secure network transport 104 is able to utilize a proprietary or open Internet key exchange, Trusted Platform Module (TPM) key processing and storage, IoT key exchange, and/or optical/sonic/infrared/Bluetooth® key exchange.

The security transport and data transformation modules 106 implement "data in motion" encryption and "data at rest" encryption. In some embodiments, encryption is implemented while the data is being accessed/executed. The security transport and data transformation modules 110 include a tunneling module to tunnel the implementation inside Secure Sockets Layer (SSL)/Transport Layer Security (TLS) to enable the data to be utilized on any platform/browser/software/hardware/standard. The tunneling is able to be TLS quantum tunneling. The security transport and data transformation modules 106 include Application Programming Interfaces (APIs), keys, Public Key Infrastructure (PKI) modules, and/or other modules/structures.

The building block modules 108 include processes, services, microservices such as: AUTH, TRANS, LOG, ETRANS, BLUETOOTH, ULTRASONIC, and/or RF, which are implemented using objects (including functions or sub-routines). The building block modules 108 come from the software code/libraries and are able to communicate via the secure network transport 104.

The building block modules 108 are able to communicate between each other. In some embodiments, the module to module communications utilize Qrist encryption transport (or another encryption scheme) which isolates the modules from threats of hacks, viruses and other malicious entities. Qrist transport is high performance and low latency which requires almost no overhead. Since the building block modules 108 are pulled from the encrypted code/libraries, they are not typically visible in memory.

The building block modules 108 also have layered APIs (e.g., a specific API to communicate amongst each other). The APIs enable additional flexibility and extendibility as well as providing a firewall (or micro-firewall) between every service to ensure transactions are coming from the right place (e.g., no man in the middle), the correct data is involved, and so on. The communications between the building block modules 108 are also able to be over HTTP. For example, a Web Application Firewall (WAF) is utilized, which applies specific rules for HTTP application communications.

The building block modules 108 are able to include executables (.exe), dynamic link libraries (.dll), configuration information, or other types of data/files (e.g., .so). The building block modules 108 are able to run in the background as background processes. The building block modules 108 are able to communicate through encrypted communications. The encrypted communications go through a transport such as Internet Protocol (IP), encrypted pipes in memory, Bluetooth® or another implementation. As described herein, the services are wrapped in APIs. The APIs implement REST (e.g., a very thin web server/client).

The application solutions/modules 110 are able to be developed using the building block modules 108. Exemplary applications include: encrypted email attachments, CyberEye multi-factor authentication, ID proofing, secure document signing (e.g., Docusign), secure electronic transactions, smart machines (e.g., autonomous vehicles), SAAS login, OpenVPN, blockchain login, blockchain support, high performance transaction services, electronic locks and E-notary. For example, since Docusign is relatively unsecure (e.g., anyone can sign the document), by combining Docusign with a CyberEye multi-factor authentication or another identification technology, it is possible to increase the security such that only the intended person is able to sign the document. More specifically, data at rest encryption is utilized to ensure the document is secure while stored, and the multi-factor authentication is used to ensure that the person signing the document is the desired target, and data in motion encryption is used to ensure the signed document is not tampered with and is received at the correct location.

The application solutions/modules 110 are able to be run/executed on any computing device such as a smart phone, a personal computer, a laptop, a tablet computer, a server, a dedicated smart device, a computer workstation, a server, a mainframe computer, a handheld computer, a personal digital assistant, a cellular/mobile telephone, a smart appliance, a gaming console, a digital camera, a digital camcorder, a camera phone, a portable music player, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle), IoT devices or any other suitable computing device.

The access-hardened API/SDK 112 includes similar security (e.g., encryption) as in the other modules. The access-hardened API/SDK 112 is able to utilize REST or another API (e.g., RPC). By implementing the access-hardened API/SDK 112, communication with the outside world is facilitated. For example, using a scripting language (e.g., javascript), an external application is able to communicate with the system.

The security orchestration server 114 is/includes a scripting language where when a call is received, the process goes down through the stacks starting at the top until the software library/code is reached (e.g., 114 through 102), and then the process goes up through the stacks out through the top (e.g., 102 through 114). Although the language is exposed to the outside world, it is based on the hardened code 102, so it is still secure.

The security orchestration server 114 accesses the security-hardened code 102 in the secure vault. The security orchestration server 114 includes keys and other information used for accessing the security-hardened code 102. The security orchestration server 114 deploys the services, builds keys, assigns commands/tasks and performs other control features. In some embodiments, the security orchestration server 114 organizes the building block modules 108 such that they are able to communicate with each other and function as an application 110.

When the security orchestration server 114 launches an application 110 (comprised of the building block modules 108), the security orchestration server 114 retrieves .dlls or other data and executes/communicates with the application 110 through the APIs of the building block modules 108.

The security orchestration server 114 controls deployment, policies and app structure. The app structure is also referred to as the application solutions/modules 110 which includes the code, the different modules/objects, and any data involved. The policies are able to be any policies such as for the firewall—what ports are open, which APIs are able to run in/with the application, who/what/when/where, well-structure calls (size of packets, and more), ports/ACL, and partners (which partners have access).

The secure orchestration server 114 implements a secure language such as python with extensions, java, and/or javascript.

In an example, a copy program is implemented by sending a copy command via the API which triggers a copy module which uses the transport scheme including data at rest encryption and data in motion encryption, and then goes to the transport layer and performs encryption/decryption, handles key exchanges and the copying using the code modules for copying.

Figure 2:
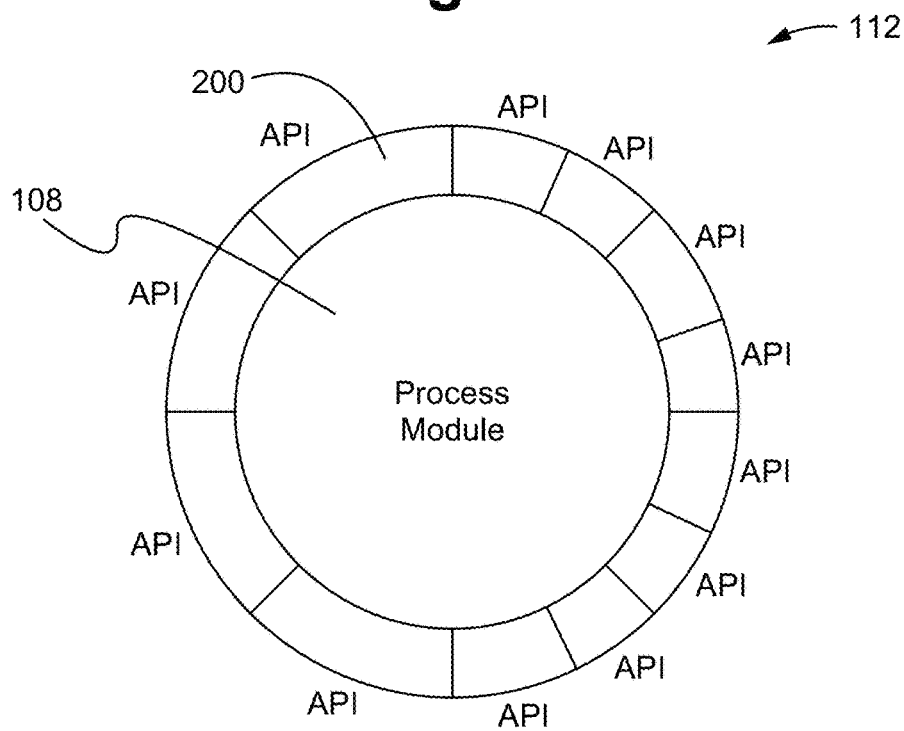
FIG. 2 illustrates an exemplary access-hardened API according to some embodiments.

FIG. 2 illustrates an exemplary access-hardened API according to some embodiments. The building block modules 108 enable communications and actions which are handled via RESTful APIs. Additionally, APIs 200 include Web Application Firewall (WAF) features to ensure that any communication between the building block modules 108 is secure/protected.

Figure 3:
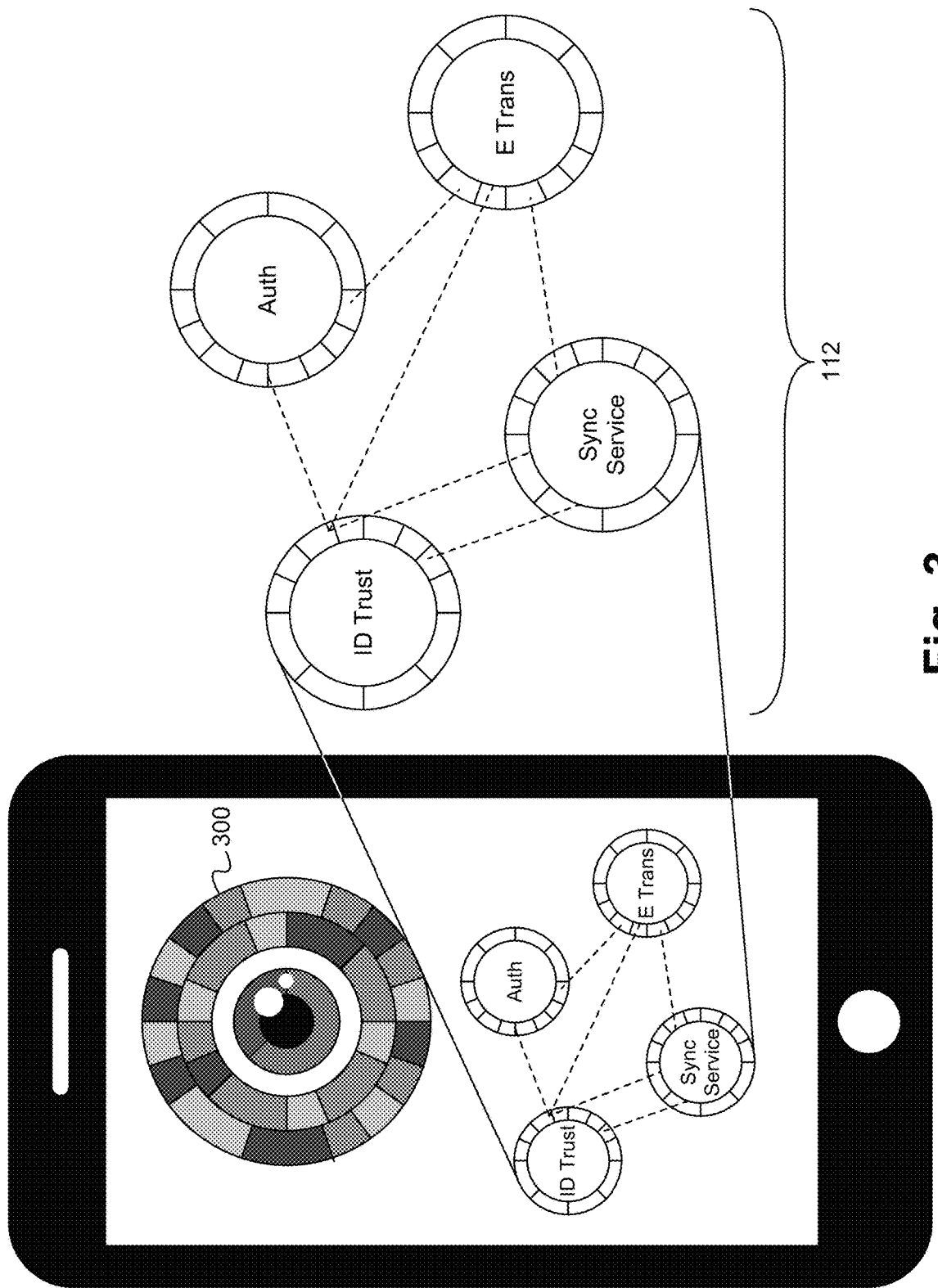
FIG. 3 illustrates a diagram of a secure application architecture according to some embodiments.

FIG. 3 illustrates a diagram of a secure application architecture according to some embodiments. An exemplary CyberEye implementation is able to be used to perform opti-crypto wireless airgap access (somewhat similar to a QR code). The building block modules 108 hardened by APIs 200 form the hardened APIs 112 which enable a modular services design, where each module is generalized for use in multiple application solutions. As described, the modules communicate with each other using encrypted communications (e.g., HTTP secure protocol). An API/WAF firewall is embedded in each module.

Figure 4:
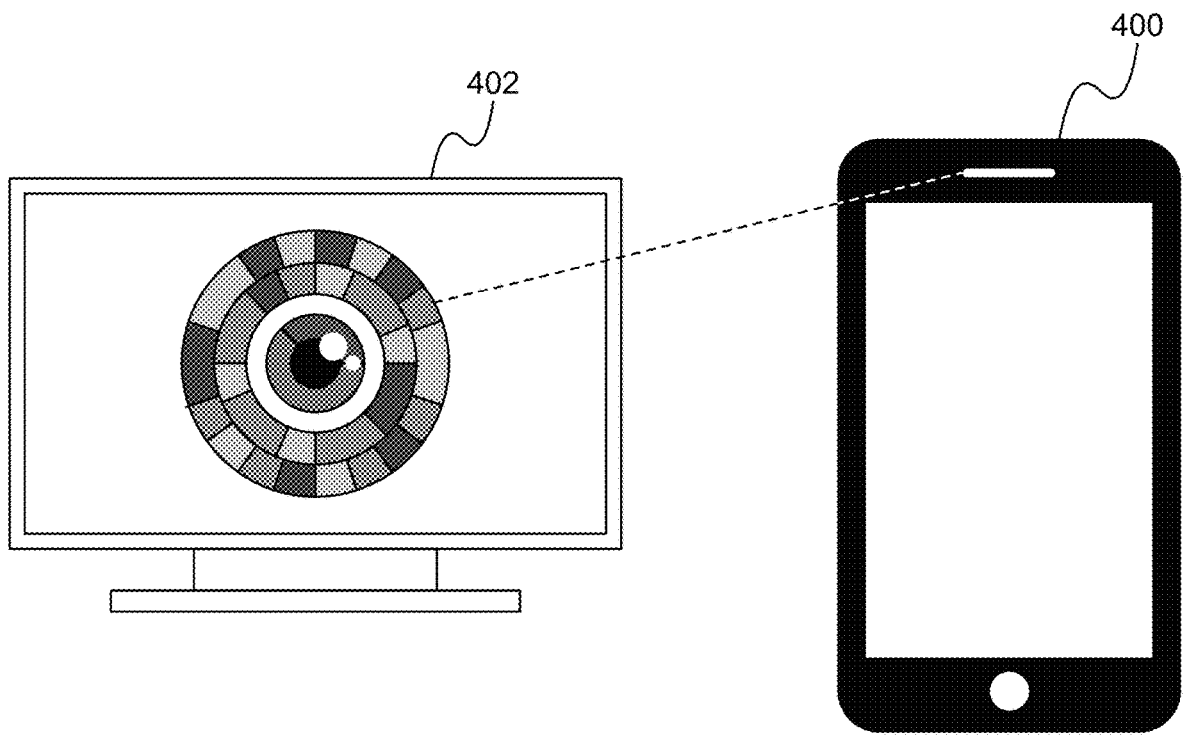
FIG. 4 illustrates a diagram of a smart device and a CyberEye multi-factor authentication according to some embodiments.

FIG. 4 illustrates a diagram of a smart device and a CyberEye multi-factor authentication according to some embodiments. As described in U.S. patent application Ser. No. 15/147,786, filed on May 5, 2016, titled: "Palette-based Optical Recognition Code Generators and Decoders" and U.S. patent application Ser. No. 15/721,899, filed on Sep. 30, 2017, titled: "AUTHENTICATION AND PERSONAL DATA SHARING FOR PARTNER SERVICES USING OUT-OF-BAND OPTICAL MARK RECOGNITION," which are incorporated by reference herein in their entireties for all purposes, a smart device 400 (e.g., smart phone) is able to utilize an application (and camera) on the smart device 400 to scan a CyberEye optical recognition code mark displayed on another device 402 (e.g., personal computer or second smart device) to perform multi-factor authentication. As described herein, the CyberEye multi-factor authentication is an application module which is composed of building block modules which transport data securely using a secure network transport, where the building block modules are composed of software code which is securely stored and accessed on the smart device 400. The CyberEye multi-factor authentication is an example of an application executable using the security platform architecture.

Figure 5:
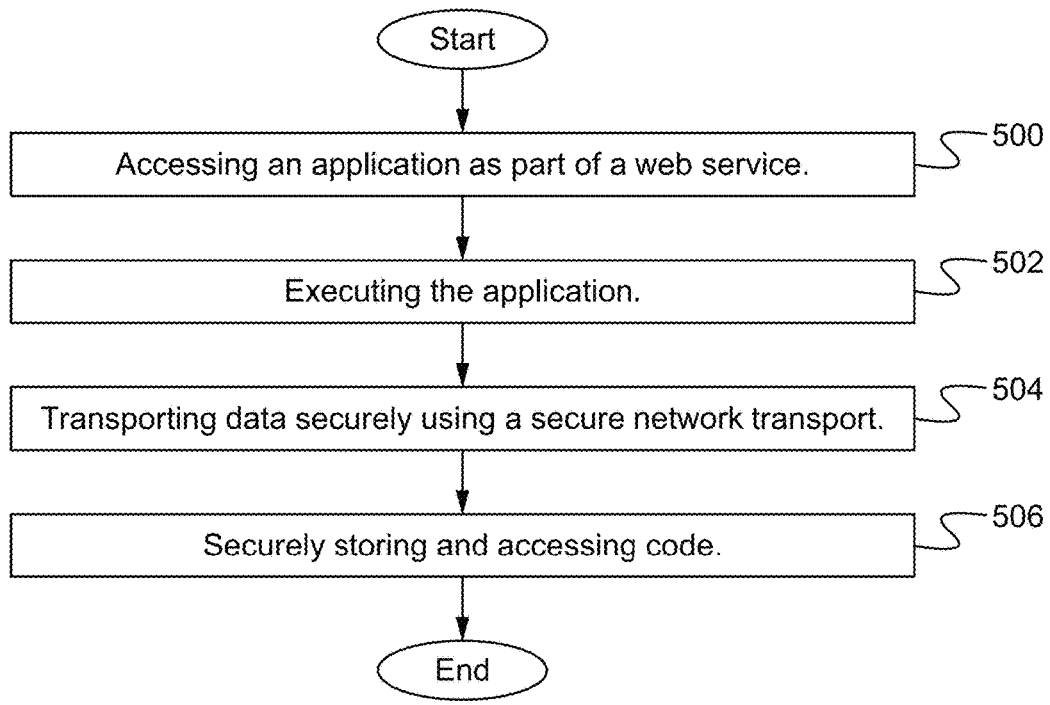
FIG. 5 illustrates a flowchart of a method of implementing a security platform architecture according to some embodiments.

FIG. 5 illustrates a flowchart of a method of implementing a security platform architecture according to some embodiments. In the step 500, an application is accessed as part of a web service such that a security orchestration server or access-hardened API is used to access the application. In the step 502, the application is executed. The application is composed of building block modules which transport data securely using a secure network transport, in the step 504. The building block modules are composed of software code which is securely stored and accessed on a device, in the step 506. Secure access involves data at rest encryption/decryption as well as data in motion encryption/decryption. In some embodiments, encryption/decryption involves quantum encryption/decryption using real numbers. In some embodiments, transporting the data includes utilizing tunneling such that the data is secure but also able to be transmitted over standard protocols. In some embodiments, fewer or additional steps are implemented. For example, in some embodiments, the application is a standalone application not accessed as part of a web service. In some embodiments, the order of the steps is modified.

Figure 6:
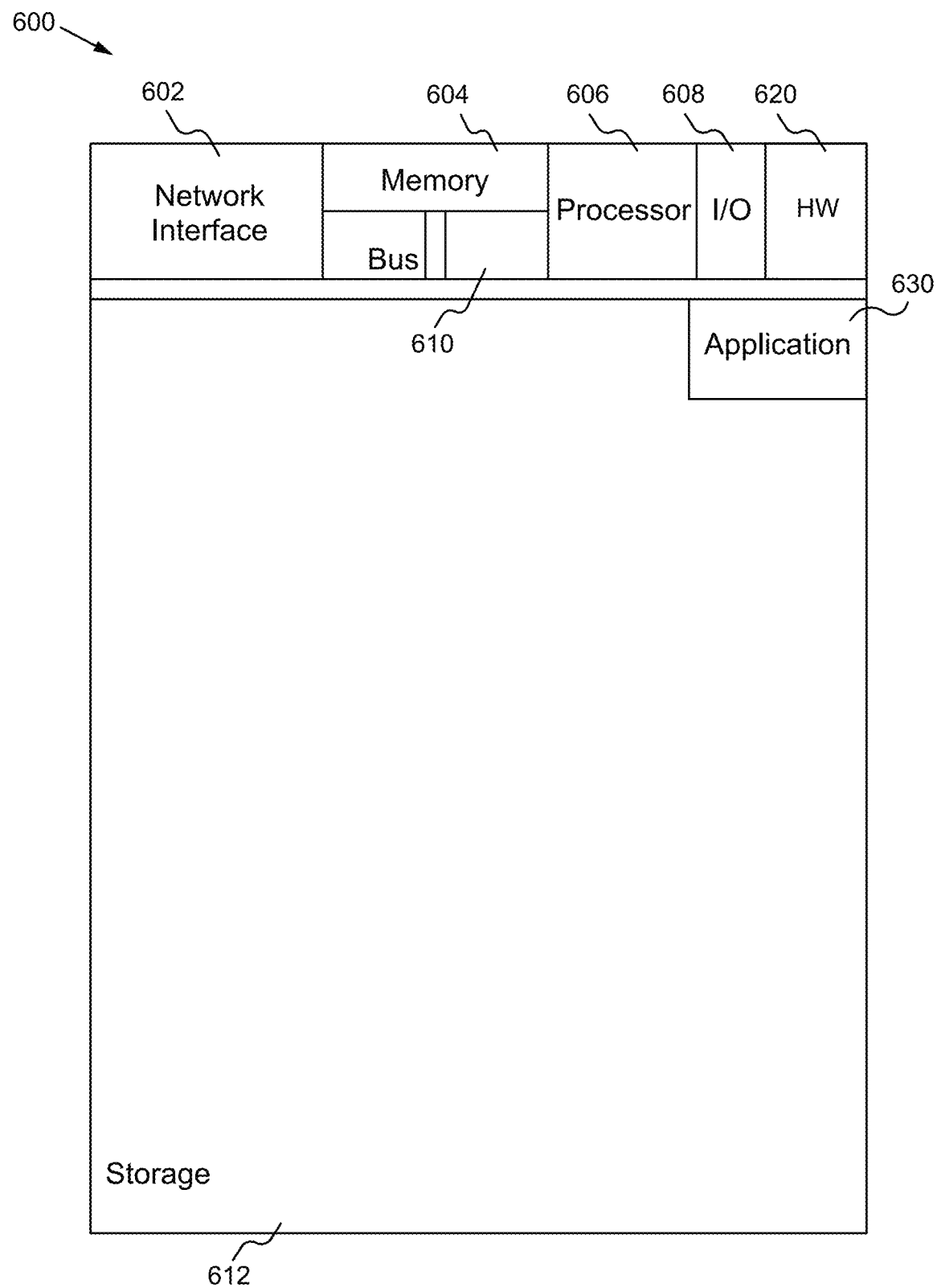
FIG. 6 illustrates a block diagram of an exemplary computing device configured to implement the security platform architecture according to some embodiments.

FIG. 6 illustrates a block diagram of an exemplary computing device configured to implement the security platform architecture according to some embodiments. The computing device 600 is able to be used to acquire, store, compute, process, communicate and/or display information. The computing device 600 is able to implement any of the security platform architecture aspects. In general, a hardware structure suitable for implementing the computing device 600 includes a network interface 602, a memory 604, a processor 606, I/O device(s) 608, a bus 610 and a storage device 612. The choice of processor is not critical as long as a suitable processor with sufficient speed is chosen. The memory 604 is able to be any conventional computer memory known in the art. The storage device 612 is able to include a hard drive, CDROM, CDRW, DVD, DVDRW, High Definition disc/drive, ultra-HD drive, flash memory card or any other storage device. The computing device 600 is able to include one or more network interfaces 602. An example of a network interface includes a network card connected to an Ethernet or other type of LAN. The I/O device(s) 608 are able to include one or more of the following: keyboard, mouse, monitor, screen, printer, modem, touchscreen, button interface and other devices. Security platform architecture application(s) 630 used to implement the security platform architecture are likely to be stored in the storage device 612 and memory 604 and processed as applications are typically processed. More or fewer components shown in FIG. 6 are able to be included in the computing device 600. In some embodiments, security platform architecture hardware 620 is included. Although the computing device 600 in FIG. 6 includes applications 630 and hardware 620 for the security platform architecture, the security platform architecture is able to be implemented on a computing device in hardware, firmware, software or any combination thereof. For example, in some embodiments, the security platform architecture applications 630 are programmed in a memory and executed using a processor. In another example, in some embodiments, the security platform architecture hardware 620 is programmed hardware logic including gates specifically designed to implement the security platform architecture.

In some embodiments, the security platform architecture application(s) 630 include several applications and/or modules. In some embodiments, modules include one or more sub-modules as well. In some embodiments, fewer or additional modules are able to be included.

In some embodiments, the security platform architecture hardware 620 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle), IoT devices or any other suitable computing device.

Figure 7:
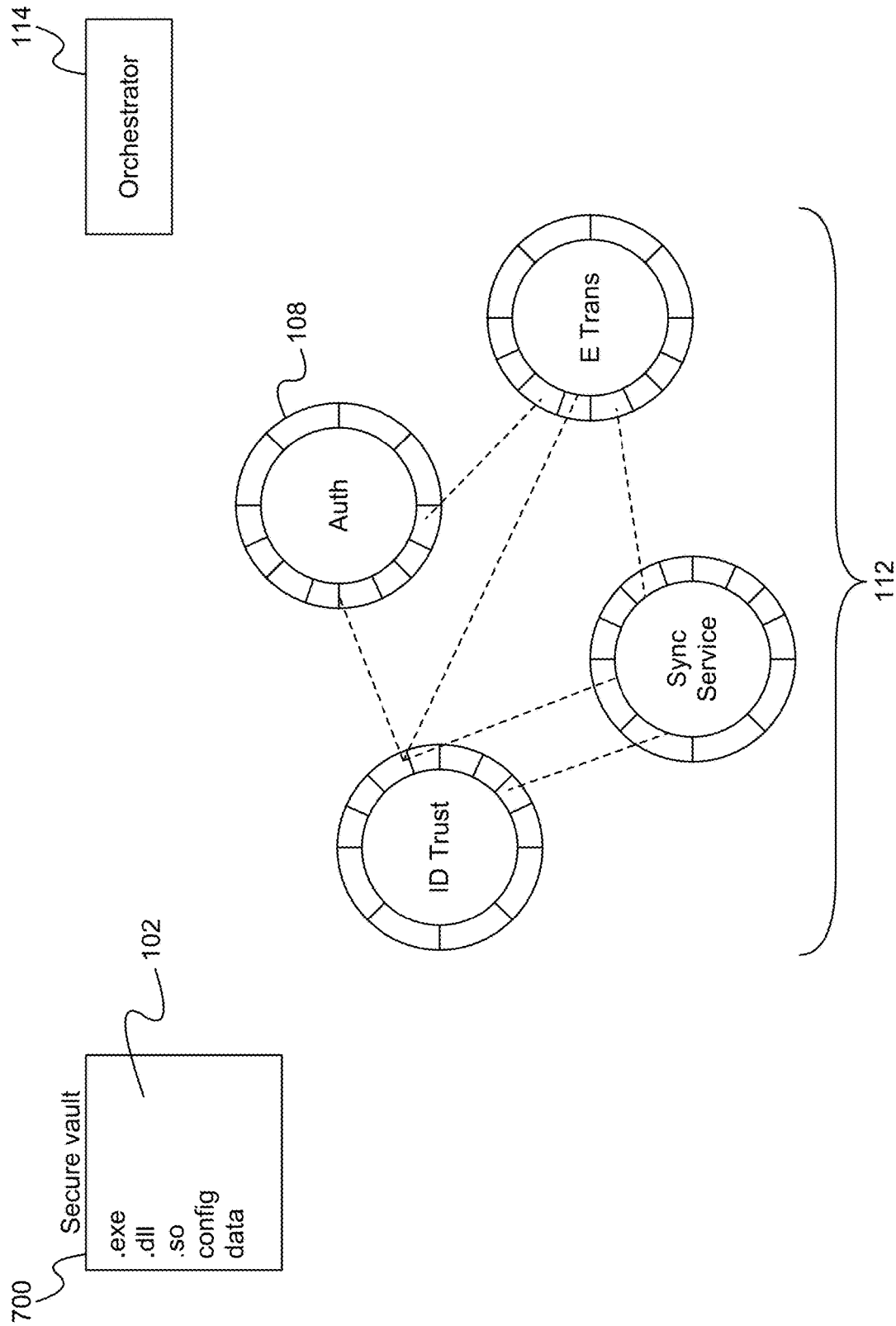
FIG. 7 illustrates a diagram of a secure application framework and platform according to some embodiments.

FIG. 7 illustrates a diagram of a secure application framework and platform according to some embodiments. The secure application framework and platform includes: a secure vault 700, a secure orchestration server 114 (also referred to as an orchestrator), and a set of building block modules 108 which form an application implemented via an access-hardened API 112. As described herein, the secure vault 700 stores the code 102 using encryption (e.g., white noise encryption) and signing, where the code 102 is used to generate/form the building block modules 108 which when organized form an application. The secure orchestration server 114 is able to control access to the code, deploy services, control one or more policies, and organize the one or more building block modules. Additional or fewer components are able to be included in the secure application framework and platform.

Figure 8:
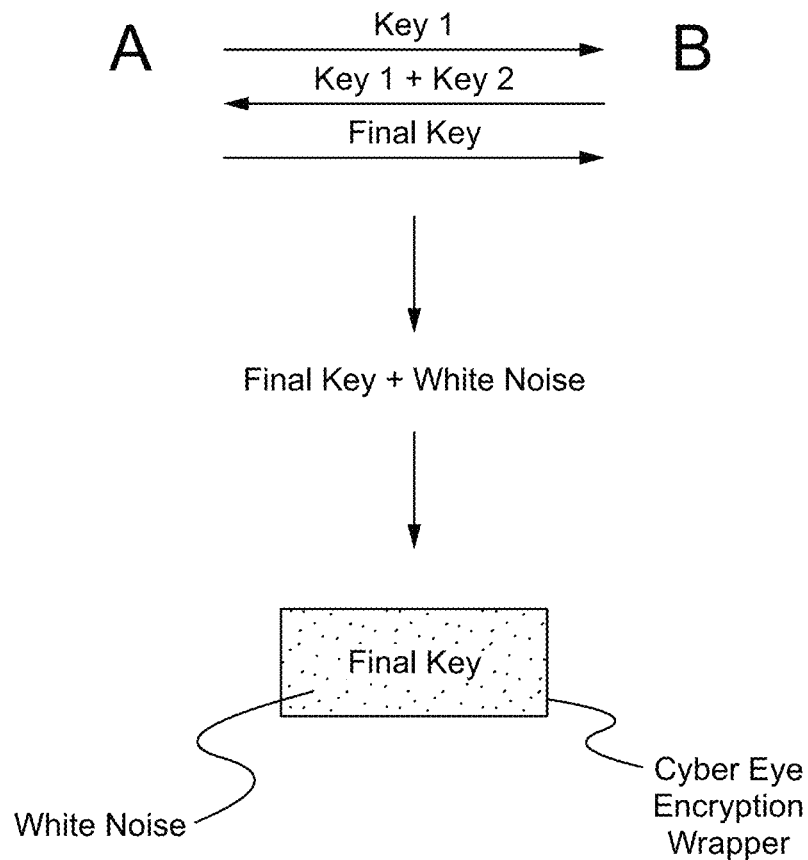
FIG. 8 illustrates a diagram of a secure key exchange through an opti-encryption channel according to some embodiments.

FIG. 8 illustrates a diagram of a secure key exchange through an opti-encryption channel according to some embodiments. Device A sends a first key to Device B, and Device B sends the first key and a second key back to Device A. Then Device A sends a final key to Device B, where the final key is based on the first key and the second key. In some embodiments, the final key is computed using the first key and the second key and one or more equations (e.g., linear equations). In some embodiments, white noise is inserted into the final key, or the final key is wrapped in white noise. In some embodiments, the keys are real numbers instead of integers.

In some embodiments, the final key is protected by optical encryption. As described herein, a user uses a camera device such as a camera on a mobile phone or tablet to scan/acquire a dynamic optical mark (e.g., CyberEye mark). The CyberEye result is wrapped around the final key. In some embodiments, the final key (with white noise) is encrypted/wrapped using the CyberEye encryption (or other opti-crypto wireless airgap encryption) information. In some embodiments, the opti-crypto key wrapper is a key encapsulation algorithm. In some embodiments, the optical encryption is used to generate the key. For example, the CyberEye result is a key or the final key which is combined with white noise.

Once the keys are passed, an encrypted communication/channel is able to be established (e.g., AES). In some embodiments, the encryption used is polymorphic, meaning the keys for the packets continuously change. In some embodiments, the encryption utilized with the encrypted communication/channel is post quantum encryption which enables quantum resistant encryption.

In some embodiments, a user's computing device is able to be used as a secure identification (e.g., ID proofing). The computing device is able to have a TPM or similar device/implementation for securing certificates. The TPM or similar implementation has break-in detection and other security measures. The computing device also includes machine learning implementations (processors/microchips). The computing device is able to include other standard components such as a CPU, one or more cameras, a screen, communication modules (e.g., Bluetooth®, WiFi, 5G, xG), and others.

ID proofing is able to prove/guarantee a user is who they claim to be. Instead of or in addition to biometric identification (e.g., fingerprint matching) and facial/voice recognition, other aspects of a user or a user's actions are able to be analyzed (e.g., behavior analysis). For example, a user's gate/stride, how the user uses his device, how the user types/swipes, and other motions/actions/transactions are able to be analyzed, compared and matched to determine if the user is the expected/appropriate user. Furthering the example, if a user typically takes short strides while using the phone and uses two thumbs to input text, then when a second user attempts to use the phone but has longer strides and uses a single finger input, then the device is able to detect that the person using the device is not the expected user (e.g., owner of the mobile phone).

A trust score is able to be generated based on the analysis. For example, as more matches are made (e.g., valid biometric input, matching stride, and matching typing performance, the trust score increases). Policies are able to implemented based on the trust score. For example, one or more thresholds are able to be utilized such that if the trust score is below a threshold, then options are limited for that user. Furthering the example, if a user has a 100% trust score, then there are no limitations on the user's use of the device, but if the user has a 50% trust score, below a money threshold, then the user is not able to perform any transactions involving money with the device, and if the user has a 5% trust score, the user is not able to access any applications of the device. Any number of thresholds are able to be used, and any limitations/consequences are able to be implemented based on the thresholds/trust score. The orchestrator described herein is able to implement these policies. In some embodiments, a risk score is implemented which is similar but inverse of the trust score.

In some embodiments, a transaction proxy is implemented. The transaction proxy is able to utilize the trust score to determine which transactions are allowed. The transactions are able to include any transactions such as logging in to a web site/social media, accessing an application (local/online), purchasing goods/services, transferring money, opening a door, starting a car, signing a document or any other transaction. In some embodiments, if a user's trust score is currently below a threshold, the device is able to perform additional tests of the user to increase their trust score (e.g., ask the user to say a word to determine a voice match). Passwords and personal information are able to be stored locally on the device (or on the Internet/cloud) for retrieval for access/comparison purposes. As described herein, the data (e.g., passwords and personal information) are able to be encrypted and backed up. For example, if the device is lost, the backup enables a user to purchase another device and retrieve all of the passwords/personal information.

In some embodiments, the implementation is or includes an extensible transaction method. For example, the device includes an application with a list of transactions (e.g., plug-ins). Once a transaction is initiated (e.g., Facebook login where Facebook password is pulled from the TPM), the transaction with all of the required information is stored as an encrypted file which is sent to a secure server proxy which is able to decrypt the file and then make the transaction. Since the transaction is able to occur using a proxy, the user is able to remain anonymous. In some embodiments, the opti-encryption implementation is able to be utilized with the secure identification implementation.

Figure 9:
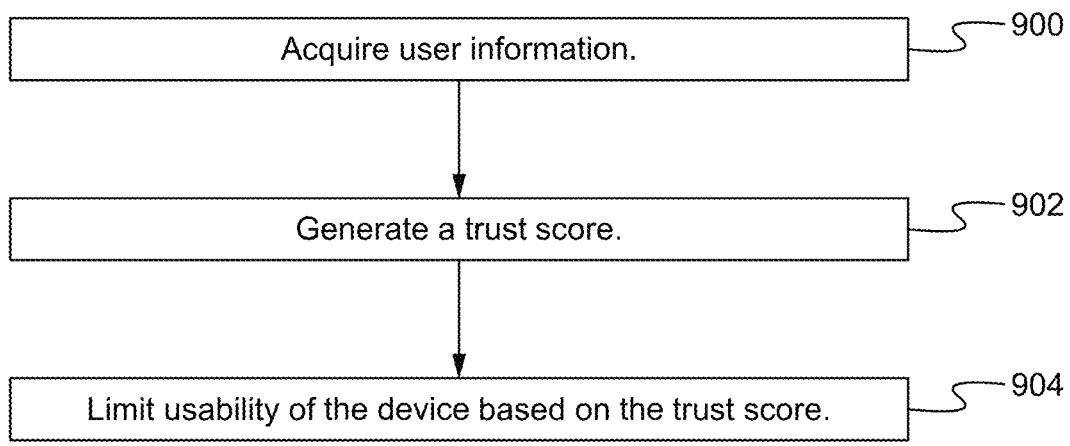
FIG. 9 illustrates a flowchart of a method of utilizing a user device as identification according to some embodiments.

FIG. 9 illustrates a flowchart of a method of utilizing a user device as identification according to some embodiments. In the step 900, user information is acquired. The user information is able to be acquired in any manner such as receiving and logging keystrokes/touches from a keyboard/digital keypad/touch screen, measuring movement using an accelerometer or other device in a mobile device, acquiring imaging information using a camera (e.g., camera phone), acquiring voice information using a microphone, and/or any other implementation described herein.

In the step 902, a trust score is generated. The trust score is generated by analyzing the acquired user information. For example, an application records (and learns) how a user types, and compares how the current input with previous input to determine similarities. Similarly, the application is able to analyze a user's stride (long, short, fast, slow) by capturing the data over periods of time for comparison purposes. The trust score is also able to be based on other information such as location, time, device information and other personal information. For example, if the device is determined to be in Mexico, and the user has never visited Mexico previously, the trust score is able to be decreased. Or if the device is being used at 3 a, when the user does not use the device after 10 p or before 6 a, then the trust score is decreased.

In the step 904, usability of the device is limited based on the trust score. For example, if the trust score is below a minimum threshold, the user may be prevented from doing anything on the device. In another example, if the user's trust score is determined to be below an upper threshold, the user may be permitted to utilize apps such as gaming apps, but is not able to use the device to make purchases, sign documents or login to social media accounts. In some embodiments, actions/transactions are classified into classes or levels, and the classes/levels correspond to ranges of trust scores or being above or below specified thresholds. For example, purchases of $10 or more and signing documents are in Class 1, and Class 1 actions are only available when a trust score is 99% or above, and purchases below $10 and social media logins are in Class 2, and Class 2 actions are available when a trust score is 80% or above.

In some embodiments, fewer or additional steps are implemented. For example, if a user's trust score is below a threshold for an action that the user wants to take, the device is able to request additional proof by the user (e.g., provide a fingerprint and/or input a secret code) to increase the user's trust score. In some embodiments, the order of the steps is modified.

Figure 10:
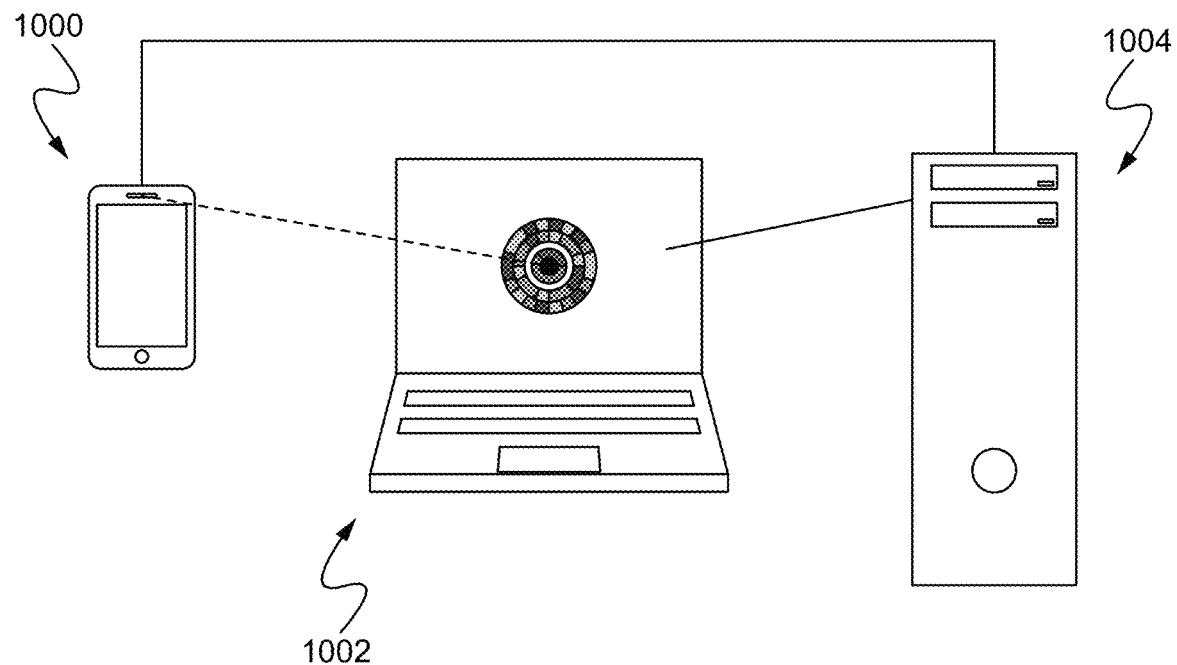
FIG. 10 illustrates a diagram of an optical encryption implementation according to some embodiments.

FIG. 10 illustrates a diagram of an optical encryption implementation according to some embodiments. As described herein, a device 1000 (e.g., smart phone) includes a camera which is able to acquire an image of a CyberEye implementation (e.g., repeating pattern) displayed in a web browser on another device 1002 (e.g., personal computer). The web browser is able to come from a server 1004 (e.g., local server). The server is able to provide authentication.

There is also a back channel from the server to the device 1000. As described herein, the device 1000 is able to be used as a user's ID.

Figure 11:
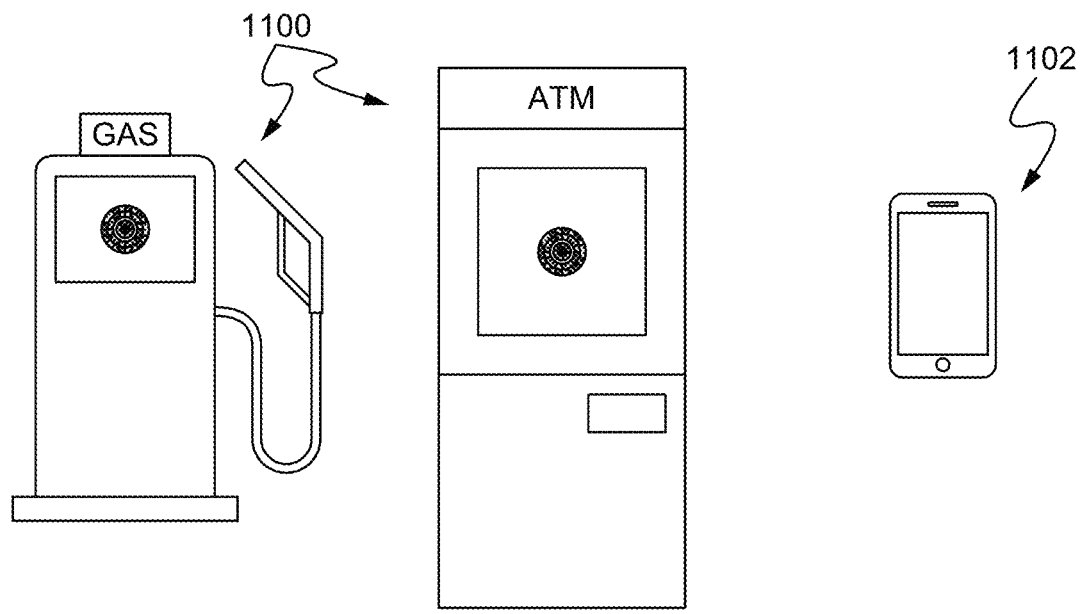
FIG. 11 illustrates a diagram of an optical encryption implementation on multiple devices according to some embodiments.

FIG. 11 illustrates a diagram of an optical encryption implementation on multiple devices according to some embodiments. The CyberEye implementation (or other optical multi-factor authentication) is able to be implemented on a gas station pump, Automated Teller Machine (ATM) machine, or any other device capable of displaying a multi-factor authentication implementation. For example, the gas station pump or ATM includes a display which is capable of displaying a web browser with a CyberEye implementation. The user is then able to use his mobile device to scan/acquire an image of the CyberEye, and then based on the ID proofing described herein, the user's device is able to authenticate payment or perform other transactions with the gas station pump, ATM or other device.

Figure 12:
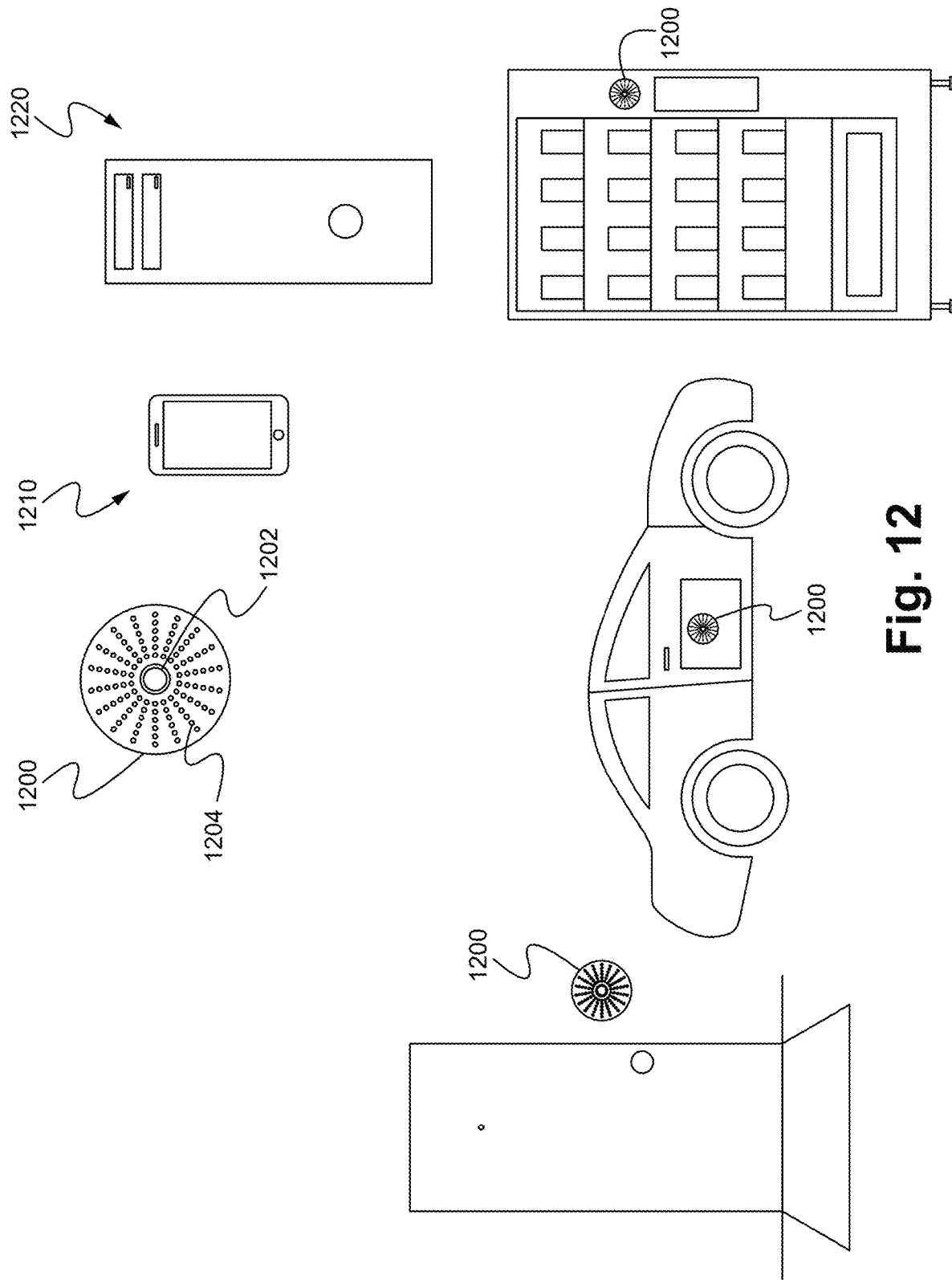
FIG. 12 illustrates a diagram of an optical encryption implementation on multiple devices according to some embodiments.

FIG. 12 illustrates a diagram of an optical encryption implementation on multiple devices according to some embodiments. In some embodiments, instead of or in addition to implementing a display with a CyberEye (or similar) implementation an embedded electronic device 1200 is utilized. The embedded electronic device 1200 includes a camera 1202 and lights 1204 (e.g., LEDs). In addition, other standard or specialized computing components are able to be included such as a processor, memory and a communication device (e.g., to communicate with WiFi).

In some embodiments, the embedded electronic device 1200 illuminates/flashes the lights 1204 in a specific pattern which a user device 1210 (e.g., smart phone) is able to scan/capture (similar to the CyberEye implementation). For example, upon the user device 1210 scanning the pattern provided by the embedded electronic device 1200, the user device 1210 (or the embedded electronic device 1200) sends an encrypted communication to perform a transaction. In some embodiments, a server 1220 determines (based on stored policies as described herein) whether the user's trust score is above a threshold to perform the transaction. For example, the user device 1210 is able to be used to unlock a house door, open a car door or purchase items at a vending machine. Furthering the example, in an encrypted communication to the server 1220 based on the scan of the embedded electronic device 1200, a transaction request to open the front door is sent to the server 1220 (either by the embedded electronic device 1200 or the user device 1210). The server 1220 compares the trust score with policies (e.g., if trust score is 99% or above, then unlock the lock; otherwise, no operation), and performs or rejects the requested transaction. For example, the server 1220 sends a communication to the embedded electronic device 1200 to unlock the lock of the door. The communication is able to be sent to a local or remote server for authentication which then communicates to the specific device (e.g., house door lock), or the communication is sent directly to the specific device (e.g., peer-to-peer communication). In some embodiments, the embedded electronic device 1200 sends the communication to a local or remote server for authentication, and then upon receiving authentication, the embedded electronic device 1200 performs the transaction. In some embodiments, the embedded electronic device 1200 communicates with the server (e.g., communicates the transaction request), and the user device 1210 communicates with the server (e.g., the user ID/trust score), and the server uses the information received from both devices to perform an action or to send a communication to perform an action, as described herein.

Figure 13:
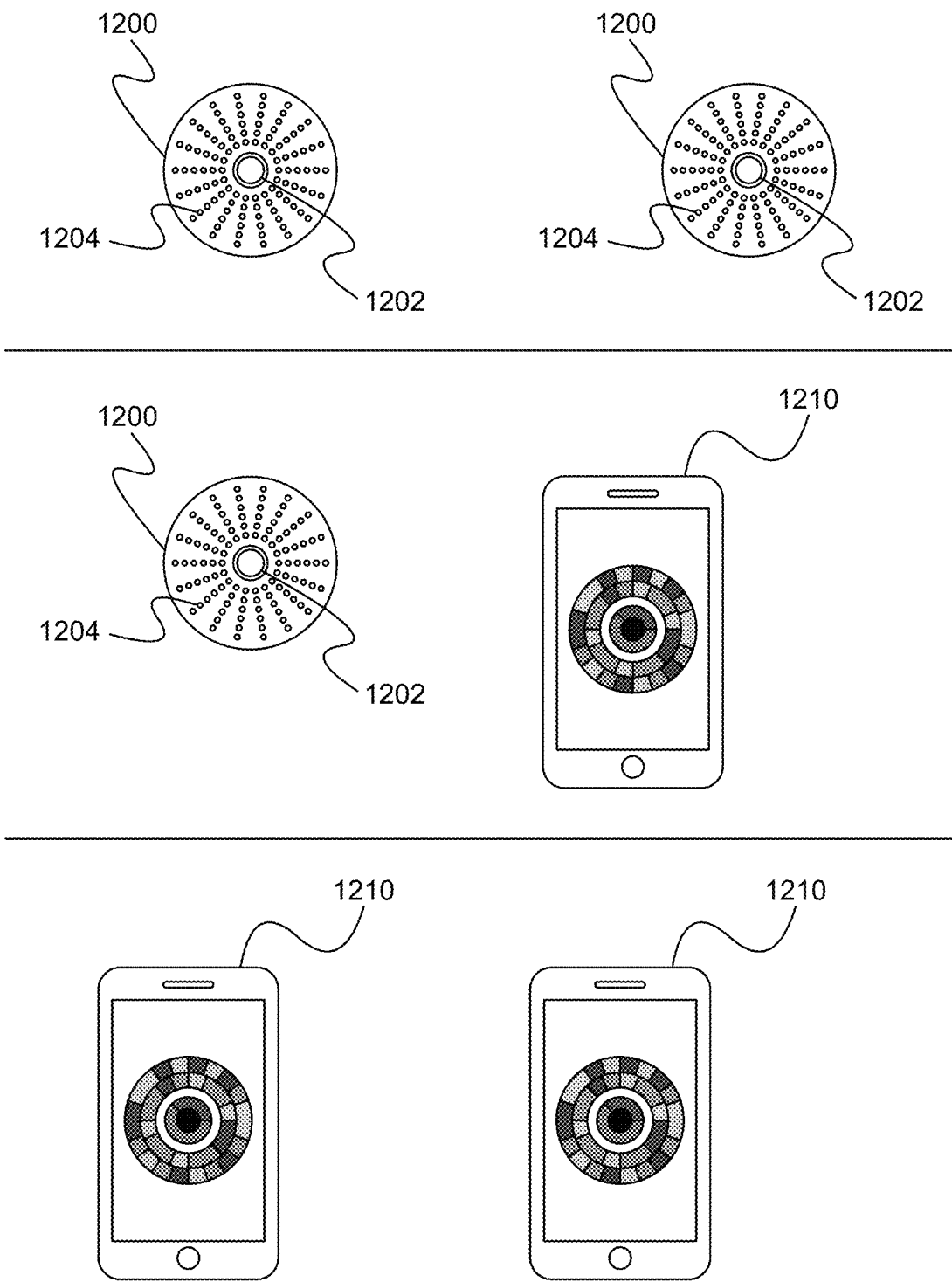
FIG. 13 illustrates a diagram of multiple embedded electronic devices and/or other devices according to some embodiments.

FIG. 13 illustrates a diagram of multiple embedded electronic devices and/or other devices according to some embodiments. In some embodiments, an embedded electronic device 1200 is able to communicate with one or more embedded electronic devices 1200. In some embodiments, an embedded electronic device 1200 is able to communicate with one or more other devices (e.g., user device 1210). In some embodiments, a user device 1210 is able to communicate with one or more other devices (e.g., user device 1210).

Since the embedded electronic device 1200 includes a camera 1202 and LEDs 1204, and a user device 1210 (e.g., mobile phone) includes a camera and a display to display a CyberEye (or similar) implementation, each is able to be used to display and acquire a unique code.

The multiple devices are able to communicate with each other and/or with a server. For example, a first user device is able to communicate with a second user device, and the second user device communicates with a server, and then provides the data received from the server to the first user device. Therefore, in some embodiments, the first user device (or embedded electronic device) does not need a connection with the server.

In some embodiments, the user device is able to replace a car key fob, since the user device is able to perform ID proofing as described herein, and is able to communicate with an embedded electronic device (e.g., a vehicle door lock/other vehicle controls). Similarly, with minimal modification, a car key fob is able to implement the technology described herein.

In some embodiments, instead of using optics for encryption (e.g., scanning a CyberEye implementation), other schemes are used such as infra-red, Bluetooth®, RFID, sonic, ultrasonics, laser, or RF/WiFi.

Figure 14:
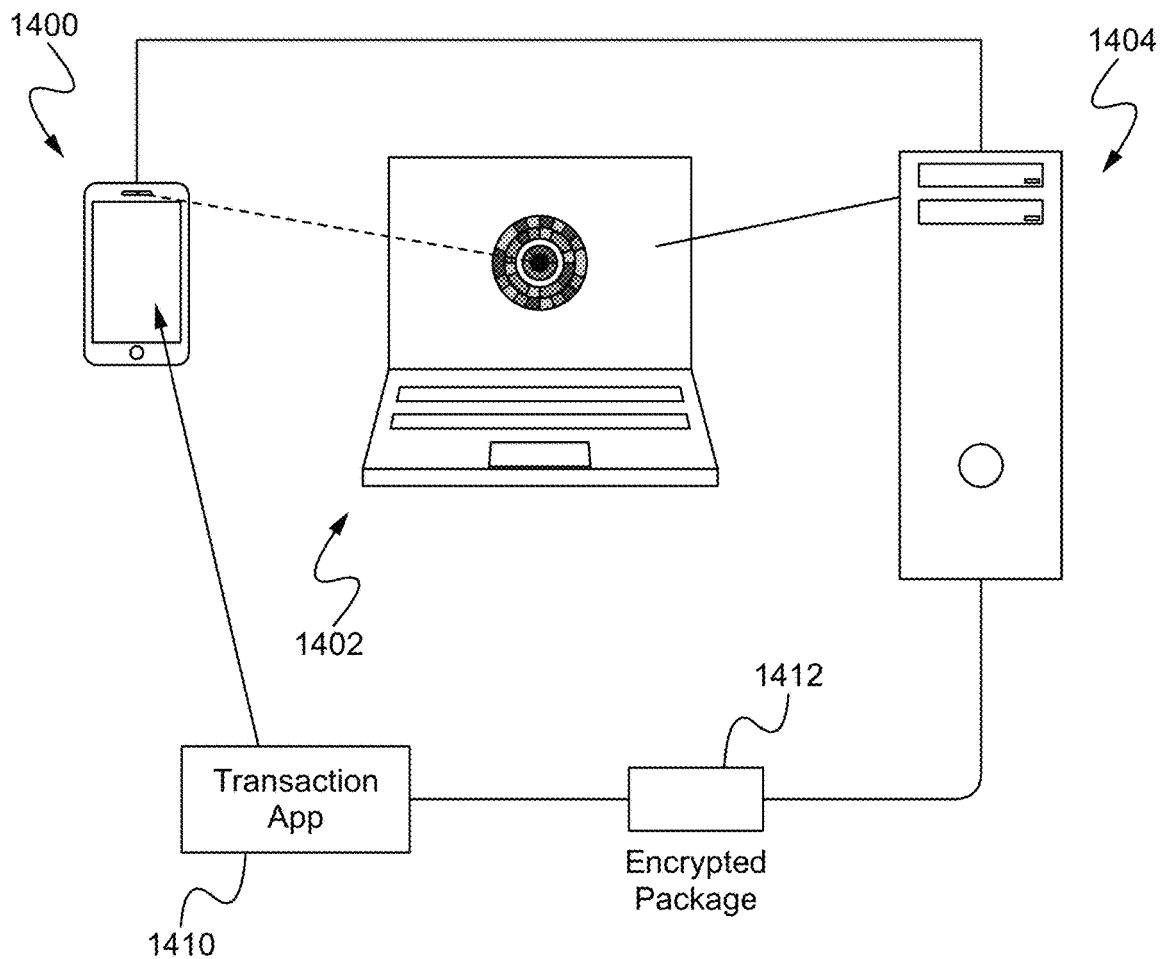
FIG. 14 illustrates a diagram of a system for electronic transactions using personal computing devices and proxy services according to some embodiments.

FIG. 14 illustrates a diagram of a system for electronic transactions using personal computing devices and proxy services according to some embodiments. A user device 1400 (e.g., smart phone) scans a CyberEye or similar implementation on a second device 1402 (e.g., personal computer or mobile device). The user device 1400 and/or the second device 1402 are able to communicate with a server 1404.

In some embodiments, the user device 1400 includes a transaction application 1410 programmed in memory. The transaction application 1410 is configured to send an encrypted package 1412 to the server 1404 based on the scan of the CyberEye or similar implementation (e.g., dynamic optical mark/code). The transaction application 1410 is able to trigger actions such as log in to a social media site, log in to a bank account, perform a monetary transfer, and/or any other transaction.

The server 1404 implements a proxy to perform the electronic transactions such as authentication, unlock door, moving money, e-signature and/or any other transaction. The transactions available through the transaction application 1410 are also added to the server 1404, such that the number of transactions is extensible. As described herein, the transactions are able to be accompanied by a trust or risk score such that if the trust/risk score is above or below a threshold (depending on how implemented), then the transaction request may be denied. By using the proxy to perform the electronic transactions, a user's anonymity and security is able to be maintained. With a transaction directly from a user device 1400, there is still potential for eavesdropping. However, as mentioned above, the transaction application 1410 sends an encrypted package/packet (e.g., token), which includes the transaction information (e.g., transaction ID, phone ID, trust score, specific transaction details such as how much money to transfer) to the server, where the proxy performs the transaction. The proxy server has secure connections to banks, Paypal, social networking sites, and other cloud servers/services. Furthermore, in some embodiments, the proxy server communication does not specify details about the user. In some embodiments, after the proxy server performs the transaction, information is sent to the user device. In some embodiments, the information sent to the user device is encrypted. For example, after the proxy server logs in to Facebook, the Facebook user page is opened on the user device.

In an example, a user receives a document to sign on the second device 1402. The user clicks the document icon to open the document, which then causes a CyberEye mark to appear. The user then scans the CyberEye mark with the user device 1400 which performs the ID proofing/authentication as described herein. The document is then opened, and it is known that the person who opened the document is the correct person. Similarly, the document is able to be signed using the CyberEye mark or a similar implementation to ensure the person signing the document is the correct person.

As described herein, a user device (e.g., mobile phone) is able to be used for ID proofing, where the user device recognizes a user based on various actions/input/behavioral/usage patterns (e.g., voice/facial recognition, stride/gate, location, typing technique, and so on). In some embodiments, potential user changes are detected. For example, if a user logs in, but then puts the device down, another user may pick up the phone, and is not the original user. Therefore, actions/situations such as putting the phone down, handing the phone to someone else, leaving the phone somewhere are able to be detected. Detecting the actions/situations is able to be implemented in any manner such as using an accelerometer to determine that the phone is no longer moving which would indicate that it was put down. Similarly, sensors on the phone are able to determine that multiple hands are holding the phone which would indicate that the phone is being handed to someone else. In some embodiments, the user device is configured to determine if a user is under duress, and if the user is under duress, the trust score is able to be affected. For example, an accelerometer of the user device is able to be used to determine shaking/trembling, and a microphone of the device (in conjunction with a voice analysis application) is able to determine if the user's voice is different (e.g., shaky/trembling). In another example, the camera of the user device is able to detect additional people near the user and/or user device, and if the people are unrecognized or recognized as criminals (e.g., face analysis with cross-comparison of a criminal database), then the trust score drops significantly (e.g., to zero).

As discussed herein, when a user attempts to perform an action/transaction where the user's trust score is below a threshold, the user is able to be challenged which will raise the user's trust score. The challenge is able to be a behavioral challenge such as walking 10 feet so the user device is able to analyze the user's gate; typing a sentence to analyze the user's typing technique; or talking for 10 seconds or repeating a specific phrase. In some embodiments, the user device includes proximity detection, fingerprint analysis, and/or any other analysis.

In some embodiments, an intuition engine is developed and implemented. The intuition engine continuously monitors a user's behavior and analyzes aspects of the user as described herein. The intuition engine uses the learning to be able to identify the user and generate a trust score.

With 5G and future generation cellular networks, user devices and other devices are able to be connected and accessible at all times, to acquire and receive significant amounts of information. For example, user device locations, actions, purchases, autonomous vehicle movements, health information, and any other information are able to be tracked, analyzed and used for machine learning to generate a behavioral fingerprint/pattern for a user.

In some embodiments, when a user utilizes multiple user devices, the user devices are linked together such that the data collected is all organized for the user. For example, if a has a smart phone, a smart watch (including health monitor), and an autonomous vehicle, the data collected from each is able to be stored under the user's name, so that the user's heart beat and driving routes and stride are able to be used to develop a trust score for when the user uses any of these devices.

To utilize the security platform architecture, a device executes an application which is composed of building block modules which transport data securely using a secure network transport, where the building block modules are composed of software code which is securely stored and accessed on the device. In some embodiments, the application is accessed as part of a web service such that a security orchestration server or access-hardened API are used to access the application. The security platform architecture is able to be implemented with user assistance or automatically without user involvement.

In operation, the security platform architecture provides an extremely secure system capable of providing virtually tamper-proof applications.

The security platform architecture implements/enables: a unique Opti-crypto wireless airgap transport, a personal smart device—intelligent ID proofing, secure extensible electronic transaction framework, blockchain integration and functionality, anonymous authentication and transaction technology, post quantum encryption at rest and in motion, secure private key exchange technology, secure encryption tunneled in TLS, high-throughput, low-latency transport performance, low overhead transport for low power FOG computing applications such as IOT, RFID, and others.

The security platform architecture is able to be utilized with:
   Consumer applications such as games, communications, personal applications;
   Public Cloud Infrastructure such as SAAS front-end security, VM-VM, container-container security intercommunications;
   Private Cloud/Data Centers such as enhanced firewall, router, edge security systems;
   Telco Infrastructures such as CPE security, SDN encrypted tunnels, MEC edge security and transports, secure encrypted network slicing; and
   5G New Market Smart Technologies such as smart machine security (sobots, autonomous vehicles, medical equipment).

The security platform includes infrastructure building blocks:
   Client devices:
   smart personal devices, IoT devices, RFID sensors, embedded hardware, smart machines;
   Client functions:
   ID proofing (trust analysis), CyberEye wireless transport, extensible electronic transaction clients, content and data loss security management, authorization client;
   Transport functions:
   Post-quantum data encryption technology, data-in-motion transport, data-at rest encryption, quantum tunnel through SSL/TLS, private-private secure key exchange, high-performance, low latency, low compute transport, TPM key management, SSL inspection;

Central server functions:

AAA services, federation gateway, electronic transactions server, adaptive authentication services, ID proofing services, user registration services, CyberEye transport server.

The security platform architecture is able to be used in business:

5G encrypted network slicing, electronic stock trading, vending machine purchasing interface, vehicle lock and security interfaces, anonymous access applications, Fog computing security transport (IoT to IoT device communications), SSL inspection security (decryption zones), generic web site/web services login services, MEC (mobile/multi-access edge gateway transport and security), cloud network backbone security firewalls (rack to rack FW), Office 365 secure login, low power IoT sensors, password management with single sign-on, high-security infrastructures requiring out-of-band or air gap enhanced access, or VM-to-VM (or containers) secure communications transport.

In some embodiments, device hand off identification proofing using behavioral analytics is implemented. For example, a device (e.g., mobile phone) detects when the device leaves a user's possession (e.g., put down on table, handed to another person). Based on the detection, when the device is accessed again, determination/confirmation that the user is the correct user is performed. In some embodiments, even if the device has not been placed in a locked mode (e.g., by a timeout or by the user), the device automatically enters a locked mode upon detecting leaving the user's possession.

Figure 15:
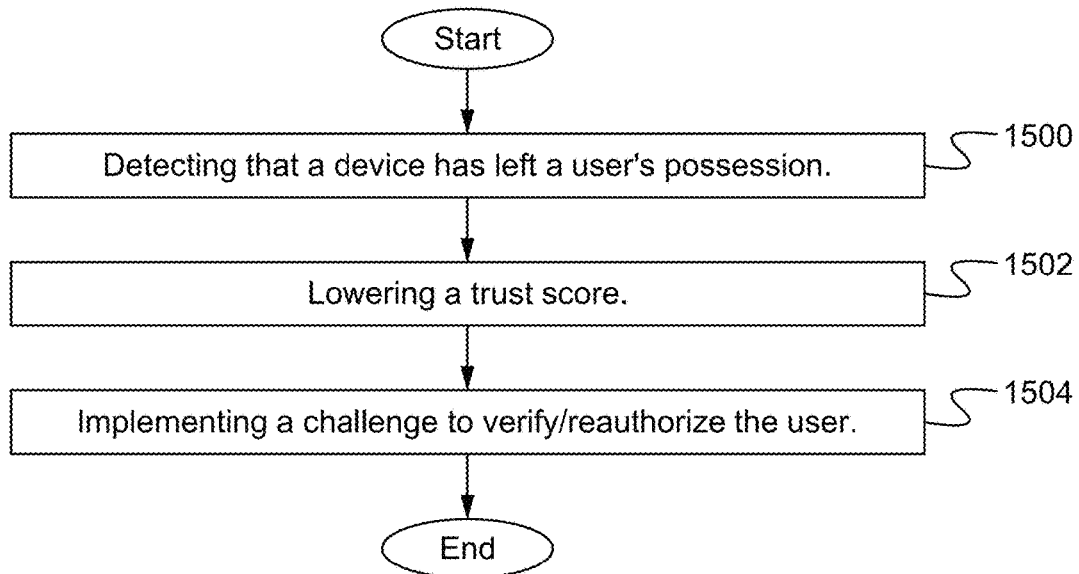
FIG. 15 illustrates a flowchart of a method of device hand off identification proofing using behavioral analytics according to some embodiments.

FIG. 15 illustrates a flowchart of a method of device hand off identification proofing using behavioral analytics according to some embodiments. In the step 1500, a device detects that the device has left a user's possession. The device is able to be any device described herein (e.g., a mobile phone). Detecting that the device is not longer in the user's possession is able to be performed in any manner such as detecting that the device has been set down or handed off to another user. Other causes of a change in the user's possession are able to be detected as well such as a dropped device. In some embodiments, continuous monitoring of the device's sensors is implemented for detection, and in some embodiments, the sensors provide information only when triggered, or a combination thereof.

Detecting the device has been set down is able to be performed using a sensor to detect that the device is stationary, using a proximity sensor, or any other mechanism. For example, one or more accelerometers in the device are able to detect that the device is in a horizontal position and is not moving (e.g., for a period of time above a threshold), so it is determined to have been set down. Determining the device has been set down is able to be learned using artificial intelligence and neural network training. For example, if a user typically props up his device when he sets it down, the general angle at which the device sits is able to be calculated/determined and recorded and then used for comparison purposes. In another example, the device includes one or more proximity sensors which determine the proximity of the device to another object. For example, if the proximity sensors detect that the object is immediately proximate to a flat surface, then the device has been determined to have been set down. In some embodiments, multiple sets of sensors work together to determine that the device has been set down. For example, the accelerometers are used to determine that the device is lying horizontally, the proximity sensors are used to determine that the device is proximate to an object, and one or more motion sensors detect that the device has not moved for 3 seconds. The cameras and/or screen of the device are able to be used as proximity sensors to determine an orientation and/or proximity of the device to other objects. The microphone of the device is able to be used as well (e.g., to determine the distance of the user's voice and the changes of the distances, in addition to possibly the distance and/or changes of distance of another person's voice). For example, if the user's voice is determined to be from a distance above a threshold (e.g., based on acoustic analysis), then it is able to be determined that the user has set the device down.

The process of setting a device down is able to be broken up and analyzed separately. For example, some users may place a device down in a certain way, while other users may make certain motions before putting the device down. Furthering the example, the steps of setting the phone down are able to include: retrieving the device, holding the device, moving the device toward an object, placing the device on the object, and others. Each of these steps are able to be performed differently, so breaking down the process of setting down the device in many steps may be helpful in performing the analysis/learning/recognition of the process. In some embodiments, the steps are, or the process as a whole is, able to be classified for computer learning. For example, one class of setting the phone down is labeled "toss," where users throw/toss their device down which is different from "gentle" where users gently/slowly place their device down. The "toss" versus "gentle" classifications are able to be determined as described herein such as based on the accelerometer and/or gyroscope information. In another example, some users hold the device vertically before placing it down, while others hold it horizontally, or with one hand versus two hands. The classifications are able to be used for analysis/comparison/matching purposes. Any data is able to be used to determine the device being set down (e.g., movement, proximity, sound, scanning/video, shaking, touch, pressure, orientation and others) using any of the device components such as the camera, screen, microphone, accelerometers, gyroscopes, sensors and others.

Detecting the device has been handed off is able to be performed in any manner. For example, sensors on/in the device are able to detect multiple points of contact (e.g., 4 points of contact indicating two points from one user's hand and two points from a second user's hand, or a number of points above a threshold). In another example, the accelerometers and/or other sensors (e.g., proximity sensors) are able to analyze and recognize a handoff motion (e.g., the device moving from a first position and moving/swinging outward to a second position, or side-to-side proximity detection). In some embodiments, a jarring motion is also able to be detected (e.g., the grab by one person of the device from another person). The handoff motion/pattern is able to be learned using artificial intelligence and neural network training. In some embodiments, motions/movements from many different users are collected and analyzed to determine what movements are included in a handoff. Furthermore, each user's movements are able to be analyzed separately to determine a specific handoff for that user. For example, User A may hand off a device to another user in an upright position after moving the device from his pocket to an outreached position, while User B hands off a device in a horizontal position after moving the device in an upward motion from the user's belt.

Each separate aspect of the movement is able to be recorded and analyzed as described herein to compile motion information for further pattern matching and analysis. For example, the hand off motion is able to be broken down into separate steps such as retrieval of the device by a first person, holding of the device, movement of the device, release of the device, and acquisition of the device by the second person. Each of the separate steps are able to be recorded and/or analyzed separately. Each of the separate steps are, or the process as a whole is, able to be classified/grouped which may be utilized with computer learning and/or matching. Any data is able to be used to determine a handoff (e.g., movement, proximity, sound, scanning/video, shaking, touch, pressure, orientation and others) using any of the device components such as the camera, screen, microphone, accelerometers, gyroscopes, sensors and others.

Similarly, other changes of a user's possession are able to be detected such as the device being dropped. For example, the accelerometers are able to detect rapid movement followed by a sudden stop or slight reversal of movement. Similar to the hand off and set down, dropping and other changes of possession are able to be analyzed and learned.

In the step 1502, a trust score drops/lowers (e.g., to 0) after detection of a loss of possession. As described herein, the trust score of the user determines how confident the device is that the person using the device is the owner of the device (e.g., is the user actually User A). In some embodiments, factors are analyzed to determine the amount the trust score drops. For example, if the device is set down for a limited amount of time (e.g., less than 1 second), then the trust score is halved (or another amount of reduction). If the device is set down for a longer amount of time (e.g., above a threshold), then the trust score drops by a larger amount (or to 0). In another example, if the device is handed off, the trust score drops (e.g., to 0). In some embodiments, in addition to the trust score dropping, the device enters a locked/sleep mode.

In some embodiments, a device has different trust scores for multiple users. For example, if a family uses the same mobile phone—Mom, Dad, Son and Daughter each have different recognizable behaviors (e.g., motion/typing style) to determine who is currently using the phone. Each user has an associated trust score as well. For example, a device may have a trust score of 0 after being set down, but then after the device is picked up, it is determined that Mom is using the device, so her trust score is elevated (e.g., 100), but after a handoff, the trust score goes to 0, until it is determined that Dad is using the device, and his trust score is elevated (e.g., 100). In some embodiments, certain users have certain capabilities/access/rights on a device. For example, if the device detects Mom or Dad, then purchases are allowed using the device, but if Son or Daughter are detected, the purchasing feature is disabled.

In the step 1504, a challenge is implemented to verify/re-authorize the user. The challenge is able to include biometrics, a password request, a question challenge, favorite image selection, facial recognition, 3D facial recognition and/or voice recognition. In some embodiments, the device performs behavioral analytics as described herein to determine if the user is the owner/designated user of the device. For example, analysis is performed on the user's movements of the device, touch/typing techniques, gait, and any other behaviors. Based on the behavioral analytics, the trust score may rise. For example, if the behavioral analytics match the user's behaviors, then the trust score will go up, but if they do not match, it is determined that the device is being used by someone other than the user, and the trust score stays low or goes down. In some embodiments, the challenge enables initial access to the device, but the user's trust score starts low initially (e.g., 50 out of 100), and then based on behavioral analytics, the trust score rises.

In some embodiments, fewer or additional steps are implemented. In some embodiments, the order of the steps is modified.

In some embodiments, an automated transparent login without saved credentials or passwords is implemented. In the past, a device's browser could save a user's login and password information. However, this is a very vulnerable implementation, and once a hacker or other malicious person acquires the user's login and password information, the hacker is able to perform tasks with the user's account just as the user could, and potentially steal from an online bank account or make purchases on an online shopping site. Using a trust score and behavioral analytics, logging in to websites and other portals is able to be implemented automatically.

FIG. 16 illustrates a flowchart of a method of an automated transparent login without saved credentials or passwords according to some embodiments. In the step 1600, a trust score is determined using behavioral analytics as described herein. For example, based on user movement, typing style, gait, device possession, and so on, a trust score is able to be determined. Furthering the example, the closer each analyzed aspect of the user (e.g., gait) is to the stored user information, the higher the trust score. In another example, if the user typically types on his device using his thumbs, and the current person using the device is using his index finger, then the trust score is adjusted (e.g., lowered). In contrast, if the user has a distinct gait (e.g., typically walks with the device in his hand, while he swings his arms moderately), and the device detects that the current person walking with the device in his hand while swinging his arms moderately, the trust score increases.

In some embodiments, in addition to a trust score, a confidence score is determined for the user/device. In some embodiments, the confidence score for a user is based on the trust score and a risk score. In some embodiments, the risk score is based on environmental factors, and the trust score is based on behavioral factors. In some embodiments, the confidence score goes up when the trust score goes up, and the confidence score goes down when the risk score goes up. Any equation for the confidence score is possible, but in general as the trust increases, the confidence increases, but as the risk increases the confidence decreases.

In the step 1602, a multi-factor authentication (MFA) application is executed. The MFA application is able to be running in the foreground or the background. The MFA application is able to be implemented in a secure, isolated space as described herein to prevent it from being compromised/hacked. In some embodiments, the MFA application includes aspects (e.g., operations) to acquire information to determine the trust, risk and confidence scores. For example, the trust score and risk scores each have multiple factors which go into determining their respective scores which are used to determine the confidence score which is further used for authenticating a user.

In some embodiments, the MFA application utilizes the confidence score analysis and additional user verification implementations. For example, CyberEye (also referred to as CypherEye) application/technology is able to be executed with the device. In some embodiments, the MFA application and/or CypherEye application is used as a login authority. The MFA login or CypherEye login looks like a local login, but instead a hash (or other information) is sent to a backend mechanism. In some embodiments, the MFA application uses the CypherEye information in conjunction with the confidence score. In some embodiments, a challenge is implemented (e.g., a request for the user to perform a CypherEye operation) for additional verification/qualification. For example, if a user's confidence score is below a threshold, then the user is challenged with a CypherEye request to acquire a CypherEye mark with his device. In another example, a user is able to log in using the MFA application which gives the user access to basic phone functions (e.g., using Facebook), but to access banking/trading applications or web sites, the user is presented a challenge (e.g., security question, password, CypherEye acquisition using camera) for further verification.

In some embodiments, the challenge is only presented if the confidence score is not above a threshold. For example, if the user has a confidence score of 99 out of 100 on the device, then the user is not requested to perform additional authentication measures to gain access to web sites or applications. However, if the user has a confidence score of 50 out of 100, then additional authentication measures are utilized before access is given to certain web sites or applications. For example, although the user logged in using the MFA application, the device or system determined that the same user logged in (or attempted to) using a different device 500 miles away. The risk score is elevated since one of the log in attempts was likely not from a valid user, so the confidence score was lowered. A challenge may be presented in this situation.

In some embodiments, the MFA application is used in conjunction with a login/password. For example, a browser presents a web page for a user to input login information and a corresponding password as well as MFA information (e.g., a scanned CypherEye code/mark).

In some embodiments, the MFA application is a plugin for the browser.

In the step 1604, the MFA application (or plugin) contacts a server and/or backend device (e.g., Visa or PayPal) based on the MFA information (e.g., behavioral information or other acquired information). For example, the MFA application sends the confidence score as determined In another example, the MFA application sends the acquired information to the server for the server to determine the confidence score. In some embodiments, the confidence score is utilized by the server such that if the confidence score is above a threshold, the server contacts the backend device with the user login information. Furthering the example, the server stores user login/password information to the backend device, and once the user is verified by the server based on the MFA information, then the server communicates the login/password information with the backend device to gain access for the user device. The MFA application and/or the server are able to implement a proxy authentication or other implementation to gain access to the backend device. In some embodiments, the MFA application acts as a proxy server, if the confidence score of the user is above a threshold (e.g., 90 out of 100).

In the step 1606, login authorization is provided by a backend device (e.g., allow the user to access a web page populated with the user's specific information (e.g., bank account information)). For example, the server (or proxy server) provides a login request with the appropriate credentials, and the backend device accepts the request and allows access to the service, or rejects the request and denies access to the service. In some embodiments, the server sends a hash or other code which identifies the user and indicates the user has been validated/authorized by the server to the backend device, and in some embodiments, the server sends identification information and verification information to the backend device, and the backend device performs the verification/authentication. In some embodiments, fewer or additional steps are implemented. In some embodiments, the order of the steps is modified.

FIG. 17 illustrates a diagram of a system configured for implementing a method of an automated transparent login without saved credentials or passwords according to some embodiments. A device 1700 utilizes an authentication implementation (e.g., MFA) to ensure a confidence score of the user is above a threshold (e.g., the device is confident that the user is who he says he is). In some embodiments, the authentication information is based on the confidence score, and if the confidence score is above a threshold, no further information is needed, meaning the user does not need to enter login/password information or additional MFA information (e.g., satisfy a challenge). As described herein, the user's device with a confidence score above a threshold identifies the user as the correct user.

In some embodiments, MFA includes behavioral analytics, where the device continuously analyzes the user's behavior as described herein to determine a trust score for the user. The device (or system) determines a risk score for the user based on environmental factors such as where the device currently is, previous logins/locations, and more, and the risk score affects the user's confidence score. In some embodiments, the scan of a dynamic optical mark is only implemented if the user's trust score (or confidence score) is below a threshold. For example, if a user has been continuously using his device as he normally does, his gait matches the stored information, and his resulting trust score is 100 (out of 100) and there have been no anomalies with the user's device (e.g., the risk score is 0 out of 100), then there may be no need for further authentication/verification of the user.

In some embodiments, the authentication implementation utilizes additional MFA information. For example, for additional MFA information, the user utilizes the device's camera to scan a dynamic optical code/mark which is displayed on a secondary device 1702. In another example, a challenge requests the user to input a login and password for a site (e.g., a bank site).

After a user attempts to log in (e.g., clicks a link/button to log into a banking web page), the device 1700 sends a communication (e.g., an access/login request) via a quantum resistant encryption transport 1704 (or another transport) to a server device 1706. The server device 1706 then communicates the request/authentication information to a backend device 1708 (e.g., company device) which provides access to the desired services/information (e.g., log in to a web page with bank account information). Depending on the implementation, different information may be sent from the device 1700 to the server device 1706, and from the server device 1706 to the backend device 1708. For example, the device 1700 may send the acquired MFA information and/or a confidence score to the server device 1706. In another example, the server device 1706 may send a hash for access for a specific user login. The server device 1706 may send the login information and an associated request possibly accompanied by the confidence score. The server device 1706 may send any other data to trigger an access request for a specific user, including or not, an indication that the user should gain access to the backend service/device. The server device 1706 and the backend device 1708 are able to communicate in any manner, using any standard, and via any APIs.

The backend device 1708 is able to utilize standard login/access protocols such as OATH2, SAML, Kerberos and others. The backend device 1708 provides the login authorization (or not) back to the server device 1706 depending on the authentication information. The server device 1706 provides the authorization acceptance to the device 1700 enabling access to the web page. In some embodiments, the server device 1706 acts as a proxy server as described herein. In some embodiments, the server device 1706 performs the authentication verification and does not send the request to the backend device 1708 unless the authentication verification is determined to be true (e.g., user is verified as authentic). In some embodiments, the backend device 1708 communicates the authorization directly with the device 1700. In some embodiments, the implementation described herein is a single sign-on mechanism. By utilizing MFA as described herein, a user will no longer need to store login and password information in his browser.

In some embodiments, automated identification proofing using a random multitude of real-time behavioral biometric samplings is implemented. Single behavioral analysis is susceptible to hacking or spoofing with pre-recorded or eavesdropped data. For example, human speech may be recorded surreptitiously; or human motions (e.g., gait) may be recorded from a compromised personal device or hacked if stored on a central source. Using multiple behavioral biometric mechanisms, sampled randomly, is much more difficult to spoof. The larger number of biometric sensors and analytics employed greatly increases the security for authentication against either human hacking or robotic threats.

As described herein, Multi-Factor Authentication (MFA) is able to be based on possession factors, inheritance factors, and knowledge factors.

Figure 18:
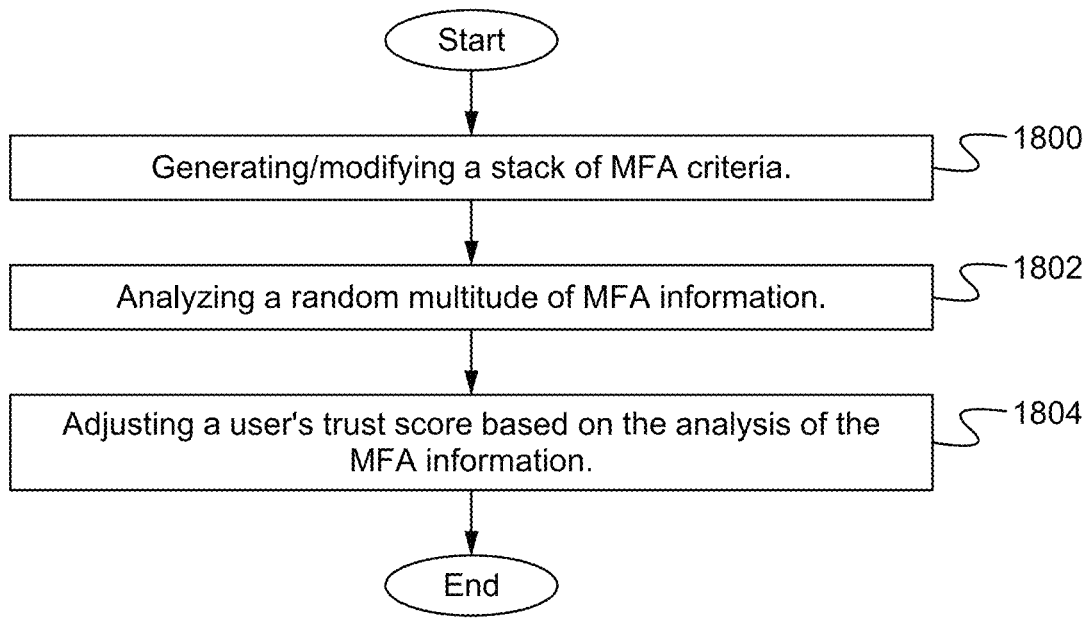
FIG. 18 illustrates a flowchart of a method of implementing automated identification proofing using a random multitude of real-time behavioral biometric samplings according to some embodiments.

FIG. 18 illustrates a flowchart of a method of implementing automated identification proofing using a random multitude of real-time behavioral biometric samplings according to some embodiments. In the step 1800, a stack (or other structure) of MFA criteria is generated or modified. MFA information is able to be stored in a stack-type structure such that additional MFA criteria are able to be added to the stack. For example, initially, MFA analysis utilizes voice recognition, facial recognition, gait and typing style. Then, fingerprints and vein patterns are added to the stack so that more criteria are utilized for determining a trust score of a user. In some embodiments, a user selects the MFA criteria, and in some embodiments, a third party (e.g., phone maker such as Samsung, Apple, Google, or a software company or another company) selects the MFA criteria. The stack of MFA criteria is able to be modified by removing criteria. For example, if it has been determined that a user's fingerprint has been compromised, then that criterion may be removed and/or replaced with another criterion for that user.

In the step 1802, a random multitude of MFA information is analyzed. The MFA information is able to be based on: possession factors, inheritance factors, and knowledge factors. Possession factors are based on what the user possesses (e.g., key card, key FOB, credit/debit card, RFID, and personal smart devices such as smart phones, smart watches, smart jewelry, and other wearable devices). The personal smart devices are able to be used to perform additional tasks such as scanning/acquiring a dynamic optical mark/code using a camera. Inheritance factors are based on who the user is (e.g., biometrics such as fingerprints, hand scans, vein patterns, iris scans, facial scans, 3D facial scans, heart rhythm, and ear identification, and behavioral information such as voice tenor and patterns, gait, typing style, web page selection/usage). Knowledge factors are based on what a user knows (e.g., passwords, relatives' names, favorite image, previous addresses and so on).

Analysis of the MFA criteria is as described herein. For example, to analyze a user's gait, the user's gait information is stored, and the stored data points are compared with the current user's gait using motion analysis or video analysis. Similarly, a user's typing style is able to be captured initially during setup of the device, and then that typing style is compared with the current user's typing style. The analysis of the MFA criteria is able to occur at any time. For example, while the user is utilizing his device, the device may be analyzing his typing style or another criterion (possibly without the user knowing). Additionally, there are particular instances which trigger when the MFA criteria is analyzed, as described herein. For example, when it is detected that the device has left the user's possession, MFA analysis is performed upon device use resumption.

In some embodiments, the stack includes many criteria, but only some of the criteria are used in the analysis. For example, although 6 criteria are listed in a stack, the user has not provided a fingerprint, so that criterion is not checked when doing the analysis.

The MFA analysis is able to include challenges based on the trust score and/or an access request. Multiple thresholds are able to be implemented. For example, if a user's trust score is below 50%, then to perform any activities using the device, the user must solve a challenge (e.g., input a password, select a previously chosen favorite image, provide/answer another personal information question). Answering/selecting correctly boosts the user's trust score (the boost is able to be a percent increase or to a specific amount). In another example, if the user's trust score is above 50% but below 90%, the user is able to access lower priority applications/sites, but would be required to answer one or more challenges to raise the trust score above 90% to access high priority applications/sites such as a bank web site. In some embodiments, the trust score is part of a confidence score, and if the confidence score is below a threshold, then a challenge may be implemented.

In some embodiments, the analysis includes randomly sampling the MFA criteria. For example, although the MFA criteria stack may include eight criteria, each criterion is sampled in a random order. Furthering the example, when a user accesses his device, the user may be asked to provide a fingerprint, but then the next time he accesses his device, the user's gait is analyzed, and the next time, the user's typing style is analyzed, and so on. Any randomization is possible. In some embodiments, multiple criteria are analyzed together (e.g., typing style and fingerprints). In some embodiments, all of the criteria in a stack are utilized but are analyzed in a random fashion/order. For example, when a user accesses a device, he is required to input a password/PIN, then while the user is typing, his typing style is analyzed, and while the user is walking his gait is analyzed, but if the user starts typing again, his typing style is analyzed, and every once in a while a retina scan is requested/performed. The analysis of the criteria is able to be performed in any random order. In another example, sometimes when a user attempts to gain access to a device, he is prompted to provide a fingerprint, other times a password or PIN is requested, and sometimes a retinal scan is implemented. By changing the criteria being analyzed, even if a hacker has the user's password, if the hacker does not have the user's fingerprint or retina scan, their attempt to gain access will be thwarted. As described herein, in some embodiments, multiple criteria are utilized in combination at the same time or at different times.

In the step 1804, a user's trust score is adjusted based on the analysis of the MFA information. As described herein, the user's trust score goes up, down or stays the same based on the MFA information analysis. For example, if a current user's gait matches the stored information of the correct user's gait, then the user's trust score goes up (e.g., is increased). If the current user's typing style is different than the stored information of the correct user, then the user's trust score goes down (e.g., is decreased).

The amount that the trust score is adjusted is able to depend on the implementation. In some embodiments, the effect on the user's trust score is able to be absolute or proportional. For example, in some embodiments, if one criterion out of eight criteria is not a match, then the user's trust score drops significantly (e.g., by 50% or to 0). In another example, in some embodiments, if one criterion of eight is missed, then the trust score drops proportionately (e.g., by $\frac{1}{8}^{th}$). In another example, the amount of the drop may depend on how close the currently acquired information is when compared to the stored information. For example, using comparative analysis, a user's gait is a 97% match with the stored information, so the trust score may drop slightly or not at all since the match is very close, whereas a match of 50% may cause a significant drop in the trust score (e.g., by 50% or another amount). When utilizing MFA criteria, if a user's current analysis results in a mismatch (e.g., the user has a different gait), then the user's trust score is lowered, even if the other criteria are matches. For example, seven of eight criteria are matches, but one of the criterion is a mismatch. In some embodiments, one mismatch significantly affects the user's trust score, and in some embodiments, the device/system is able to account for the fact that seven of eight criteria were matches, so the drop in the trust score may be minimal or proportionate. For example, one mismatch out of seven reduces the trust score by less than one mismatch out of two. In some embodiments, if there is one mismatch out of many criteria, the user may be prompted as to why there was a mismatch (e.g., an injury could cause the user to change his gait), and/or another criterion may be utilized.

As described herein, the trust score of the user for a device is able to be used as part of a confidence score (e.g., the confidence score is based on the trust score and a risk score). The confidence score is then used to determine whether the device or system has confidence that the user is who he says he is and what applications/sites the user has access to. A mismatch in the analysis criteria affects the confidence score, and based on the confidence score, additional factors/criteria may be analyzed and/or additional challenges may be utilized. In some embodiments, fewer or additional steps are implemented. In some embodiments, the order of the steps is modified.

In some embodiments, user identification proofing is implemented using a combination of user responses to system Turing tests using biometric methods. For example, device and/or system determines if the user is the correct user (e.g., the user is who he says he is) and is the user a human (and not a bot).

Figure 19:
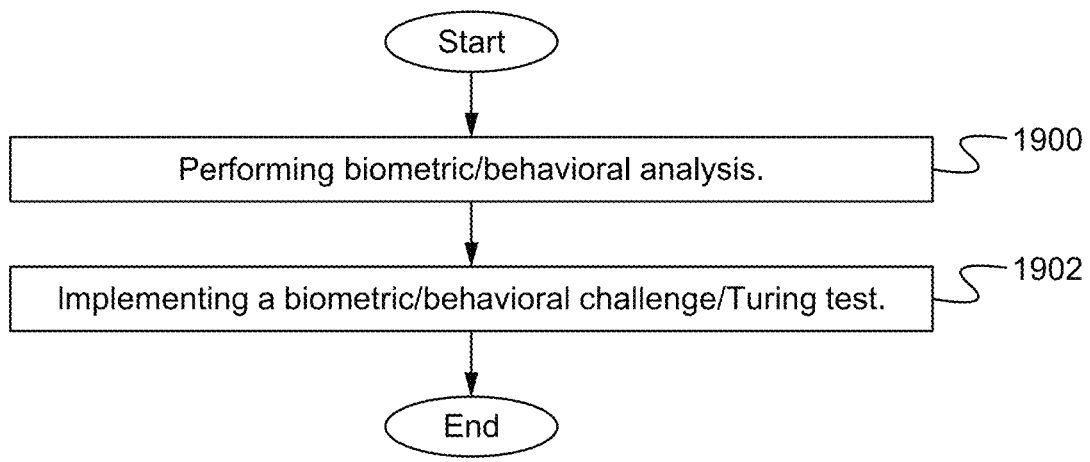
FIG. 19 illustrates a flowchart of a method of implementing user identification proofing using a combination of user responses to system Turing tests using biometric methods according to some embodiments.

FIG. 19 illustrates a flowchart of a method of implementing user identification proofing using a combination of user responses to system Turing tests using biometric methods according to some embodiments.

In the step 1900, biometric/behavioral analysis is performed. Biometric analysis is able to be implemented as described herein and include analyzing: fingerprints, hand scans, vein patterns, iris scans, facial scans, 3D facial scans, heart rhythm, ear identification and others, and behavioral analysis is able to include analysis of information such as voice tenor and patterns, gait, typing style, web page selection/usage and others. For example, the device utilizes sensors, cameras, and/or other devices/information to scan/acquire/capture biometric and/or behavioral information for/from the user. The biometric/behavioral analysis is able to include comparing acquired information (e.g., fingerprints) with stored information (e.g., previously acquired fingerprints) and determining how close the information is and whether there is a match. Any implementation of comparison/matching is able to be implemented.

In the step 1902, a biometric/behavioral challenge/Turing test is implemented. For example, a user is requested to turn his head a certain direction or look a certain direction. Furthering the example, the user is prompted by the device to look up and then look right, and the camera of the device captures the user's motions and analyzes the user's motions using video processing implementations to determine if the user looked in the correct directions. In another example, voice recognition is able to be implemented including asking a user to repeat a specific, random phrase (e.g., a random set of word combinations such as "kangaroo, hopscotch, automobile"). The vocal fingerprint and the pattern of how a user talks are able to be analyzed. For example, the device/system is able to detect computer synthesized phrases by detecting changes in pitch, odd gaps (or a lack of gaps) between words, and other noticeable distinctions. Other actions are able to be requested and analyzed as well such as requesting the user to skip, jump, walk a certain way, and so on.

In some embodiments, the biometric/behavioral challenge/Turing test is related to the biometric/behavioral analysis (e.g., in the same class/classification). For example, if the biometric/behavioral test involves facial recognition, then then the biometric/behavioral challenge/Turing test is related to facial recognition such as requesting the user to turn his head in one or more specific directions. In some embodiments, the challenge/test is unrelated to the biometric/behavioral analysis (e.g., in a different class/classification). For example, if there is a concern that a user's facial recognition information has been compromised (e.g., detection of the same facial information within a few minutes in two different parts of the world), then the challenge/test is something unrelated to that specific biometric/behavioral analysis. Furthering the example, instead of asking the user to look a specific direction, the user is requested to speak a randomly generated phrase/sequence of words or to perform an action (e.g., jump, specific exercise). Exemplary classes/classifications include a facial/head class, a gait class, a speech/voice class, a typing class, and others.

The device utilizes sensors, cameras, and/or other devices/information to scan/acquire/capture biometric and/or behavioral information for/from the user to perform the challenge/Turing test. For example, the sensors/cameras capture user information and compare the user information with stored user information to determine if there is a match. In some embodiments, computer learning is able to be implemented to perform the analysis. For example, using computer learning, the analysis/matching is able to be implemented on possible iterations that were not specifically captured but are able to be estimated or extrapolated based on the captured information. In some embodiments, the challenge/Turing test is only implemented if the user passes the biometric/behavioral analysis. In some embodiments, the device (e.g., mobile phone) implements the analysis and challenge/test steps, and in some embodiments, one or more of the steps (or part of the steps) are implemented on a server device. For example, the device acquires the biometric and/or behavioral information which is sent to a server device to perform the analysis of the acquired biometric/behavioral information. Similarly, a response by a user to the challenge/Turing test is able to be acquired by a user device, but the acquired information is able to be analyzed on the server device.

In some embodiments, fewer or additional steps are implemented. For example, after a user is verified using the analysis and challenge/Turing test, the user is able to access the device and/or specific apps/sites using the device. In another example, after a user is verified using the analysis and challenge/Turing test, the trust score, and in conjunction, the confidence score of the user increases. In some embodiments, the order of the steps is modified.

Within an aggregated trust framework, there are analytics and challenges. The analytics are able to include multi-stage analytics including a weighted decision matrix, decision theory, decision tree analytics and/or others. However, scalability is an important factor when implementing the aggregated trust framework. For example, a tree structure is able to be used, but it involves rebalancing as elements are added to the structure. Thus, the structure to be used should be a scalable structure such as a matrix or a weighted table.

Included in the analytics are several steps/phases/modules. There is the base phase which runs in the background. A pre-transaction phase, an external/environmental phase, a device phase, and a hijack phase are also included. The analytics are able to include fewer or additional phases. The challenges are able to be included in the analytics or grouped separately. Each of the analytics and challenges is able to include sub-steps/sub-phases/sub-modules. For example, the base phase module includes a facial recognition sub-module, a voice recognition sub-module and a gait detection sub-module.

The base phase performs many analytical steps in the background (e.g., always running) such as performing an image/video scan of the user's face/body, analyzing the user's gait, and/or other analysis. For example, a device's camera is able to continuously scan the user, the surroundings, objects the user is holding, other objects near the user and/or anything else. In another example, the microphone of the device is able to continuously listen to a user's voice to perform voice analysis and detect changes in the user's voice (e.g., pattern, volume, pitch). In yet another example, the sensors of the device are able to detect specific movements of the user (e.g., gait), hand movements, grip strength, grip positioning, micro-tremors, swiping patterns, touch/typing/texting patterns, and/or others. The base phase is able to implement the various sub-phases simultaneously and switch the focus amount for them when one or more are applicable or inapplicable. For example, if the user has his smart phone in his pocket, the facial recognition aspect is not going to detect a user's face, so the voice recognition and gait detection aspects are continued to be utilized/analyzed.

An aggregate score (e.g., 0 to 100 or 0% to 100%) is able to be computed based on the base phase analytics. For example, the aggregate score is able to increase as correct/matching analytics are detected. For example, if the user's gait, voice, face and swiping movements match previously analyzed information, then the aggregate score may be 100; whereas, if the person detected is walking differently, has a different voice and face, and swipes differently than the previously analyzed information, then the aggregate score may be 0. The previously analyzed information is able to dynamically change as the learning of the user by the device continues. For example, the system does not merely ask the user to take a single scan or image of their face and use that for facial recognition. Rather, the system continuously acquires multiple face scans/images, and using artificial intelligence and machine learning, generates a large body of analytical information to be compared with the user's face. By having a large body of analytical information, if the user wears a hat one day or grows out his beard, then the system is still able to recognize the user as the user.

In some embodiments, if the aggregate score of the base is below a threshold (e.g., 60), then the pre-transaction phase analysis is implemented. The pre-transaction analysis is able to include additional analysis/testing to modify the aggregate score. For example, if the aggregate score is 55 which is below the threshold of 60, then the device performs a facial recognition scan, which if a match is detected, then the aggregate score is increased by 10 such that the aggregate score is above the threshold. With the aggregate score above the threshold, a transaction is able to occur. In some embodiments, the pre-transaction phase includes analytics that are different from the base phase analytics.

The external/environmental phase analyzes external or environmental factors such as the device's location and ambient information (e.g., temperature, lighting, barometer/altimeter information). For example, if the user lives in California, but the phone or communication is determined to be located/coming from China, then the aggregate score would be negatively affected (e.g., dropped to 0 or reduced to below a threshold). In another example, the device determines that the user is using the device at midnight with the lights off, and this is atypical behavior based on previous external/environmental analysis, so the aggregate score is negatively affected.

The device phase analyzes the device information to protect against a computer-based attack. For example, the device is behaving oddly or the system has been spoofed and is being implemented/accessed on a different device than was originally analyzed. Similarly, malware is able to infect a user's device and trigger inappropriate transactions. Therefore, the device phase is able to perform system checks such as a virus scan, a malware scan, a hardware/system check, an OS check, and/or any other device check/analysis. The device phase is also able to affect the aggregate score. For example, if a hardware check is performed, and it is determined that the hardware is different from the original hardware when the app first performed a hardware check, then the aggregate score drops to 0.

The hijack phase analyzes possible change of possession of the device. For example, when a user hands the device to another user, or when the user places the device down, then another user may be in possession of the device. Again, the hijack phase is able to affect the aggregate score. For example, if the user hands the device to another user, the aggregate score drops to 0 because the device is no longer being used by the user.

Challenges are able to be implemented to verify the user which will increase the aggregate score. For example, the user is requested to perform one or more tasks, and if the user's performance is verified, then the aggregate score is able to be increased to an amount above the threshold. For example, the user is requested to shake the device up and down four times, and based on the movement, the speed of the movement, any twists or twitches detected, the device is able to verify if the user is the correct user based on previous analysis of the user. Another example of a challenge involves having the user looking in various directions in front of the device's camera, where the system is able to compare the different poses with stored information or information based on the stored information. Similarly, the challenges are able to implement or incorporate Turing tests to prevent computer-based attacks/breaches.

After going through the analysis and/or challenge, if the aggregate score (e.g., a user's trust score) is above a threshold, then a transaction is authorized. As described herein, the transaction is able to be any transaction such as accessing the device, accessing a website, providing a payment/purchasing an item/service, and/or any other transaction. Different transactions are able to have the same or different thresholds. For example, simply going to a webpage may have a lower threshold than accessing a social media account which may have a lower threshold than authorizing a purchase of an item. The size of the amount/purchase (e.g., $5 vs. $50,000) is able to affect the threshold.

Figure 20:
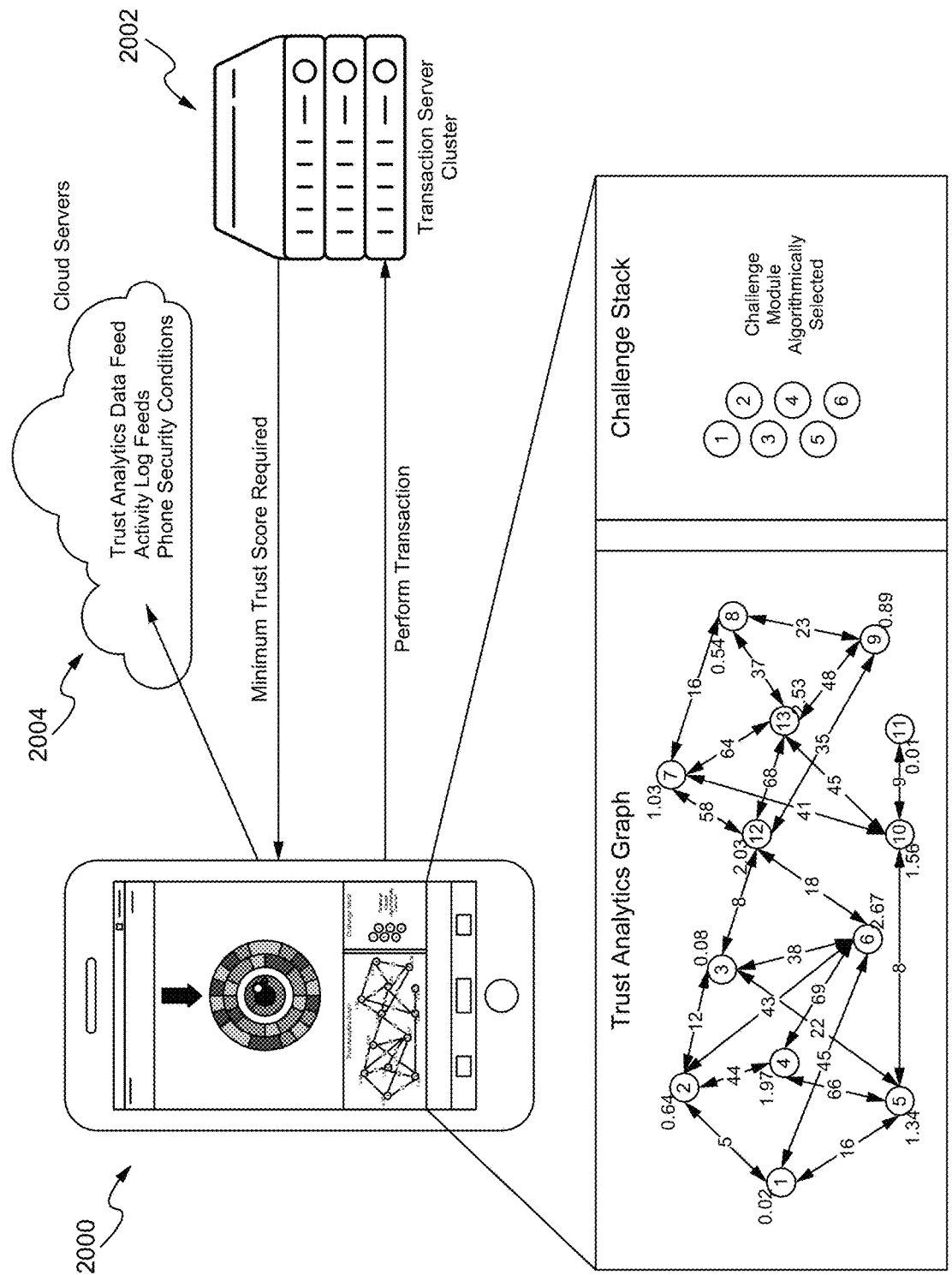
FIG. 20 illustrates a diagram of an aggregated trust framework according to some embodiments.

FIG. 20 illustrates a diagram of an aggregated trust framework according to some embodiments. The aggregated trust framework includes a mobile device 2000, one or more backend transaction servers 2002, and one or more dedicated cloud service devices 2004.

The mobile device 2000 includes a trust app configured to perform the analytics and challenges as described herein. The mobile device 2000 is able to include standard hardware or modified hardware (e.g., add-on sensors). The mobile device 2000 is able to be a mobile/smart phone, a smart watch, and/or any other mobile device. Depending on the implementation, results of the analytics and challenges are able to be stored on the mobile device 2000 and/or the one or more dedicated cloud service devices 2004. For example, the mobile device 2000 is able to include an app which performs the analytics and challenges including storing the results of the analytics and challenges, and then provides a transaction authentication (or denial) to the backend transaction servers 2002. In another example, the mobile device 2000 receives analytics queries and challenge requests from the dedicated cloud service devices 2004 and provides the information/results back to the dedicated cloud service devices 2004. The trust app is able to include or communicate with another device, to perform artificial intelligence and/or machine learning capabilities. The ID trust library is an SDK embedded inside the device (trust) app.

The backend transaction servers 2002 define discrete transactions, including a minimum trust score to perform each transaction. For example, the backend transaction servers 2002 communicate with a website server (e.g., social network, bank, online store) to gain access to the website (or other online service). The backend transaction servers 2002 communicate with the mobile device 2000 to receive a trust score (or other authorization signal), and if the trust score is above a threshold, then the transaction is able to be authorized by the backend transaction servers 2002. The transaction servers 2002 interact with an ID trust library, where the transaction servers 2002 provide policies to the ID trust library. In some embodiments, the ID trust library is stored within a device (trust) application. The ID trust library retrieves policies from the transaction server 2002, and then uses the policies and other criteria to generate a trust score. Each server transaction has different requirements for each transaction. As described herein, a task such as opening a bathroom door involves less security and identity confidence than opening a bank vault or entering a military resource. The transaction servers 2002 contain the policies and sends them to the device application. Then, the ID trust library processes a trust report. If the result complies with the given policy, the device app is allowed to perform the specific transaction.

The dedicated cloud service devices 2004 provide resources and services to clients (e.g., mobile devices). The dedicated cloud service devices 2004 include a trust analytics data feed, activity log feeds and phone security conditions. The dedicated cloud service devices 2004 are able to provide updates to the app on the mobile device 2000, communicate with the mobile device 2000 for a cloud-based implementation of the analytics and challenges, and/or for any other purposes.

In an exemplary implementation, a user attempts to perform a financial transaction with his online bank using his mobile device 2000. The online bank system communicates with the transaction servers 2002, where the online bank system waits for an authentication from the transaction servers 2002. The transaction servers 2002 verify that the user is who he says he is based on the mobile device 2000 determining a trust score for the user that is equal to or greater than the minimum trust score (e.g., threshold) for the transaction to be authorized. After the user generates a trust score that is above the threshold via the analytics and/or challenges, an authentication to perform the transaction is sent to the transaction servers 2002 which is able to provide the authentication information to the online banking system to perform the transaction. If the trust score is not above the threshold, then the transaction fails.

Figure 21:
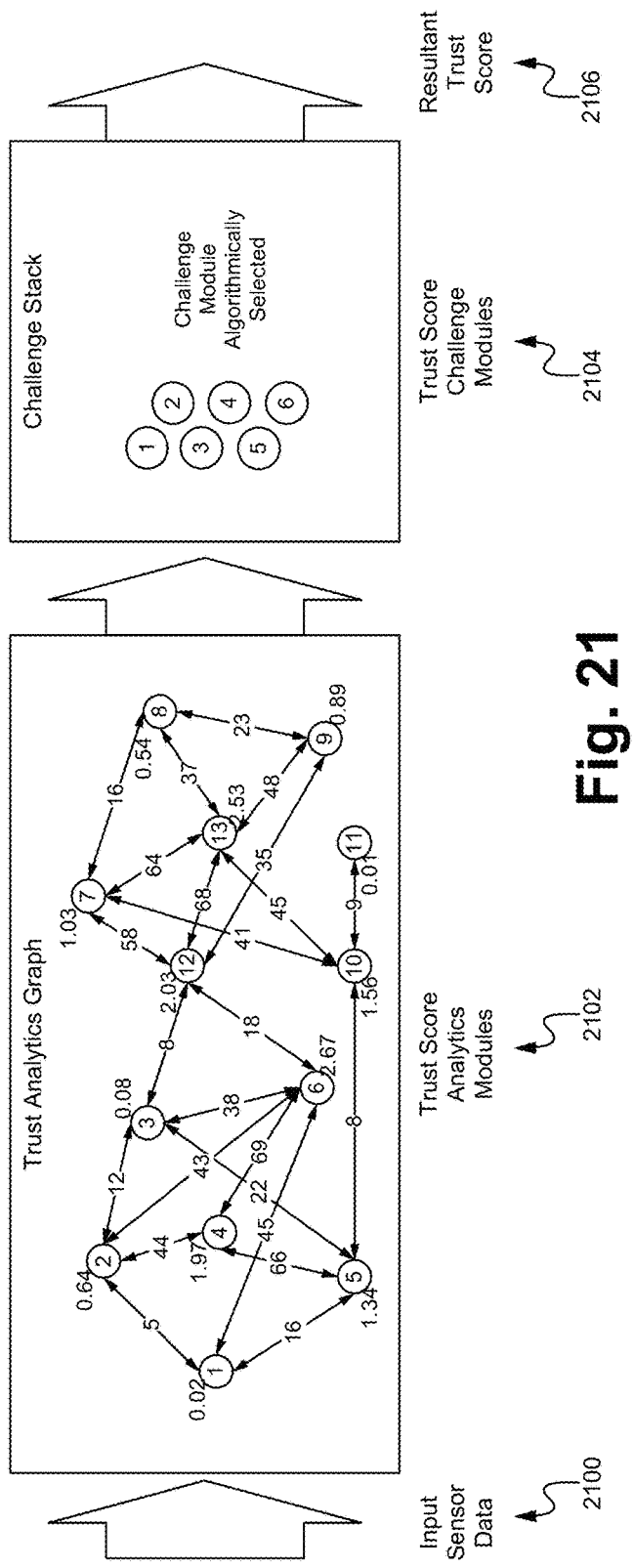
FIG. 21 illustrates a diagram of mobile trust framework functions according to some embodiments.

FIG. 21 illustrates a diagram of mobile trust framework functions according to some embodiments. As described herein, the mobile trust framework includes two major functions and the supporting framework.

In the step 2100, sensor data is received. Depending on the analytics and/or challenges, the sensor data is able to include movement data such as vibration detection by the sensors, and/or shaking movement, gait motion; input data such as swiping motions and/or keyboard/keypad input; voice/audio input; image/video input; and/or any other sensor/input data.

In the step 2102, trust analytics are implemented. The trust analytics software modules each run independently. In some embodiments, the modules are linked by graphical weighted decision tree algorithms, where multiple trust analytics trust scores are aggregated into a single trust score. The trust scores are dynamic and change from second to second, and are computed prior to any transaction. The trust analytics are able to include: traditional "know," "have," and "are" questions; dynamic biometrics including behavioral analysis; external behavioral factors such as location analysis; external factors such as environmental parameters; and/or device hardware/software behavioral analysis. Although a weighted decision tree is described herein, any structure (e.g., matrix) is able to be utilized.

In the step 2104, one or more challenges are implemented. Since each transaction performed has a minimum trust score, on the occasion where the current trust score is lower than the minimum, a challenge is used to prove the user to the mobile trust system. The challenges are able to be stored in a challenge stack, where a challenge module is algorithmically selected. Performing a challenge successfully raises the user trust score above the minimum threshold. Although a stack is described herein, any structure is able to be utilized.

In the step 2106, after the analytics and/or challenges, a resultant trust score is generated. The resultant trust score is used to determine if an authorization is provided. The authorization is able to be provided as a token, a certificate or any other authorization implementation. The authorization enables a transaction to occur.

In an exemplary implementation, a user initiates a transaction on a device app containing the ID trust library. The ID trust library connects to a transaction server and receives transaction policies and minimum trust thresholds. The ID trust library runs through the computational algorithms. The ID trust library computes the current ID trust score. If the resultant current trust score is below the threshold values, the ID trust library uses policies to select a challenge module, and the challenge module is executed, potentially raising the trust score. If the final trust score is above the threshold, the transaction is allowed to continue; otherwise, the transaction is not allowed.

Figure 22:
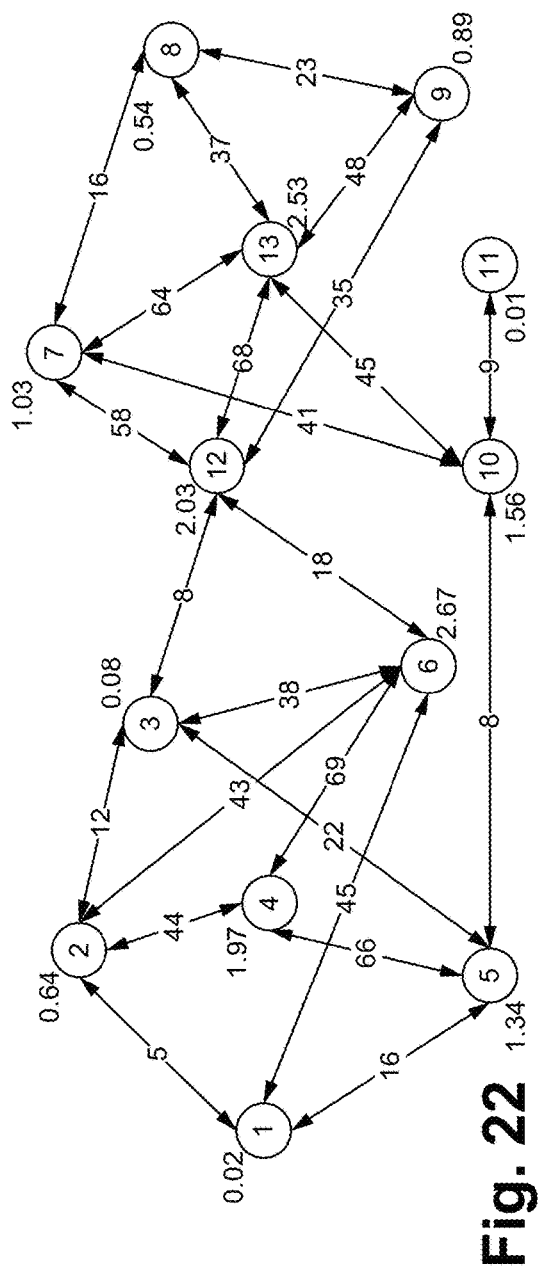
FIG. 22 illustrates a diagram of a weighted analytics graph according to some embodiments.

FIG. 22 illustrates a diagram of a weighted analytics graph according to some embodiments. The trust analytics are independent self-contained modules working together to construct a complex structure. The structure includes interrelated modules in a weighted decision tree graph. As more modules are added, the overall accuracy (or trust) increases. The analytics modules work together as a single system using technologies described herein.

Figure 23:
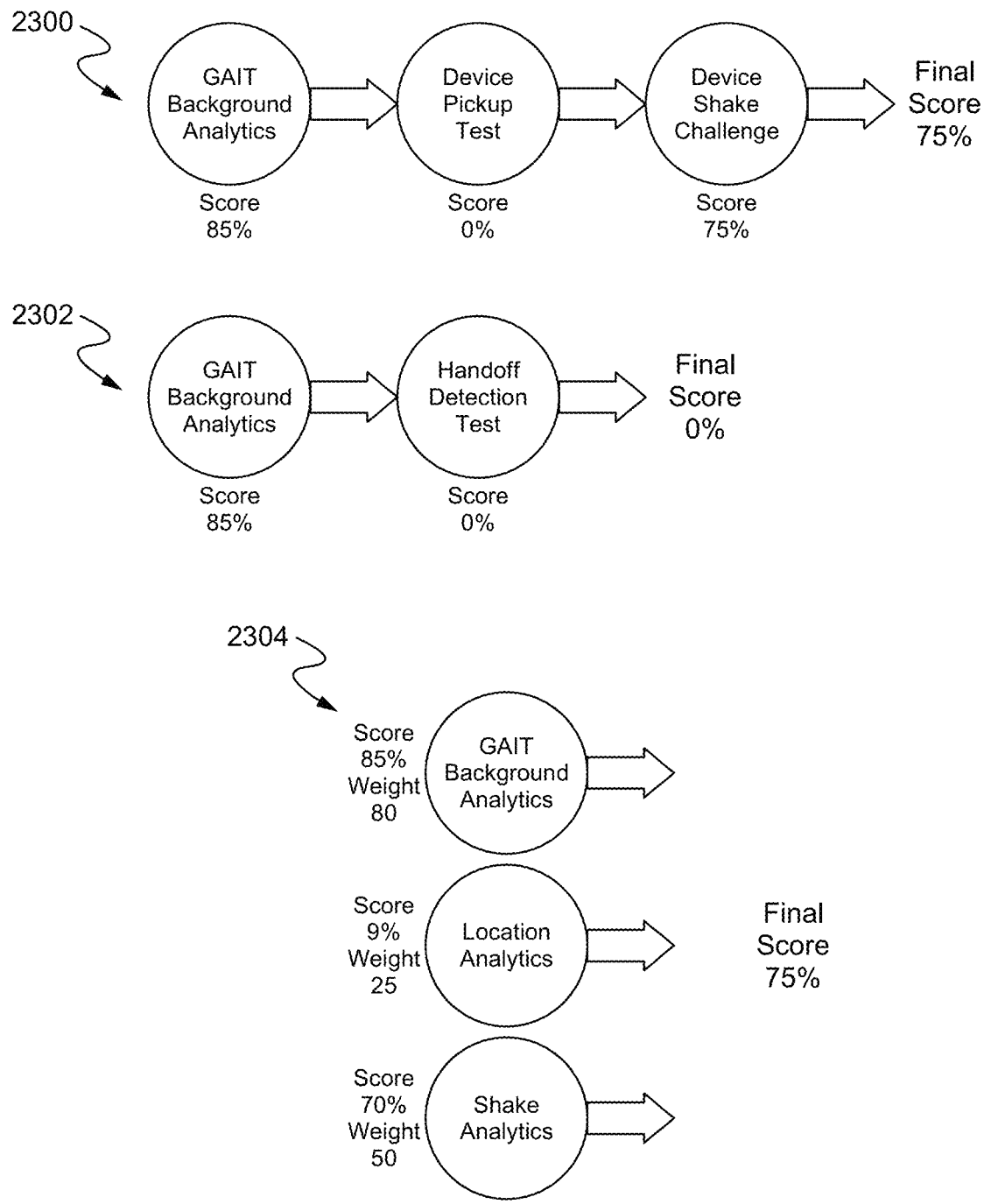
FIG. 23 illustrates diagrams of exemplary scenarios according to some embodiments.

FIG. 23 illustrates diagrams of exemplary scenarios according to some embodiments. Depending on various contexts such as user behaviors, environmental conditions and other factors, the trust score analysis will navigate the decision tree graph with different paths. The analytics computation results are practically infinite.

In scenario 2300, a user's motion is collected in the background with a gait trust score computed continuously (e.g., 85%). Another analytics module with a higher weighting value can override the resulting trust score. In this scenario, a device pickup or device handoff test reduces the overall score drastically since the current user cannot now be verified. To verify the user identity, a challenge module is initiated (e.g., device shake challenge). Challenge modules are used if immediate user actions are desired, such as unlocking a door or logging into an Internet service.

In scenario 2302, after the gait background analytics, the handoff analytics module detected that the phone was handed to another user. This action drastically reduces the overall trust of the identity of the current user holding the phone.

In scenario 2304, tests are able to be run in parallel. Some types of analytics may operate independently at the same time. The combination of these modules can be combined, and using the priority weight values, an overall trust score can be computed. More complex scenarios using weights and other parameters used for decision branching are described herein.

Exemplary modules are able to be categorized such as: human movements, static image analysis, dynamic image analysis, voice print analysis, user location, external factors, device usage, and/or device internals. Human movements include a shake test, a gait test, micro-tremors, a pickup, and/or a handoff. Static image analysis includes facial recognition, ear shape, face with Turing test (e.g., user instructed to look up), and/or face with user ID (e.g., user face while holding up driver license). Dynamic image analysis includes continuous facial analysis and/or lip movement analysis. Voice print analysis includes continuous voice recognition and/or voice with a Turing test (e.g., the device instructs a user to say random words to thwart malware or recordings of the user's voice). User location includes movement vector analysis (e.g., user is on common routes), common locations (e.g., user is at home or work is more trusted than somewhere the user has never visited) and/or speed analysis (e.g., impossible travel scenarios). External factors include ambient light and/or altitude/temperature/barometric pressure. Device usage includes typing/swiping analysis, app usage analysis, and/or device login/startup. Device internals include device hardware anomalies and/or device software anomalies.

A trust challenge is a mechanism where the mobile trust system challenges the smartphone user to perform some predetermined action. This is used when the trust system cannot adequately determine the identity of the user. An example would be a user using the system to unlock an electronic lock. The user has an option to prove their identity and immediately open the door. When the user's current trust score is inadequate, a trust challenge is initiated. At the successful completion of the challenge, the user's trust score is increased adequately to open the door.

Turing tests in this context are used to guarantee the user identity is a human Malware is an enormous threat today. User identities are commonly compromised by malicious software. Once a user's identity is exposed to malware, the user's identity can be used fraudulently. The trust challenge technologies use any of several biometric factors in combination with an action that can only be performed by a human Examples of challenges with Turing tests include dynamic human interactions. Examples include: reading from the screen random words or pictures and saying them out loud. Generally, only a human can interpret the messages, and the human voice print identifies the specific user. Another example is identifying a video challenge. Another example is dynamic facial recognition of the user performing actions specified by the mobile technologies. Examples might be look right, look up, stick out your tongue, and more.

Exemplary challenge modules are able to be categorized such as: image analysis, human movements, voice prints, personal information, directed actions, and/or static biometrics. Image analysis includes a face with Turing test (e.g., facial recognition combined with instructions from the device), a face with User ID (e.g., user's face and holding up driver license) and/or Facial 3D (e.g., user moves the device around his face). Human movements include a shake test. Voice prints include voice recognition and/or voice with Turing (e.g., user says random words instructed by the Trust framework. Personal information includes things the user knows such as mother's height, SSN, passwords/codes, date of special event, and/or many others. Directed actions include swipes, directed touch (e.g., touch areas or images on the screen), directed typing, drag objects, and/or pinch/spread. Static biometrics include fingerprints and/or image recognition.

Software Bus

Inside the application is a software bus. Inside the software bus is a database, a computation engine, and a policy engine. The computation engine performs the calculations, and the policy engine includes the decision-making information. The computation engine includes a weighted scoring engine which involves a weighted matrix which is able to take a base score and additional scoring information from the multi-stage phases to generate an aggregated score.

The software bus connects to each phase (module) as described herein, and inside each phase (module) are pluggable components for each analytics element. For example, the software bus connects to the base module, the pre-transaction module, the external/environmental module, the device module, the hijack module, and/or the challenge module and/or the pluggable components within the modules. The pluggable components allow analytics elements to be added, removed or modified dynamically. The pluggable components are able to be programmed in an interpretive language.

Figure 24:
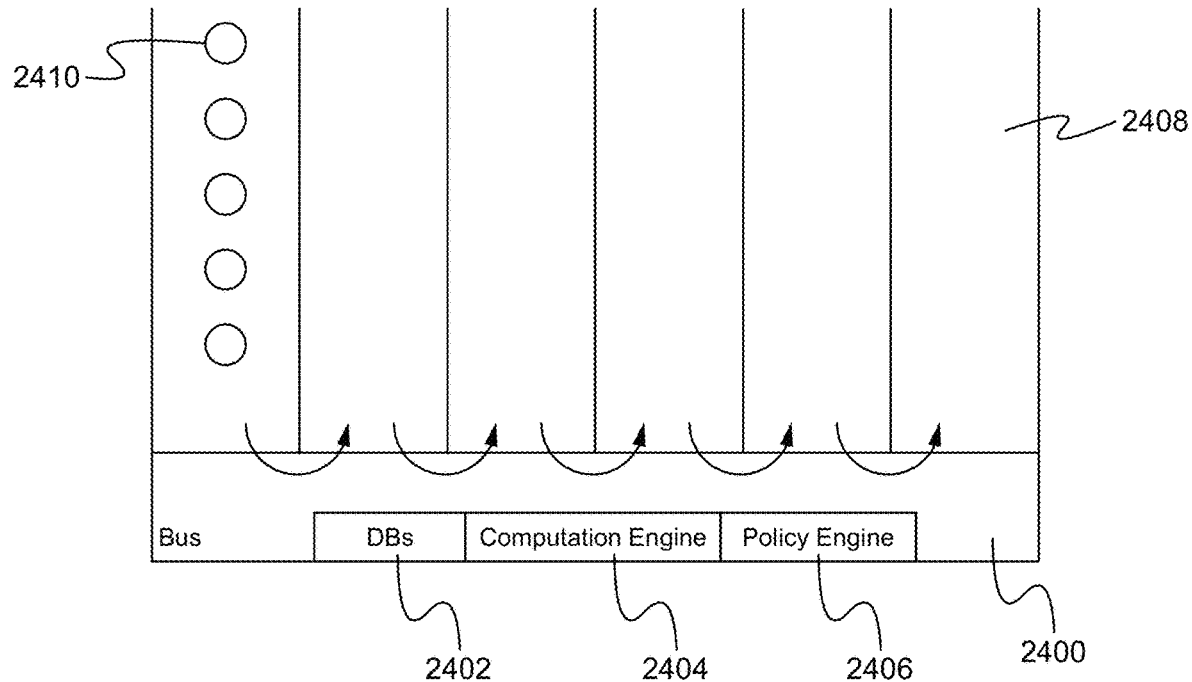
FIG. 24 illustrates a representative diagram of an aggregated trust system including a bus according to some embodiments.

FIG. 24 illustrates a representative diagram of an aggregated trust system including a bus according to some embodiments. The aggregated trust system includes an application bus 2400 which enables modules 2408 (e.g., the base module, pre-transaction module, and so on) to communicate with each other. The application bus 2400 also enables pluggable components 2410 within the modules 2408 to communicate with pluggable components 2410 within other modules 2408. The bus 2400 includes a data structure 2402 (e.g., one or more databases), a computation engine 2404, and a policy engine 2406. The data structure 2402 is able to be used to store acquired information (e.g., from the sensors), calculated results (e.g., trust scores) and any other information. The computation engine 2404 performs the calculations, and the policy engine 2406 includes the decision-making information. The computation engine 2404 includes a weighted scoring engine which involves a weighted matrix which is able to take a base score and additional scoring information from the multi-stage phases to generate an aggregated score.

User is the Password

Analytics that define a user are able to be used as a password for access to online transactions. As described herein, the analytics are able to include a user's physical attributes, gait, tremors/microtremors, face, ear, voice, behavior, vein patterns, heart beat, device usage, and/or others. The analytics generate a matrix of data, and each analytic is able to be broken down into components. For example, gait includes height, speed, walking, acceleration, gyroscope, and it follows a pattern match which is extrapolated into a pattern information structure. In another example, physical attributes are able to include a user's height, weight, skin color, hair color/style, birthmarks, scars, and/or other identifying physical attributes. Vein patterns are also able to be detected (e.g., using a mobile phone's camera to scan a user's face, arm or leg). Tremors or microtremors are able to be detected in a user's hand based on the accelerometer and/or other components in a mobile phone detecting very slight movements. Facial, ear or other body part recognition is able to be implemented using the camera of the mobile phone. Voice recognition is able to use the microphone of the mobile phone. In some embodiments, the voice recognition occurs without the user specifically focused on passing a voice recognition test. For example, the mobile phone "listens" to nearby voices including detecting the user's voice. The mobile phone is also able to "listen" to the user's voice while the user is talking to another person to analyze the voice and determine if the voice is that of the user. Other behavioral analysis is able to be performed as described herein such as analyzing the locations that the user and the mobile phone go to, how long they are there, which web sites are visited, and/or any other behaviors/actions that the user takes that are repeated and recognizable. Using the mobile phone, a microphone or another sensor of the mobile phone is able to detect a user's heartbeat. For example, the mobile phone is able to be placed against a user's body or a sensor is connected from the mobile phone to the user's body, and the mobile phone is able to detect a user's heartbeat including any specific, unique heart rhythm In some embodiments, all of the analytics patterns are aggregated into a pattern matrix. The pattern matrix is a multi-variant matrix which is able to account for changes in one or more of the analytics patterns. For example, if a user has a broken nose, his detected face pattern may be off when compared with the stored face pattern information, so the other analytics or additional analytics are used to compensate to ensure the proper user is able to perform transactions while also ensuring that an improper user is blocked from performing transactions. The stored data is continuously, dynamically changing to account for changes in the user (e.g., a user's voice changing, a user's hair changing, and many others). The stored data is able to use artificial intelligence and machine learning to maintain a knowledge base of a user and many possible attributes. For example, not only is the user's normal gait learned and stored, but if the user has a slightly different gait after exercising, and a very different gait when injured, the various gaits are able to be learned and stored, so that the gait analytics are able to be used regardless of the user's current state.

Figure 25:
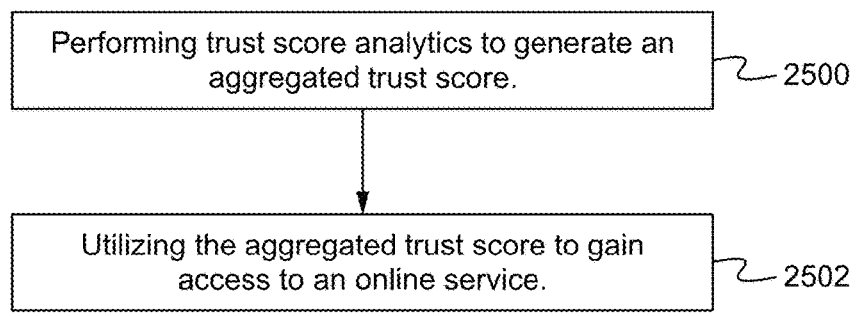
FIG. 25 illustrates a flowchart of a method of using the user as a password according to some embodiments.

FIG. 25 illustrates a flowchart of a method of using the user as a password according to some embodiments. In the step 2500, trust score analytics are performed to generate an aggregated trust score. As described herein, the trust score analytics utilize sensors and other devices to acquire information about a user to determine if the device is being used by the expected/appropriate user (e.g., owner of the device). The analytics include base information, pre-transaction information, external/environmental information, device information, hijack information, and/or challenge information. In some embodiments, a token or a hash is generated using the trust score analytics. In some embodiments, the token is a Non-Fungible Token (NFT). The token is able to be a user's password, facial scan or other acquired data and/or used as a password or otherwise to gain access to a service (e.g., an online service such as Facebook or a bank account). In some embodiments, the NFT is a unit of data stored on a digital ledger, referred to as a blockchain, that certifies a digital asset to be unique and not interchangeable. The token is able to be generated in any manner, for example, if a user's trust score is above a threshold, then a token is generated to represent that user. In some embodiments, each time a user's identity is confirmed using the trust score analysis, a new token is generated, and the old token is deleted and/or made unusable. The token and/or the trust score are able to continuously evolve as more data is acquired about the user. The token is able to be stored locally and/or remotely. In some embodiments, a private token or certificate and a public token or certificate are used such that the private token is stored locally and the public token is able to be shared, where the public token is used to gain access to a service. For example, the public token merely includes general information that indicates that User A is actually User A; however, the private token includes the specific information such as stored biometric (human characteristic) information and other personal information that has been acquired, tracked and/or analyzed. The public token is able to be based on or linked to the private token. For example, if the private token becomes invalid for some reason, then the public token also becomes invalid. Any public-private key exchange is able to be utilized based on the human characteristic information acquired. A homomorphic data vault is able to be used to maintain data securely, where the data vault is able to be interrogated for information (e.g., queried do you contain this?), but the actually data is not accessible by an external source.

In the step 2502, the aggregated trust score is utilized to gain access to an online service. For example, a mobile device is used to log in to an online service, and if the aggregated trust score is above a threshold, then the mobile device sends an authentication certificate or other information to access the online service (e.g., social network login).

If the aggregated trust score is not above the threshold, then the mobile device does not send the authentication certificate or other information. If the aggregated trust score is not above the threshold, then the user is able to be challenged (e.g., prompted to perform a challenge action). Based on the challenge the user may raise their trust score above the threshold (or not), and if the trust score is above the threshold, the authentication certificate is able to be sent to access the online service. The access is not limited to online services. Any access (e.g., open the front door) is able to be implemented using the aggregated trust system including the user is the password aspects. In some embodiments, fewer or additional steps are implemented. For example, if an aggregated trust score is below a threshold, then one or more challenges are provided to affect the aggregated trust score. In some embodiments, the order of the steps is modified. The authorization is able to be used as a password to access any system. For example, the password is able to be used to access the mobile device, web pages/social networking pages, secure devices, online services, and/or any other device/system/service that utilizes a password to gain access. In another example, a user navigates using a web browser to a web page which requires a password or other authentication to access the web page. Instead of providing a password which is able to be stolen or hacked, the user's mobile device authenticates the user based on the aggregated analytics described herein and provides an authentication certificate or other implementation to indicate to the web page that the user is who he says he is (e.g., the accurate user). As described above, a generated token is able to be used as a password to gain access to a service. For example, the user is able to provide the previously generated token to the service which verifies the user as the user. In another example, the service automatically analyzes the token and verifies the user based on the token. In yet another example, a public-private key exchange is implemented with the token generated from the human characteristic information.

Architectural Overview

Figure 26:
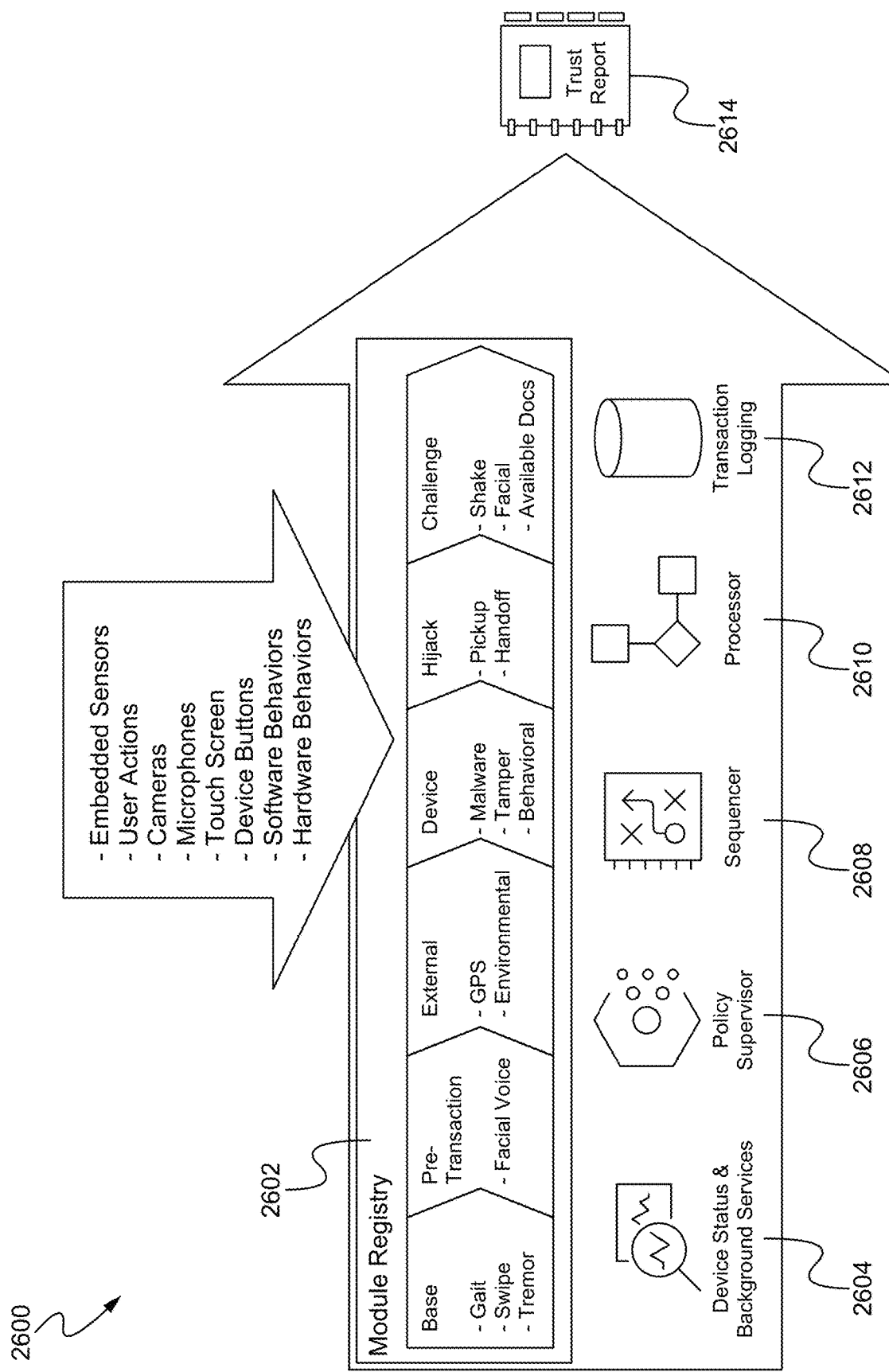
FIG. 26 illustrates a diagram of an architectural overview of the ID trust library according to some embodiments.

FIG. 26 illustrates a diagram of an architectural overview of the ID trust library according to some embodiments. The ID trust library 2600 includes a module registry 2602, device status and background services 2604, a policy supervisor 2606, a sequencer 2608, a processor 2610 and transaction logging 2612. The ID trust library 2600 is able to be used to generate a trust report 2614. As described herein the module registry 2602 includes a base module, a pre-transaction module, an external module, a device module, a hijack module and a challenge module. The module registry 2602 utilizes embedded sensors, user actions, cameras, microphones, touch screen, device buttons, software behaviors, and hardware behaviors to perform identification analysis.

Data is collected about the user, the device and external conditions. Each of the ID trust modules is responsible for the collection and processing for their respective functions. Modules are grouped by classes and processed in stages. Collected data is stored in the device's local storage or on a remote server. In each stage, the analytics are processed by a rules engine. The intermediate trust scores for each stage are processed using a graphical decision tree algorithm and produce a final score. The history of all transactions and score are able to be analyzed to produce a trust report 2614.

ID Trust Module

In some embodiments, the modules serve a single purpose. A module is isolated from all other modules. A module can only perform its designed action to generate its results. It does not communicate with any other module nor does it access any other part of the ID trust environment. Modules conduct their intended ID analysis or challenge upon request, then return its result. The output is two pieces of data: 1) a resulting score and 2) a confidence level of that score.

A module may perform its action on demand, or it may be given background time to collect data. The module can maintain a history and then produce the resulting score based on that history.

A score is the result of the module's security action. Values are within the range of 0-100. Confidence is a high, medium, or low level of the quality or reliability of the resulting score. For example, if there is a test that normally takes several iterations to complete, and if that number of iterations was done, then the resulting score could be given a high level of confidence. But if the challenge was only completed once or done quickly, then it would have a low level of confidence.

Module Class

There are six different classes of ID trust modules. Each module is defined to be of only one class. Each class conducts a certain type of challenge described below. There are two types of modules. An analytic module performs its function without user interaction. The other is the challenge module, which interacts with the user. Some modules may run in the background. Others can only execute on-demand and may involve user interaction. Examples of analytics modules that may run in the background include gait (a person's pattern of walking), device usage like typing patterns, micro-tremors generated by the users, and others.

As described herein, the base class is a group of modules are executed to perform a base set of analytics, continuously monitoring the behaviors of the user. This produces a near real-time continuous score. Behaviors which are consistent with the historical behaviors of the user are analyzed. Consistent behaviors may be extremely accurate and can identify a user with fingerprint accuracy.

The pre-transaction class is a group of analytic modules which are executed to identify the user performing the transaction. An example would be to have the camera "look" at the person holding the phone at the time of the transaction. This would provide a sanity check and is possibly only performed if the base trust score is low, and the system is suspicious.

The external class is a group of analytics that performs tests of external factors such as GPS, common routes, barometric pressures, altitudes, time/date, ambient light and others. The module is only used in certain scenarios. Examples include: financial transaction but a user is outside his normal location; or unlocking a door, but the user's GPS location is not near the door. The module will commonly test for suspicious conditions such as: impossible travel—for example, the GPS location history shows the user was in Europe, but 5 minutes later another transaction is performed in Borneo. Suspicious location—for example, the transaction is to unlock a door, but the phone GPS is nowhere near the door. Unusual locations—for example, the user performs a transaction and is not home, at work, or at a common location. For critical transactions, if the user is somewhere unusual, the transaction will involve a higher trust score threshold.

The device class is a group of analytics that tests for the health or security condition of the device itself. These modules analyze the condition of the device hardware and/or operating environment. Any detection of suspicious device health or functionality will drastically reduce the current trust score. These tests are monitoring for conditions such as: hardware tampering, the device has been spoofed by another device, or the device operating system has potential malware.

The hijack class is a group of analytics which monitors for conditions where the device is not in position of the registered user. Any form of hijack detection will drastically lower the current trust score. Examples of hijacks include: pickup detection—the device was set down, then picked up. The device may have been picked up by the owner, but this could be anyone; or handoff detection—the device monitors for when the phone is handed from one person to another. Once this condition is detected, the person holding the phone is suspect, and the trust score is reduced drastically.

A challenge module interacts directly with the user and challenges the user with some action which: tries to guarantee the transaction being performed is done by a human and not some form of malicious software. Malicious software examples are bots, viruses or trojans. Old fashioned versions of this type of challenge include requesting personal information about the user, such as "mother's maiden name." Due to the amount of personal information having been stolen and shared by bad actors, such challenges are no longer secure. Biometric versions of this challenge include having the user identify themselves by the hardware fingerprint detector. These challenge modules request users to perform actions and can be a nuisance and are only called upon as a last resort when the analytics cannot appropriately identify the current user.

Sequencer

ID trust modules are chosen by a defined order determined by their class. Once the set of modules has been chosen, they are called to perform their challenge. The first module is called, and its result is stored. Then the next module is called, the result is stored, and so on until the last stage has completed.

The sequencer 2608 performs the following: building the proper chain of modules to calculate the trust score receiving policies from the transaction server for each given transaction, and calling modules that involve periodic execution time for monitoring activity in the background. An exemplary sequence of the modules implemented by the sequencer 2608 is Base→Pre-transaction→External→Device→Hijack→Challenge.

The sequencer 2608 determines which module classes are used based on the following criteria: which module class to choose is based on the given policy. The policy is given to the sequencer 2608, which then determines the class of modules to produce the ID trust score. The determination of which class to use for a given policy is complex. If there is more than one module within the chosen class, then module priority is used in the selection of a module. In the case where there are multiple modules selected at the same priority, the resultant trust scores are combined mathematically into a single score. Module priority values are high, med, or low. The value is determined by the security admin user within the admin console of the transaction server.

Once the classes are chosen, constructing the sequence of modules is relatively simple.
1. Select the modules with the highest priority within its class for the specific stage.
2. Add the next module to meet the policy criteria.
3. Repeat until the last module has been added.

Figure 27:
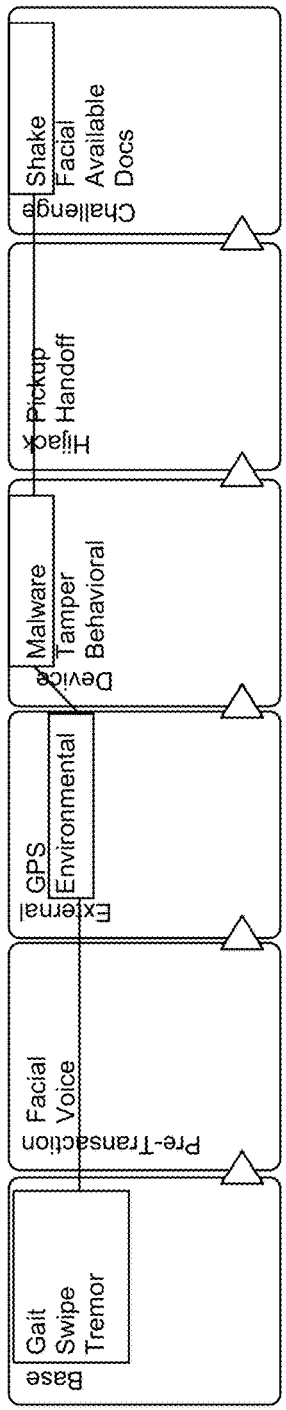
FIG. 27 illustrates a selection of modules chosen for a given policy according to some embodiments.

FIG. 27 illustrates a selection of modules chosen for a given policy according to some embodiments. In the example, gait, swipe and tremor are selected from the base class, followed by environmental factors from the external class, then malware from the device class, and finally a shake challenge.

Processor

The sequencer calls each of the chosen modules and stores their results (score and confidence). It is the processor 2610 that evaluates all of the stored results to determine the final ID trust score. The processor 2610 logs the details used to process the trust score.

There are two key attributes used by the processor 2610: module score and confidence. These two results are provided by the module. Confidence values are high, med, or low and determine if the module's result should affect the computation. Module action—the action to perform is defined by the class of module. The base class establishes a base score and has no action. The other classes have the action to raise or lower the score. Modules produce an intermediate score, and their results are processed in a specific sequence. For example, a base module's result can be overridden by a later hijack module. There are currently six classes of modules, one for each stage. This process performs combined computations and algorithms to derive a final trust score. The following defines the action to perform on the given result of the ID trust module based on its class. The base class generates a base score, a pre-transaction raises the score, and the external, device, hijack classes lower the score. The challenge class is used to raise the score.

Figure 28:
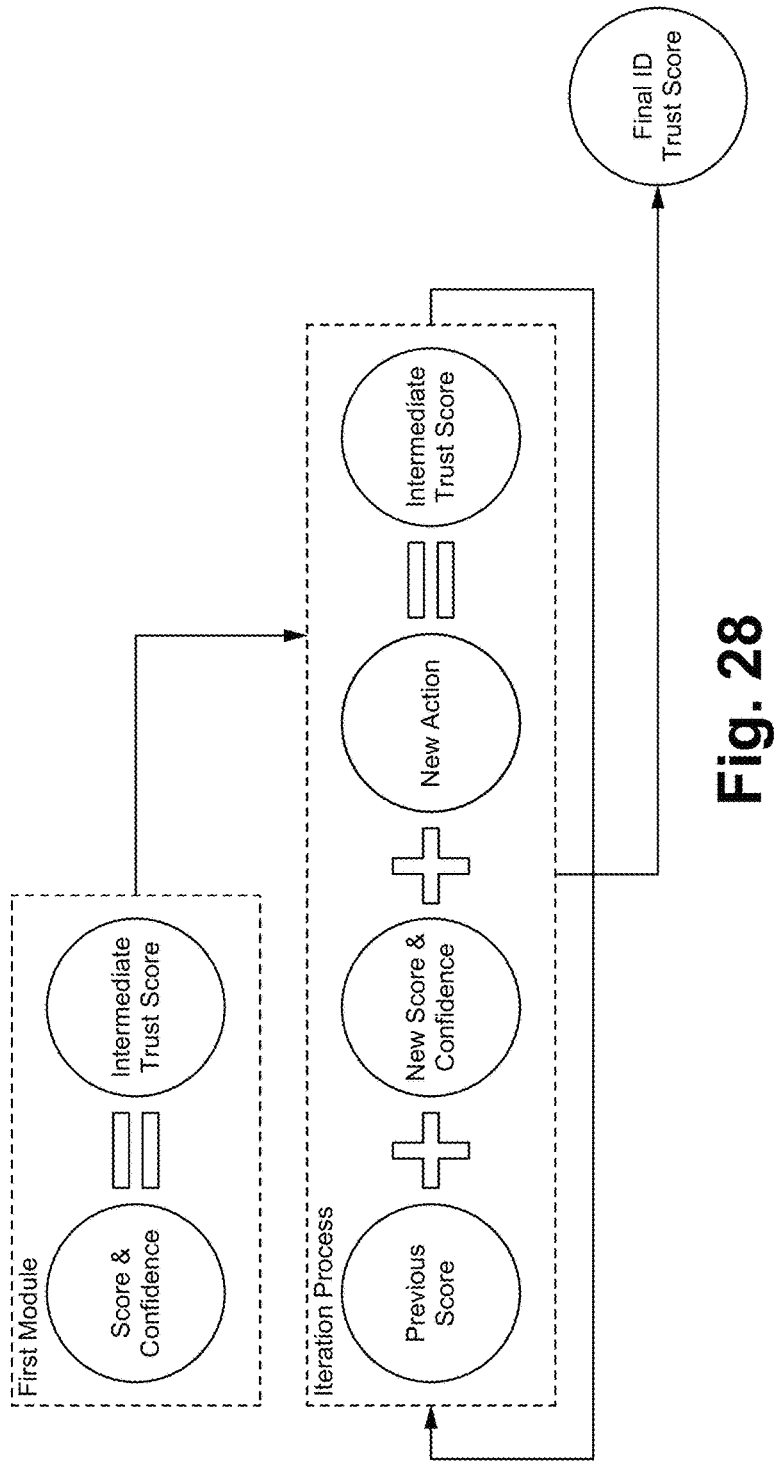
FIG. 28 illustrates the logical flow according to some embodiments.

The steps below outline the process for obtaining the final ID trust score. FIG. 28 illustrates the logical flow according to some embodiments.
1. First module's results are obtained from the storage and saved as an intermediate result.
2. Next module's results are obtained from the storage.
3. Results of the first intermediate result and the new result are compared according to their confidence and action.
4. The intermediate result may be kept or replaced by the new result.
5. Repeat the process until the last module's results are computed.

Policy Supervisor

The policy supervisor 2606 controls all the logic, calling on the sequencer 2608 and processor 2610 to perform their tasks. Each transaction has different policies including a minimum trust score. If the policy requirements are not met, the transaction is blocked until the trust score increases to an acceptable level (e.g., above a threshold). The policies are defined at the transaction server.

This logic happens during each transaction and does not impact the user experience.
1. Obtain the policy from the transaction server.
2. Call the sequencer to build the chain of modules for the given policy.
3. Pass the chain of modules to the processor.
4. Compare the final ID trust score with the policy.
5. If the score is above the threshold, then the process is complete.
6. If the score is below the threshold, then repeat steps 2-4 adding a challenge module to force a user interaction.

A policy is a set of criteria provided by the transaction server. The server sends the policy to the ID trust library during a transaction. The policy supervisor obtains the trust score based on that criteria. The following are some of the criteria: transaction description, transaction minimum score threshold: minimal acceptable score, location: use the device's location, transaction code, transaction weight, factor priorities, routes, speed, ambient light, temperature/humidity/barometric and the challenge array.

Modules Registry

Each module is registered when added to the ID trust library. Adding the module to the ID trust library is simple by including the module at build time by static linking the module inside the SDK project. Registering the module to the ID trust library is accomplished by inserting a record in the module database in the modules registry. The fields in the modules registry include: module name, module description, module class, module priority (determined by the transaction server), and background (activity to perform and rule when to be called).

Logging

Logging is a function performed by the processor. As the processor obtains each of the module's results, it logs the module's name and results. The processor also logs the intermediate results as it is processing the chain of all modules.

The system keeps records of all transactions and the results used to calculate all trust scores such as: the analytic descriptive fields, analytic resultant input fields, data storage, policies storage, and default server policies.

Security

The SDK is able to be compiled and distributed in binary for security and competitive reasons. Malicious people should not be able to view the software sources and thereby be allowed to inspect and detect security vulnerabilities.

API Specifications

The specific API definitions are documented in a separate ID trust library technical specification: ID trust library for client and server, ID trust module API, the APIs listed map to software methods and exposed to host app environments, and this product feature is written in a language such as C/C++ which is used in common with many host environments.

Packaging and Delivery

The app and/or system is packaged as an SDK, which includes the ID trust functionality, the analytic modules, the challenge modules and adapter modules to support the host environments.

Compatibility

The SDK is available for client apps on iOS and Android devices, in their native format. SDK is available for servers in Node.

User Interface & User Experience

The GUI framework is developed as part of the resulting analytics and challenge modules. These GUI templates are skinned to match the host app appearances. If the user is asked to perform a task, such as shake the device, instructions are simple and clear. Only a few words and ideally images are used to explain how to perform the task.

Performance

Prior to each transaction, the analytics system performs the trust score analysis. When the trust score is inadequate, the transaction is blocked. This operation is completed quickly to maintain a good user experience.

Any delay in the trust analysis degrades the user experience, so this system performs at sub-second levels. This performance includes strategies such as caching, performing analysis in background processes, using a central database to aggregate analytic module resultant values, and others.

The exception is if the user is asked to perform a task, such as shaking the device. That obviously interrupts the authentication process.

Multi-Stage Scoring

The following examples show processing for each stage, producing a final resultant score.

| Stage | Module | Action | Module Score | Intermediate Score |
|---|---|---|---|---|
| 1 | Base | Base | 80 | 80 |
| 2 | Pre-Transaction | Raise | 90 | 90 |
| 3 | Environmental | Lower | 80 | 80 |
| 4 | Device | Lower | 60 | 60 |
| 5 | Hijack | Lower | 0 | 0 |
| 6 | Challenge | Raise | 80 | 80 |

Resultant Score 80

Good Base Score, Pickup/Handoff Detected

In this example, the phone monitoring the user behavior with the base modules, but one of the hijack modules detected suspicious behavior and reduced the trust score to 0. This causes a challenge to be performed to raise the trust score to an acceptable level.

| Stage | Module | Action | Module Score | Intermediate Score |
|---|---|---|---|---|
| 1 | Base | Base | 80 | 80 |
| 5 | Hijack | Lower | 0 | 0 |
| 6 | Challenge | Raise | 70 | 70 |

Resultant Score 70

Good Base Score, Device Tampering Detected

In this example, the phone monitoring the user behavior with the Base modules, but one of the Device modules detected suspicious behavior or tampering and reduced the trust score to 60.

Good Base Score, Device Tampering Detected

| Stage | Module | Action | Module Score | Intermediate Score |
|---|---|---|---|---|
| 1 | Base | Base | 80 | 80 |
| 4 | Device | Lower | 60 | 60 |

Resultant Score 60

Good Base Score, Suspicious Environmental Conditions

In this example, the phone monitoring the user behavior with the base modules, but one of the environmental modules detected a condition which the specific transaction has specific environmental requirements.

| Stage | Module | Action | Module Score | Intermediate Score |
|---|---|---|---|---|
| 1 | Base | Base | 80 | 80 |
| 3 | Environmental | Lower | 30 | 30 |

Resultant Score 30

This specific transaction had specific location requirements. The environmental module common locations detected that the user/device was located where the user has never been detected and reduced the trust score, subtracting 50 points.

As described herein, analytics are able to be used to identify a user of a device. Examples of analytics include tremor, gait, vehicle motion, and facial recognition. The analytics are able to be grouped into related and unrelated analytics. For example, tremor, gait and car motion are able to be considered related analytics, and they are unrelated to facial recognition. The determination of related and unrelated is able to be performed in any manner. For example, if the analytics share common elements such as being related to motion or being determined using an accelerometer, then they are related. By using related analytics, analysis and feedback are able to be shared among the analytics modules to improve machine learning for user identification.

Figure 29:
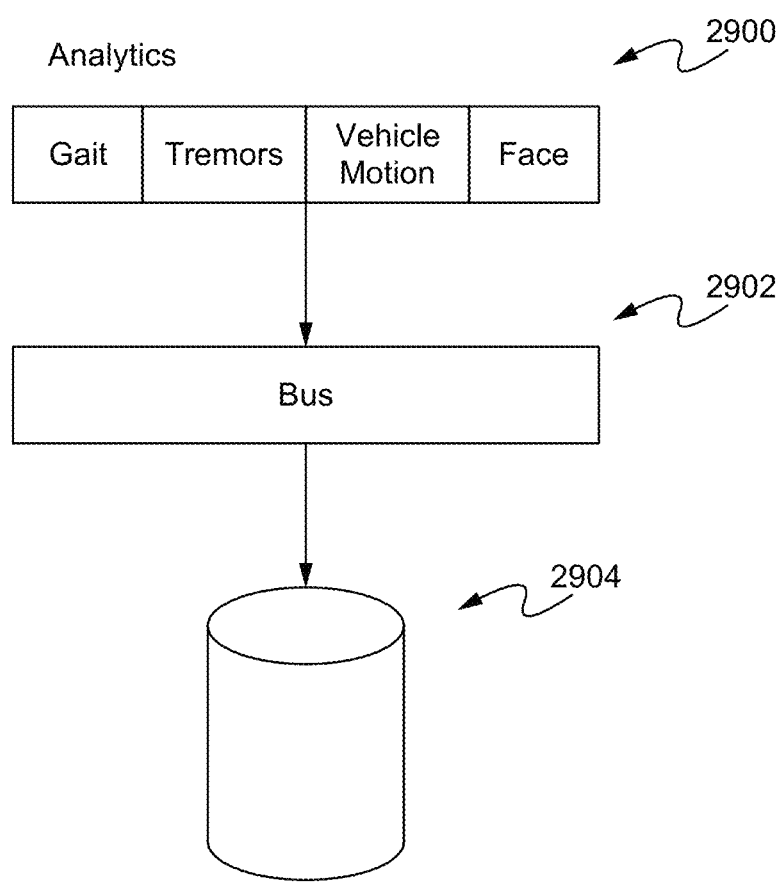
FIG. 29 illustrates a diagram of analytics with shared traits according to some embodiments.

FIG. 29 illustrates a diagram of analytics with shared traits according to some embodiments. The analytics 2900 include tremor, gait, vehicle motion, facial recognition, and many others described herein. Each of the analytics 2900 is trained. In some embodiments, the training of the analytics 2900 only occurs when the confidence that the current user is the authorized user is high or very high (e.g., confidence of the user is above a threshold such as 95% or 99%). The training involves detecting user activity/features (e.g., motion) and providing feedback as to whether the detected activity/features are true/correct or false/incorrect. Instead of the training and feedback applying to a single analytic, the training and feedback are able to apply to related/grouped analytics. For example, analytics that involve motion or the use of the accelerometer to detect motion are able to be considered related analytics; whereas, facial recognition uses a camera to scan a user's face. The related analytics are able to be trained simultaneously because they have shared traits. For example, as a user is walking with a mobile device in his hand, microtremors are able to be detected/analyzed for the tremor/microtremor analytics, and the user's gait is able to be detected/analyzed for the gait analytics. The detection/analysis is able to be used for machine learning of the analytics. In another example, while a user is walking with a mobile device in his hand, the gait is able to be detected/analyzed, and the user's hand motions are able to be detected/analyzed, where the same information is received but used for two separate analytics (gait, hand motion) since the analytics share a trait. In some embodiments, the analytics share a single trait, and in some embodiments, multiple traits are shared.

As the analytics receive and analyze user information, the received information, any appropriate analysis information such as links to classes, and any other learning information is sent to a bus 2902 to direct the information to be stored in a data store 2904. The stored data and learned information are used by the analytics to determine whether a current user of the device is the correct, authorized user (e.g., owner).

Training, feedback and data filtering are able to be performed and received for each of the analytics (including multiple analytics simultaneously). For example, if a user is riding in a car, the vehicle motion analytics are able to detect/analyze the situation, but also, the mobile device may detect tremors/microtremors. However, these tremors/microtremors may be from the vehicle and/or at least change the detected tremors when compared to a user simply standing an holding a mobile device. Therefore, the situational information (e.g., feedback from the vehicle motion analytics) is able to be communicated to the tremor analytics, so that the acquired information is processed correctly (e.g., ignored while in a vehicle, classified as tremor while in a vehicle versus tremor when not in a vehicle, or adjusted based on the vehicle vibrations). In another example, the gait and tremor analytics share information (e.g., feedback). Furthering the example, a user's heartbeat is typically different when he his calmly standing still versus when he is walking, and the user's heartbeat could affect the microtremors detected, so the gait analytics is able to share the information that the user is walking and/or that the user's heartbeat is elevated, so that the microtremor analytics module is able to account for the fact that the user is walking (e.g., the microtremor analytics module distinguishes/classifies data based on the other actions the user is taking at the time such as walking versus sitting versus standing). It is also important to filter out extraneous information that could cause improper learning. For example, if a user is on an escalator, is running a marathon, or dropped his phone, all of these external vibrations are able to confuse the device and lead to poor input data and incorrect analysis by the analytics. Therefore, the analytics are able to use the shared information to better determine what is going on with the user and whether the information is valid, correct and useful data to acquire and use for learning. In some embodiments, if the data is determined to be corrupted in that there are extraneous factors that are affecting the data such that it is not useful for learning, then the acquired data is ignored/deleted. In some embodiments, the data is classified/grouped in a manner such that a first set of data under a first set of circumstances does not affect a second set of data under a second set of circumstances. For example, if a user is a marathon runner, then acquiring the user's tremor information while the user is running is still useful information (potentially many hours per week running), but it will likely be different than the user's tremor information while at rest.

Figure 30:
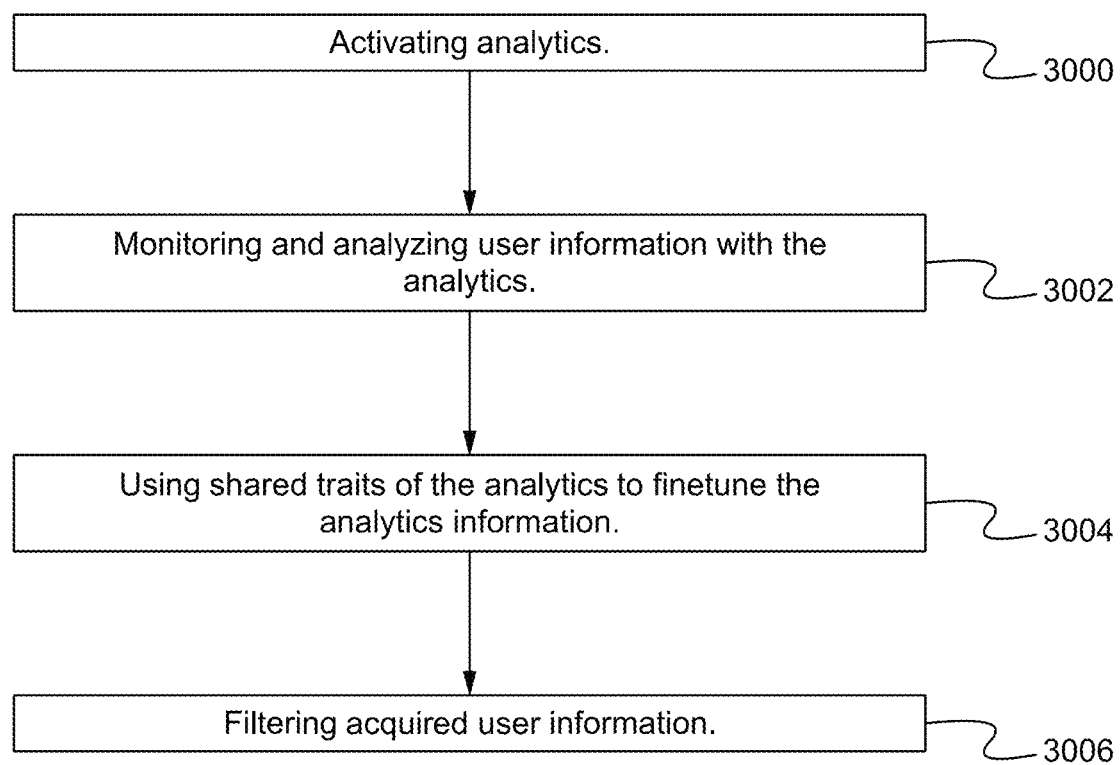
FIG. 30 illustrates a flowchart of a method of implementing analytics with shared traits according to some embodiments.

FIG. 30 illustrates a flowchart of a method of implementing analytics with shared traits according to some embodiments. In the step 3000, a user activates analytics tracking on a mobile device. For example, a user activates a new phone, and verifies that the user is the correct owner of the mobile device. The user does not necessarily perform activation of the analytics tracking; rather, in some implementations, simply activating a new phone causes the analytics to be activated. In some embodiments, the analytics are part of a background application which is part of or separate from an operating system and automatically runs.

In the step 3002, when a mobile device is sure (e.g., confidence above a threshold) that the user is the correct user (e.g., owner of the device), the analytics monitor and analyze user information such as user actions, other user features (e.g., face, voice), and/or any other user identification information. As described herein, examples of analytics include gait, tremors/microtremors, vehicle motion and facial recognition. The analysis of the user information includes specific details related to the user such as speed of gait, patterns of microtremors, driving patterns, identifying facial features, and much more. The information is stored to be later compared for user identification purposes. Some of the details are shared between the analytics modules, so the gait of a user and/or vehicle motion may affect the microtremors.

In the step 3004, the shared traits are used to fine-tune the analytics information. The shared traits allow information among related analytics to be shared among the related analytics. Additionally, feedback from each of the analytics is able to be shared among the related analytics. For example, if a user is walking with a device, the gait information is able to be shared with the microtremors analytics, so that the microtremors analytics are able to recognize that the microtremors are occurring while the user is walking. As discussed herein, the microtremors of the user at rest are likely to be different than microtremors when a user is walking which are likely to be different than microtremors when a user is running. The information acquired is able to be classified differently or other actions are able to be taken such as discarding/filtering the information. The fine-tuned data is stored appropriately such as corresponding to each related analytics module, and in some embodiments, in classifications or sub-classifications for each related analytics module. For example, in the microtremors analytics module, there are classifications of at rest, walking, running, and driving, each of which store different information based on the actions that the user is taking.

In the step 3006, acquired user information is filtered while the user utilizes the mobile device. Filtering the user information is able to be performed in multiple ways. For example, if the user information is acquired while external forces corrupt the acquired user information, then the user information is discarded. For example, if a user is talking into his phone, and a friend yells into the phone, then the voice acquired would be a mix of the user's voice and the friend's voice, which is not useful for voice recognition, so the data is not used for machine learning and is discarded. Determining whether to discard information is able to be implemented in any manner such as analyzing the acquired information and comparing it to the currently stored information, and if the difference between the information is above a threshold, then the acquired information is discarded. In another example, a user is queried about the difference (e.g., is your new gait because of an injury), and depending on the user's answer, the acquired information may be discarded. In another example, if feedback from a related analytic indicates that the acquired information is unreliable (e.g., it is determined the user is in a vehicle based on GPS feedback), then the acquired information is discarded (e.g., the microtremors from the vehicle corrupt the user's hand microtremors). The user information is also able to be filtered into classifications based on the shared details of the analytics and the feedback from the analytics. When the shared details from one analytics module affects the data of another analytics module, the data is able to be classified separately from previously stored analytics information.

The acquired user information is used to continuously improve learning about the user for the purposes of user identification. An important aspect of learning is that the correct data is used. Therefore, by filtering acquired information that is corrupt, incorrect or otherwise unhelpful, the learning process is more efficient and more accurate such that the device is able to more accurately and more confidently identify the user.

In some embodiments, the order of the steps is modified. In some embodiments, fewer or additional steps are implemented.

In an exemplary implementation, after a user purchases and activates his new mobile phone, a 5 minute identification period is implemented, where a user is directed to perform tasks such as holding the phone, walking while holding the phone, taking a scan/image of the user's face, ear, other identifying feature, talking for voice recognition, typing using the keypad, and/or perform any other identifying steps. After the identification period, the mobile device continues to monitor the user with the analytics. In some embodiments, to ensure that newly acquired data after the identification period is still for the correct user of the device, the user performs an authentication procedure as described herein (e.g., performing known tasks, facial recognition, biometric scans, and/or answering a challenge). Depending on what the user is doing, the analytics will continue to learn and store additional information, possibly generate new analytics classifications or subclassifications, and/or ignore/delete/filter acquired information that is determined to be unhelpful in learning. For example, during the initial identification period, the user walked while holding the phone, but did not run, so based on the accelerometer, GPS and/or other location/tracking devices/applications in the phone, if it is determined the user is running, the microtremors while the user is running are also able to be detected and stored in a new classification under microtremors related to "while running." In another example, the user is mountain biking (as determined using the accelerometer, GPS and/or other location/tracking devices/applications) which causes irregular tremors which are unhelpful in learning about the user regarding microtremors in the user's hand, so this acquired information is discarded. The analytics with shared details are able to enable a device to continuously learn useful information about a user which is able to be used to properly identify the user while also avoiding learning misleading or erroneous information which may cause a misidentification of the user.

The analytics with shared traits are able to be implemented on a user device and/or a server device. For example, a mobile phone is able to include an application with analytics modules with shared traits to implement learning based on a user's actions and features. In another example, a server device receives information from a user's mobile phone, and the analytics with shared traits on the server device are able to be used to perform learning based on the received information of the user's actions and features.

Any of the implementations described herein are able to be used with any of the other implementations described herein. In some embodiments, the implementations described herein are implemented on a single device (e.g., user device, server, cloud device, backend device) and in some embodiments, the implementations are distributed across multiple devices, or a combination thereof.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
   monitoring and analyzing user information with analytics during a period while a user is known by the device to learn identifying actions and features of the user;
   adjusting the analytics based on shared traits of the analytics; and
   filtering acquired user information to determine whether to use the acquired user information to learn additional identifying actions and features of the user.

2. The method of claim 1 further comprising activating tracking with the analytics.

3. The method of claim 1 wherein the analytics include related analytics and unrelated analytics.

4. The method of claim 3 wherein the related analytics share the shared traits of the analytics.

5. The method of claim 1 wherein adjusting the analytics includes providing feedback from one of the analytics to another of the analytics.

6. The method of claim 1 wherein filtering the acquired user information includes ignoring the acquired user information.

7. The method of claim 1 wherein filtering the acquired user information includes classifying the acquired user information in a separate classification.

8. A device comprising:
a non-transitory memory for storing an application, the application configured for:
monitoring and analyzing user information with analytics during a period while a user is known by the device to learn identifying actions and features of the user;
adjusting the analytics based on shared traits of the analytics; and
filtering acquired user information to determine whether to use the acquired user information to learn additional identifying actions and features of the user; and
a processor configured for processing the application.

9. The device of claim 8 wherein the application is further for activating tracking with the analytics.

10. The device of claim 8 wherein the analytics include related analytics and unrelated analytics.

11. The device of claim 10 wherein the related analytics share the shared traits of the analytics.

12. The device of claim 8 wherein adjusting the analytics includes providing feedback from one of the analytics to another of the analytics.

13. The device of claim 8 wherein filtering the acquired user information includes ignoring the acquired user information.

14. The device of claim 8 wherein filtering the acquired user information includes classifying the acquired user information in a separate classification.

15. A server device comprising:
a non-transitory memory for storing an application, the application configured for:
receiving user information from a user device;
monitoring and analyzing the user information with analytics during a period while a user is known by the user device to learn identifying actions and features of the user;
adjusting the analytics based on shared traits of the analytics; and
filtering acquired user information to determine whether to use the acquired user information to learn additional identifying actions and features of the user; and
a processor configured for processing the application.

16. The server device of claim 15 wherein the application is further for activating tracking with the analytics.

17. The server device of claim 15 wherein the analytics include related analytics and unrelated analytics.

18. The server device of claim 17 wherein the related analytics share the shared traits of the analytics.

19. The server device of claim 15 wherein adjusting the analytics includes providing feedback from one of the analytics to another of the analytics.

20. The server device of claim 15 wherein filtering the acquired user information includes ignoring the acquired user information.

21. The server device of claim 15 wherein filtering the acquired user information includes classifying the acquired user information in a separate classification.

* * * * *